US012417069B2

(12) United States Patent
Ru et al.

(10) Patent No.: US 12,417,069 B2
(45) Date of Patent: Sep. 16, 2025

(54) DISPLAY APPARATUS AND METHOD FOR SOUND PROCESSING

(71) Applicant: HISENSE VISUAL TECHNOLOGY CO., LTD., Shandong (CN)

(72) Inventors: Yanqing Ru, Shandong (CN); Qiwei Sun, Shandong (CN); Guili Jia, Shandong (CN); Jiande Wei, Shandong (CN); Xing Wang, Shandong (CN); Qiang Wang, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 202 days.

(21) Appl. No.: 18/196,814

(22) Filed: May 12, 2023

(65) Prior Publication Data
US 2023/0280971 A1 Sep. 7, 2023

Related U.S. Application Data

(63) Continuation of application No. PCT/CN2022/097442, filed on Jun. 7, 2022.

(30) Foreign Application Priority Data

Aug. 5, 2021 (CN) ............ 202110895909.8
Aug. 20, 2021 (CN) ............ 202110959242.3
Aug. 20, 2021 (CN) ............ 202110959616.1

(51) Int. Cl.
*G06F 3/0482* (2013.01)
*G06F 3/16* (2006.01)
(52) U.S. Cl.
CPC ............ *G06F 3/165* (2013.01); *G06F 3/0482* (2013.01)

(58) Field of Classification Search
CPC .......... G06N 20/00; G06N 5/02; G06N 5/022; G06N 5/04; G06N 99/00; G06F 16/36;
(Continued)

(56) References Cited

U.S. PATENT DOCUMENTS 9,335,897 B2 *  5/2016  Goldenberg .......... G06F 3/0482
2006/0069458 A1 *  3/2006  Lee ...................... G06F 3/0219
(Continued)

FOREIGN PATENT DOCUMENTS

CN      101094362 A    12/2007
CN      104798344 A     7/2015
(Continued)

OTHER PUBLICATIONS

English translation of International Search Report issued in PCT/CN2022/097442, mailed Aug. 19, 2022.
(Continued)

*Primary Examiner* — Rayeez R Chowdhury
(74) *Attorney, Agent, or Firm* — Meunier Carlin & Curfman LLC

(57) ABSTRACT

Disclosed are a display apparatus and a method for sound processing. The method includes: receiving a command for setting a sound mode currently used by the display apparatus as a target sound mode; in response to the command, display a sound setting menu on the display of the display apparatus, and display a name of the target sound mode and one or more context menus corresponding to the target sound mode; and in response to at least one context menu of the one or more context menus being a non-default context menu, display a prompt identifier on the sound setting menu, wherein the non-default context menu refers to a context menu with a current sound effect parameter that is a non-default value.

18 Claims, 41 Drawing Sheets

(58) Field of Classification Search
CPC ........ G06F 16/901; G06F 3/0482; G06F 3/16; G06F 17/00; G06F 7/00; G06F 3/0481; G06F 3/048; G06F 3/12; G06F 3/14; G06F 16/23; G06F 16/2455; G06F 16/951; G06F 3/01; G06F 3/02; G06F 1/18; G06F 13/00; G06F 15/00; G06F 3/00; G06F 3/03; G06F 3/0488; G06F 3/147; G06F 9/46; G06F 9/48
See application file for complete search history.

(56) References Cited

U.S. PATENT DOCUMENTS

| | | | |
|---|---|---|---|
| 2013/0245798 A1* | 9/2013 | Kallai | H03G 5/165 |
| | | | 700/94 |
| 2014/0047487 A1 | 2/2014 | Guedalia et al. | |
| 2014/0157197 A1* | 6/2014 | Lee | G06F 3/0482 |
| | | | 715/811 |
| 2017/0168772 A1* | 6/2017 | Lim | G06F 3/165 |
| 2017/0177298 A1 | 6/2017 | Hardee et al. | |
| 2017/0262073 A1* | 9/2017 | Jung | H04N 21/439 |
| 2017/0289717 A1* | 10/2017 | Little | G06F 3/165 |
| 2018/0139005 A1* | 5/2018 | Boduch | H04Q 11/0005 |
| 2018/0181365 A1* | 6/2018 | Winton | G06F 3/04845 |
| 2021/0014610 A1 | 1/2021 | Carrigan et al. | |
| 2022/0124415 A1* | 4/2022 | Lee | H04N 21/42222 |

FOREIGN PATENT DOCUMENTS

| | | |
|---|---|---|
| CN | 105023593 A | 11/2015 |
| CN | 106210287 A | 12/2016 |
| CN | 107197367 A | 9/2017 |
| CN | 107644629 A | 1/2018 |
| CN | 108370386 A | 8/2018 |
| CN | 110855824 A | 2/2020 |
| CN | 111208969 A | 5/2020 |
| CN | 111459362 A | 7/2020 |
| CN | 112019782 A | 12/2020 |
| CN | 112565862 A | 3/2021 |
| CN | 113630653 A | 11/2021 |
| CN | 113794919 A | 12/2021 |
| CN | 113794928 A | 12/2021 |
| JP | 2011114588 A | 6/2011 |
| KR | 20160081650 A | 7/2016 |

OTHER PUBLICATIONS

English translation of Chinese Office Action issued in CN202110895909.8, mailed Aug. 1, 2022.

English translation of Chinese Office Action issued in CN202110959242.3, mailed Aug. 1, 2022.

English translation of Chinese Office Action issued in CN202110959242.3, mailed Mar. 17, 2023.

* cited by examiner

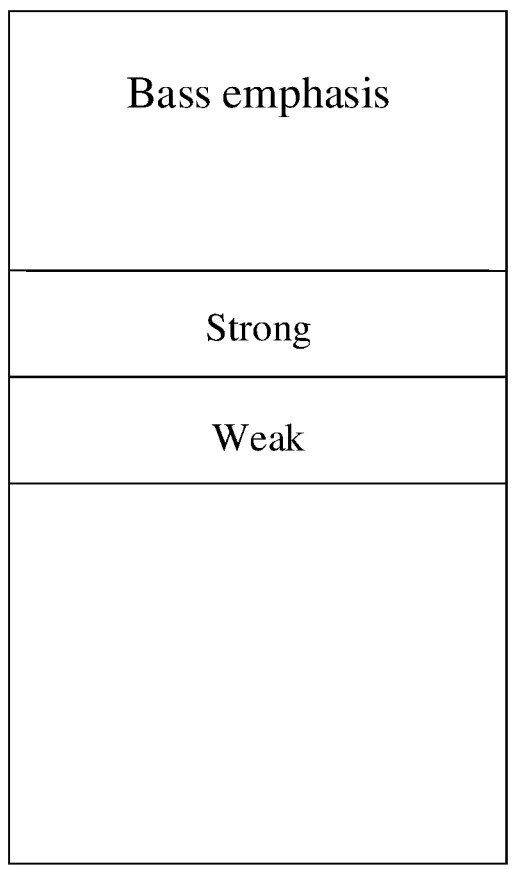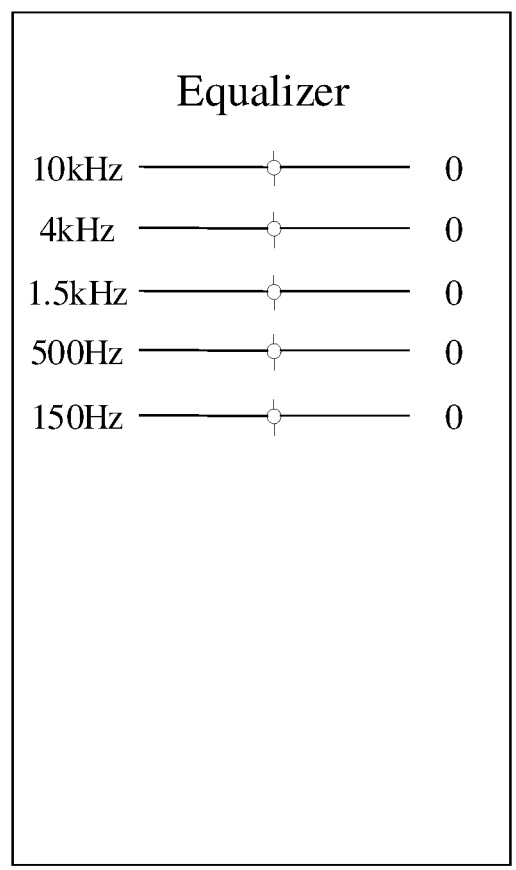
Fig. 25
Fig. 26

| Sound setting |
|---|
| Sound mode<br>Dynamic mode |
| Surround<br>Off |
| Sound remaster<br>Off |
| Bass emphasis<br>Strong |
| Equalizer |

Fig. 27

| Sound setting |
|---|
| Sound mode<br>Dynamic mode:<br>non-default value |
| Surround |
| Sound remaster |
| Bass emphasis<br>Strong |
| Equalizer |
| Reset |

Fig. 29

| Sound setting |
|---|
| Sound mode<br>Dynamic mode:<br>non-default value |
| Surround |
| Sound remaster |
| Bass emphasis    Reset<br>Strong |
| Equalizer |

Fig. 30

| Sound setting |
|---|
| Sound mode<br>Dynamic mode:<br>non-default value |
| Surround |
| Sound remaster |
| Bass emphasis<br>Strong |
| Equalizer |
| Restore |

Fig. 34

| Sound setting |
|---|
| Sound mode<br>Dynamic mode:<br>non-default value |
| Surround |
| Sound remaster |
| Bass emphasis  Strong    (Restore) |
| Equalizer |

Fig. 35

DISPLAY APPARATUS AND METHOD FOR SOUND PROCESSING

CROSS REFERENCE TO RELATED APPLICATIONS

This application is a continuation application of PCT/CN2022/097442, filed on Jun. 7, 2022, which claims the priorities to Chinese patent application No. 202110895909.8, filed on Aug. 5, 2021, Chinese patent application No. 202110959616.1, filed on Aug. 20, 2021, and Chinese patent application No. 202110959242.3, filed on Aug. 20, 2021, all of which are incorporated in their entireties herein by reference.

FIELD

The present application relates to sound processing of display apparatuses, and particularly relates to a display apparatus and a method for sound processing.

BACKGROUND

In order to improve a picture display effect, a display apparatus is generally equipped with sound output devices, such as the speaker and an external power amplification device, and plays audio data via the sound output devices.

Since there are a variety of different sound output devices, it is necessary to provide a way for users to conveniently select appropriate sound output devices according to demands. In addition, the users can control the sound output devices to play audio data with different sound effects by setting sound modes on the display apparatus, so as to satisfy different auditory demands.

SUMMARY

The present application provides a display apparatus and a method for sound processing.

In some embodiments, the display apparatus includes: a display, configured to display an image from a broadcast system and/or a network, and/or, a user interface; a communicator, configured to connect to the internet; a user input interface, configured to receive a command from a user; a memory, configured to store data associated with the display and computer instructions and a processor, in connection with the display, the communicator, the user input interface, and the memory, and configured to execute the computer instructions to cause the display apparatus to: receive a command for setting a sound mode currently used by the display apparatus as a target sound mode; in response to the command, display a sound setting menu on the display, and display a name of the target sound mode and one or more context menus corresponding to the target sound mode; and in response to at least one context menu of the one or more context menus being a non-default context menu, display a prompt identifier on the sound setting menu, wherein the non-default context menu refers to a context menu with a current sound effect parameter that is a non-default value.

In some embodiments, the method for sound processing in a display apparatus, comprising: receiving a command for setting a sound mode currently used by the display apparatus as a target sound mode; in response to the command, display a sound setting menu on a display of the display apparatus, and display a name of the target sound mode and one or more context menus corresponding to the target sound mode; and in response to at least one context menu of the one or more context menus being a non-default context menu, display a prompt identifier on the sound setting menu, wherein the non-default context menu refers to a context menu with a current sound effect parameter that is a non-default value.

BRIEF DESCRIPTION OF THE DRAWINGS

FIG. 25 is a schematic diagram of an operation interface of sound effect parameters of bass emphasis in some embodiments of the present application.

FIG. 26 is a schematic diagram of an operation interface of sound effect parameters of an equalizer in some embodiments of the present application.

FIG. 27 is a schematic diagram of an interface of sound effect parameters displayed on a sound setting menu in some embodiments of the present application.

FIG. 29 is a schematic diagram of a display mode of a reset option on a sound setting menu in some embodiments of the present application.

FIG. 30 is a schematic diagram of a display mode of a reset option on a non-default context menu in some embodiments of the present application.

FIG. 34 is a schematic diagram of a display mode of a restore option on a sound setting menu in some embodiments of the present application.

FIG. 35 is a schematic diagram of a display mode of a restore option on a context menu in some embodiments of the present application.

DETAILED DESCRIPTION OF THE EMBODIMENTS

Brief description of terms in the present application is merely for convenience of understanding the embodiments described below, and is not intended to limit the embodiments of the present application. Unless indicated otherwise, the terms should be understood according to their ordinary and plain meanings.

Figure 2:
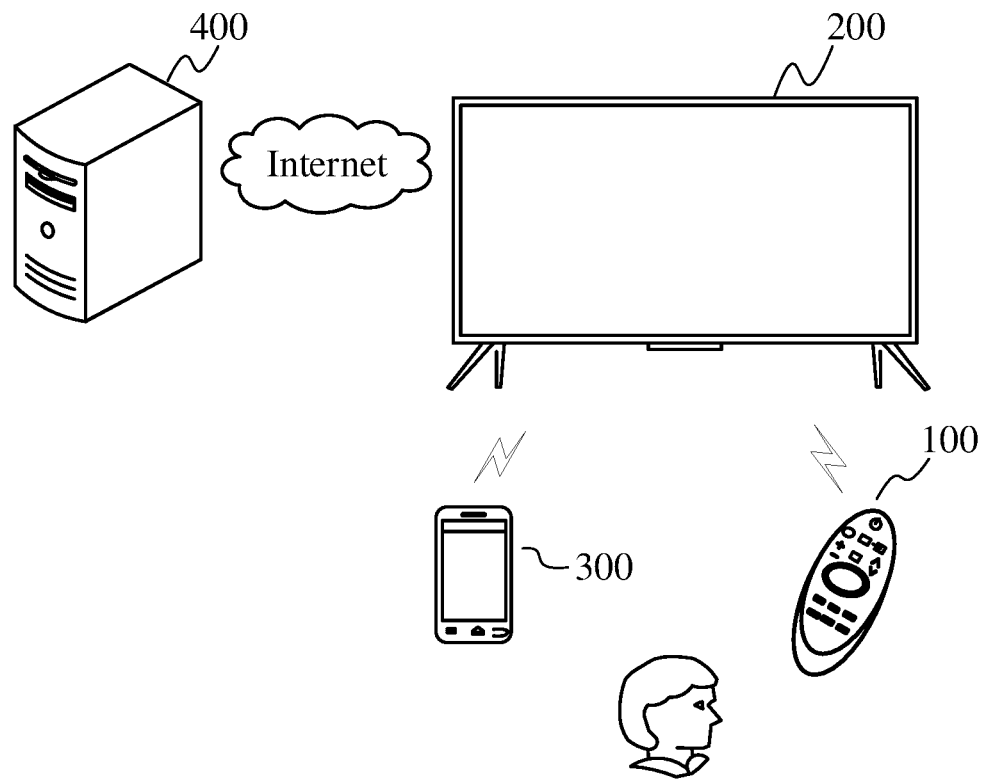
FIG. 2 shows a scenario of a display apparatus in some embodiments of the present application.

FIG. 2 is a schematic diagram of a use scenario of a display apparatus according to an embodiment. As shown in FIG. 2, a display apparatus 200 is further in data communication with a server 400, and a user may operate the display apparatus 200 via an intelligent device 300 or a control device 100.

In some embodiments, the control device 100 may be a remote controller, and communication between the remote controller and the display apparatus includes at least one of infrared protocol communication or Bluetooth protocol communication, or other short-haul communication modes, and the display apparatus 200 is controlled in a wireless or wired mode. The user may input a command via at least one of buttons on the remote controller, voice input, or control panel input etc., so as to control the display apparatus 200.

In some embodiments, the intelligent device 300 may include any one of a mobile terminal, a tablet computer, a computer, a notebook computer, or an augmented reality (AR)/virtual reality (VR) device, etc.

In some embodiments, the intelligent device 300 may also be used to control the display apparatus 200. For example, an application running on the intelligent device may be used to control the display apparatus 200.

In some embodiments, the intelligent device 300 and the display apparatus may also be used for data communication.

In some embodiments, the display apparatus 200 may further be controlled in modes other than the control device 100 and the intelligent device 300, for example, may be controlled by enabling a module configured inside the display apparatus 200 and for obtaining a voice command to directly receive a voice command from a user, or may be controlled by enabling a voice control device provided outside the display apparatus 200 to receive a voice command from a user.

In some embodiments, the display apparatus 200 may further be in data communication with the server 400. The display apparatus 200 may be allowed to conduct communication connection through a local area network (LAN), a wireless local area network (WLAN), or other networks. The server 400 may provide various contents and interactions for the display apparatus 200.

Figure 3:
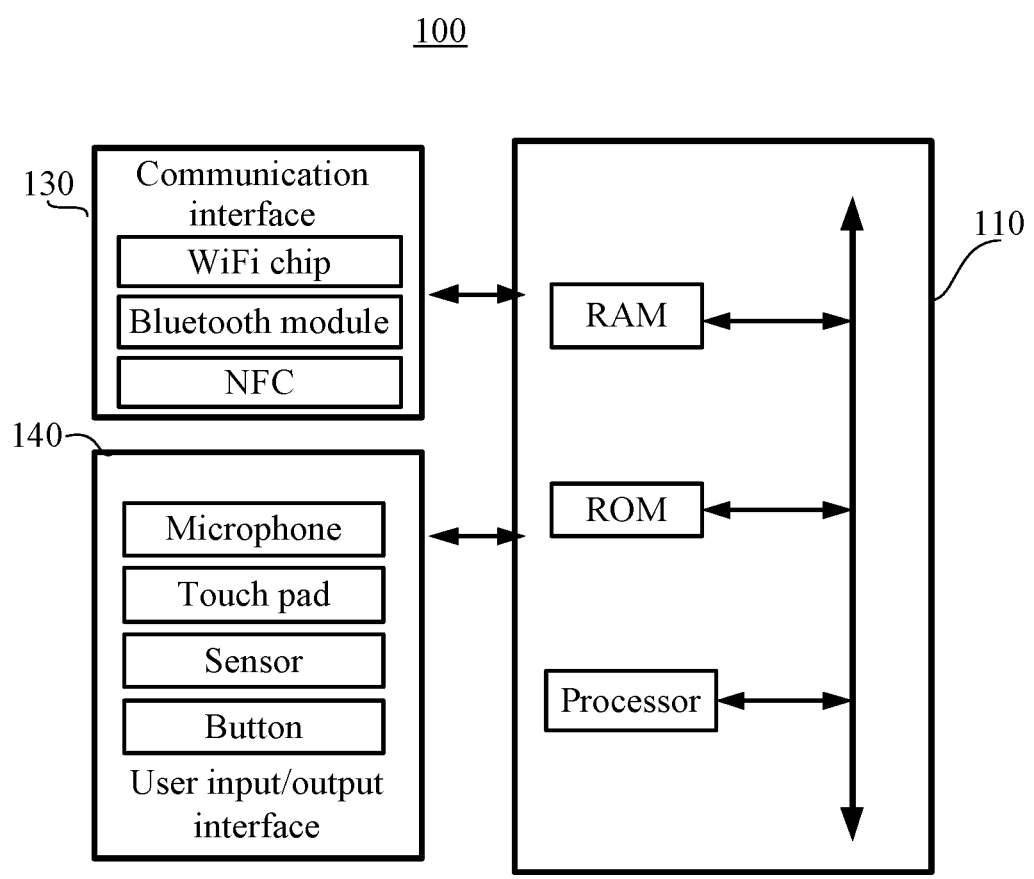
FIG. 3 is a block diagram of hardware configuration of a control device in some embodiments of the present application.

FIG. 3 is a block diagram of configuration of a control device 100 according to some embodiments. As shown in FIG. 3, the control device 100 includes a controller 110, a communication interface 130, a user input/output interface 140, a memory, and a power supply. The control device 100 may receive a command from a user, and convert the command into an instruction that a display apparatus 200 may identify and respond to, so as to play an interactive intermediary role between the user and the display apparatus 200.

In some embodiments, the communication interface 130 is configured to be in communication with outside, and includes at least one of a WIFI chip, a Bluetooth module, near-field communication (NFC), or other communication modules.

In some embodiments, the user input/output interface 140 includes at least one of a microphone, a touch pad, a sensor, a button, or a replaceable module.

Figure 4:
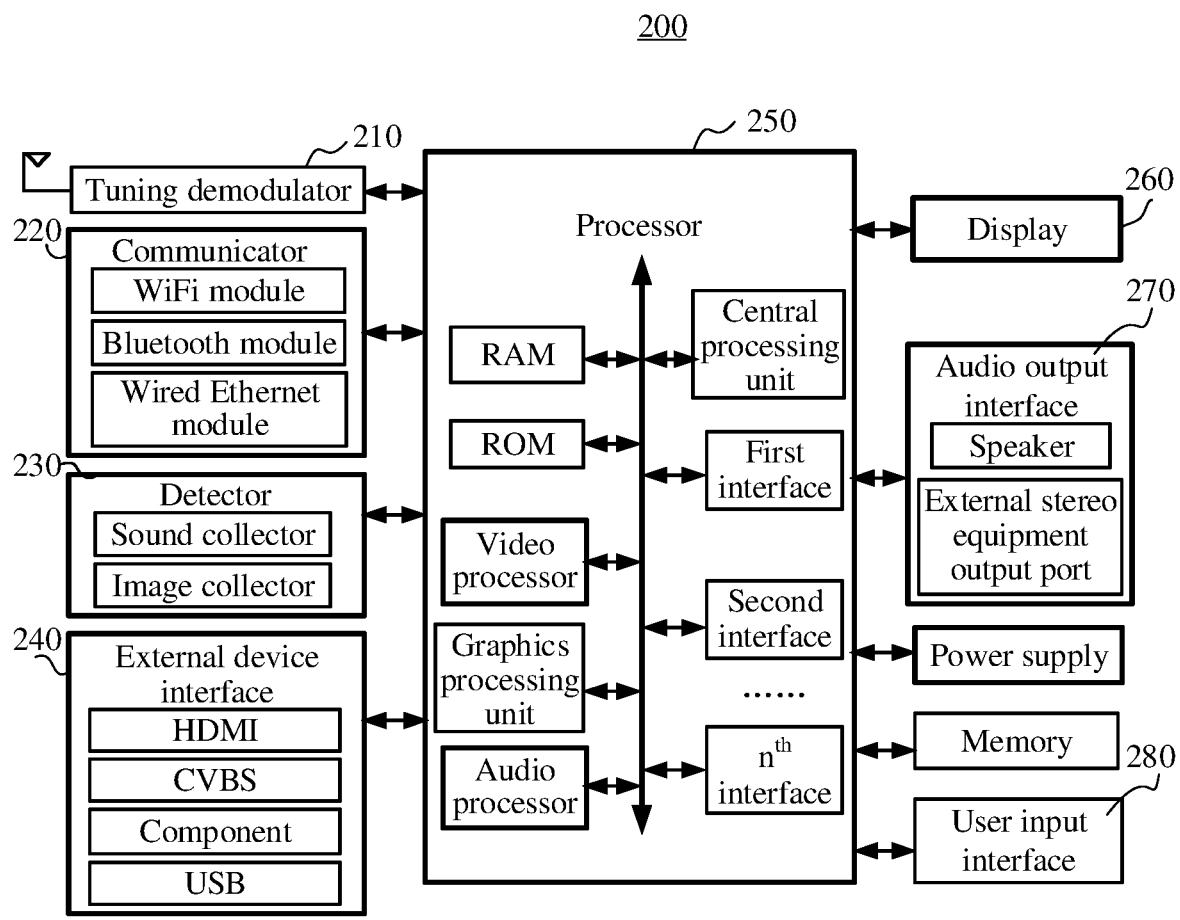
FIG. 4 is a diagram of hardware configuration of a display apparatus in some embodiments of the present application.

FIG. 4 is a block diagram of hardware configuration of a display apparatus 200 according to some embodiments.

In some embodiments, the display apparatus 200 includes at least one of a tuning demodulator 210, a communicator 220, a detector 230, an external device interface 240, a processor 250, a display 260, an audio output interface 270, a memory, a power supply, or a user input interface.

In some embodiments, the communicator 220 is a component for communication with an external device or a server according to various communication protocols. For example, the communicator may include at least one of a Wifi module, a Bluetooth module, a wired Ethernet module, or other network communication protocol chips or near-field communication protocol chips, or an infrared receiver. The display apparatus 200 may issue or receive a control signal and a data signal to or from a control device 100 or a server 400 by means of the communicator 220.

In some embodiments, the detector 230 may include one or more of an optical receiver, an image collector, or a sound collector, etc.

In some embodiments, the external device interface 240 may include, but not limited to, any one or more of the following interfaces: a high-definition multimedia interface (HDMI), an analog or data high-definition component input interface (component), a composite video broadcast signal (CVBS), a universal serial bus (USB) input interface, or a red green blue (RGB) port, etc.

In some embodiments, the processor 250 and the tuning demodulator 210 may be located in different separate devices, that is, the tuning demodulator 210 may also be located in an external device of a main device where the processor 250 is located, such as an external set-top box.

In some embodiments, the processor 250 controls operation of the display apparatus and responds to operations from the user through various software programs stored in the memory. The processor 250 controls overall operations of the display apparatus 200. For example, in response to receiving a user command for selecting a user interface (UI) object presented on the display 260, the processor 250 may execute an operation related to an object selected by the user command.

In some embodiments, the user may input a user command to a graphical user interface (GUI) displayed on the display 260, and a user input interface receives a user input command by means of the GUI. Alternatively, the user may input a user command by inputting specific sound or gesture, and a user input interface identifies the sound or gesture by means of the sensor, so as to receive a user input command.

In some embodiments, the user input interface 280 is an interface (for example, a physical button on a display apparatus body, etc.) that may be configured to receive input from a user.

Figure 5:
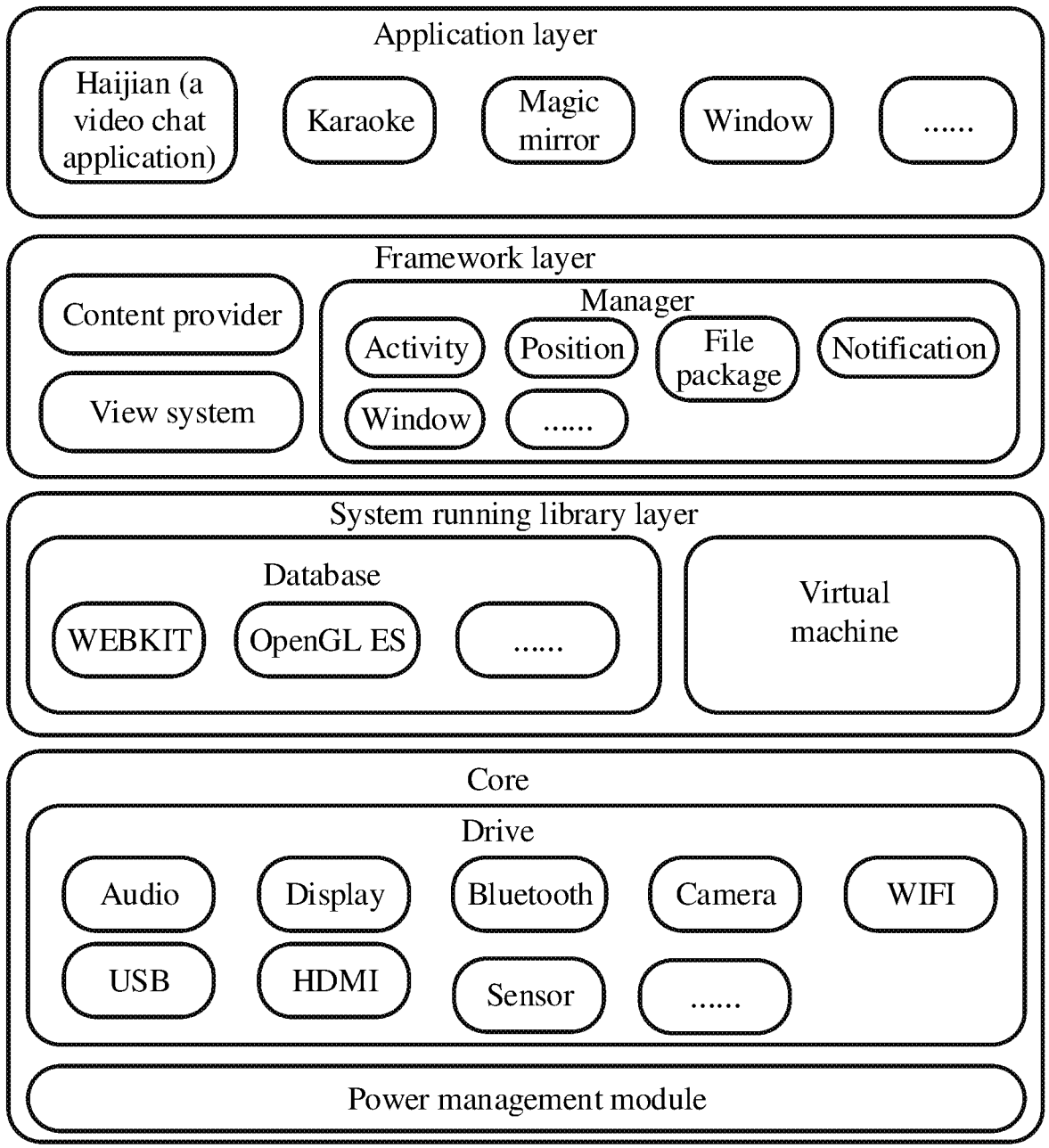
FIG. 5 is a diagram of software configuration of a display apparatus in some embodiments of the present application.

With reference to FIG. 5, in some embodiments, a system is divided into four layers, which are, from top to bottom, an applications layer (called "application layer" for short), an application framework layer (called "framework layer" for short), an Android runtime and system library layer (called "system running library layer" for short), and a core layer.

In some embodiments, the display apparatus is provided with various types of physical ports for connecting with external devices, where a USB port is configured to connect with an external storage device, such as a U disk, a hard disk, or a card reader. The storage device may store local media files of different resource types, such as a video file, an audio file, an image, a text and a document, so as to display or play the media files saved in the storage device at a display apparatus side.

In some embodiments, when a storage device is connected to the display apparatus via the USB port, the display apparatus may automatically pop up a storage device directory on the display; and alternatively, the user may access a connected storage device through a designated path/entrance, and after the storage device is opened through clicking, a UI may automatically display the storage device directory.

In an audio playing process, the display apparatus 200 may decode audio source data through various audio playing processes so as to obtain audio data for play, and play the audio data via an audio output interface 270, which may be played via a speaker of the display apparatus or external stereo equipment. In some embodiments, the display apparatus 200 may decode and play audio source data to be played through a hardware playing process in the display apparatus. The hardware playing process means that the processor 250 of the display apparatus causes to decode the audio source data to be played by running an audio playing program in an operation system, so as to obtain final decoded audio data and play the decoded audio data via the audio output interface 270. In some embodiments, the display apparatus 200 may further decode and play the audio source data to be played through a software playing process of a browser in the display apparatus. The software playing process means that the processor 250 of the display apparatus 200 causes to decode the audio source data to be played by running an audio playing program embedded in a browser, so as to obtain final decoded audio data and play the decoded audio data via the audio output interface 270.

In some embodiments, the audio source data may merely include audio data, or may be an audio portion in a video source. If the audio source data is audio data portion in the video source, in the audio playing process, the display apparatus 200 needs to process the video source so as to extract the audio source data from the video source data, and then process and play the extracted audio source data in the above methods.

Figure 6:
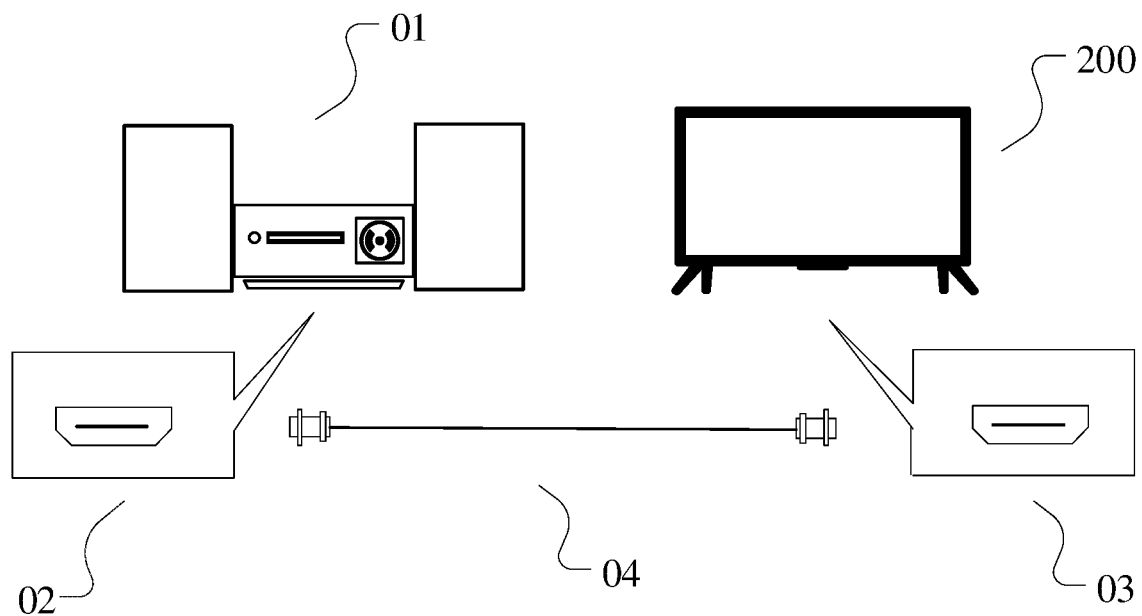
FIG. 6 is a schematic diagram of communication between an audio return channel (ARC) device and a display apparatus in some embodiments of the present application.

In some embodiments, as shown in FIG. 4, the display apparatus 200 may be connected to sound output devices via the audio output interface 270, and play audio source data by the sound output devices. For example, the display apparatus 200 is connected to its own speaker via the audio output interface 270, and the speaker plays the audio data, and alternatively, the display apparatus is connected to sound output devices via external stereo equipment output ports, such as an HDMI port and a USB port. For example, when an audio return channel (ARC) device is used as a sound output device, as shown in FIG. 6, the ARC device 01 has an HDMI ARC output port 02. In this case, an HDMI port of the display apparatus 200 is an HDMI ARC input port 03 with an ARC function, the HDMI ARC output port 02 is connected to the HDMI ARC input port via an HDMI cable 04 supporting ARC function, and audio source data may be issued from the display apparatus 200 to the ARC device 01 via the HDMI cable 04 supporting ARC function, and played by the ARC device 01. Since the ARC device 01 has an ARC function, it is unnecessary to use an additional composite audio cable or optical cable between the display apparatus 200 and the ARC device 01.

Figure 7:
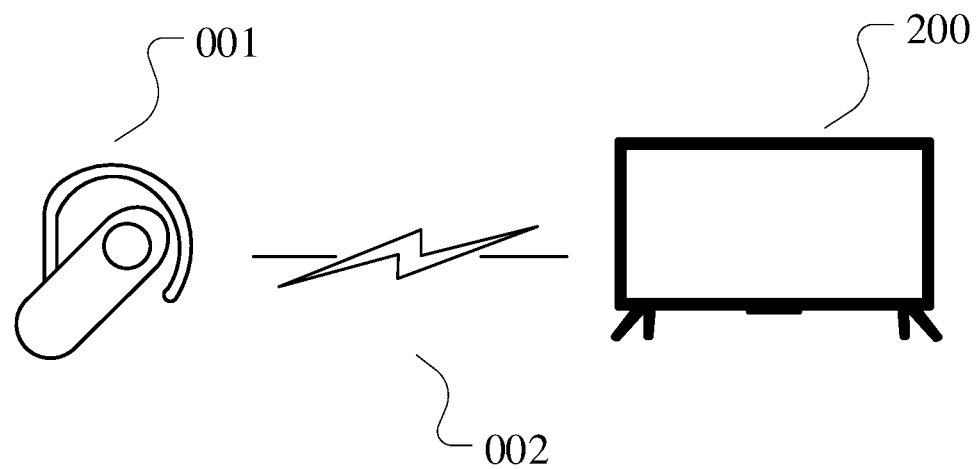
FIG. 7 is a schematic diagram of communication between a Bluetooth headset and a display apparatus in some embodiments of the present application.

In some embodiments, as shown in FIG. 4, the display apparatus 200 may be connected to sound output devices via the communicator 220, and play audio data by the sound output devices. For example, the display apparatus 200 is connected to the sound output devices via a WIFI module, a Bluetooth module, a wired Ethernet module, etc. For example, when a Bluetooth headset is used as a sound output device, as shown in FIG. 7, a device searching function and a discovery function of the Bluetooth headset 001 are enabled, a device searching function and a discovery function of the display apparatus 200 are enabled, after the Bluetooth headset 001 and the display apparatus 200 are paired, a Bluetooth transmission channel 002 is established, and audio data may be issued from the display apparatus 200 to the Bluetooth headset 001 via the Bluetooth transmission channel 002 and played by the Bluetooth headset 001.

Service between the display apparatus 200 and the sound output device is performed according to a communication protocol. Based on whether the display apparatus 200 and sound output device are configured with the same communication protocol, the sound output devices may be divided into designated sound output devices and non-designated sound output devices, where a designated sound output device refers to a sound output device configured to have the same communication protocol with that of the display apparatus 200, and the designated sound output device may not only issue audio data with the display apparatus 200, but also be controlled by the display apparatus 200 to set related playing parameters, such as sound effect parameters. A non-designated sound output device refers to a sound output device that does not have the same communication protocol with the display apparatus 200. Although the non-designated sound output device may be identified by the display apparatus 200 and issue audio data with the display apparatus 200, the display apparatus 200 cannot control and set playing parameters of the non-designated sound output device. In some embodiments, in order to further ensure transmission security of audio data and security of the display apparatus 200, data transmission between the display apparatus 200 and the non-designated sound output device may be prohibited.

Figure 1:
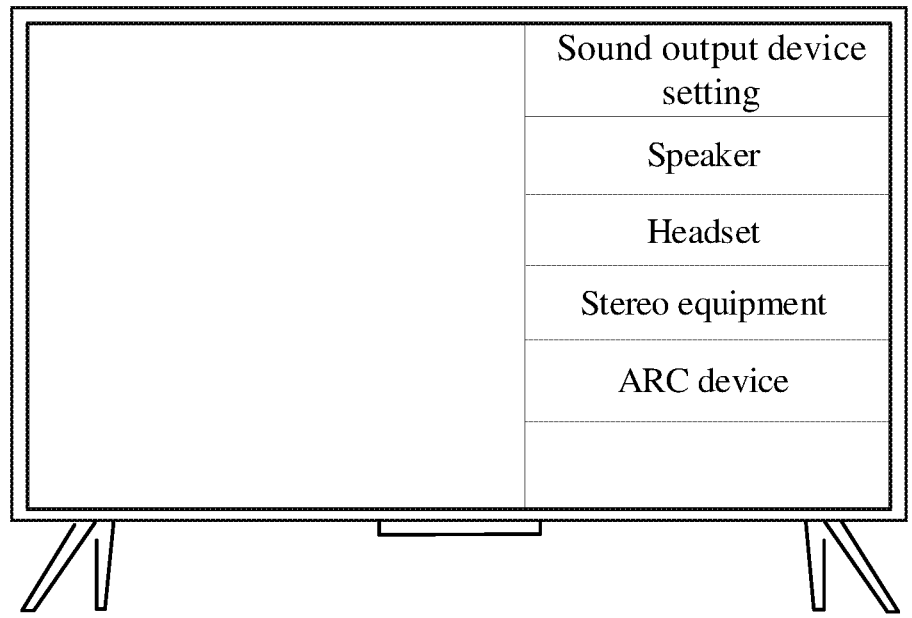
FIG. 1 is a schematic display diagram of a sound setting menu in some embodiments of the present application.

It may be seen that when the display apparatus 200 plays audio data, the user may choose from a variety of sound output devices, and the user may switch from a current sound output device to a target sound output device that satisfies demands by issuing a switch instruction. However, as shown in FIG. 1, when the user inputs a switch command by means of the sound output device setting option, the sound output device setting option is still available for selection even if there are no other sound output devices that can be switched to, but after the user inputs the switch command, the display apparatus 200 does not show a next-level menu (a sound output device setting menu) for a long time, such that the user cannot further select a target sound output device, and alternatively, after the user inputs the switch command, the sound output device setting menu displayed by the display apparatus 200 is in a blank state, that is, there is no device option for sound output which can be selected, such that the user cannot further operate, it may cause many invalid operations, which may lead to burdensome operations and misunderstanding for users.

Figure 8:
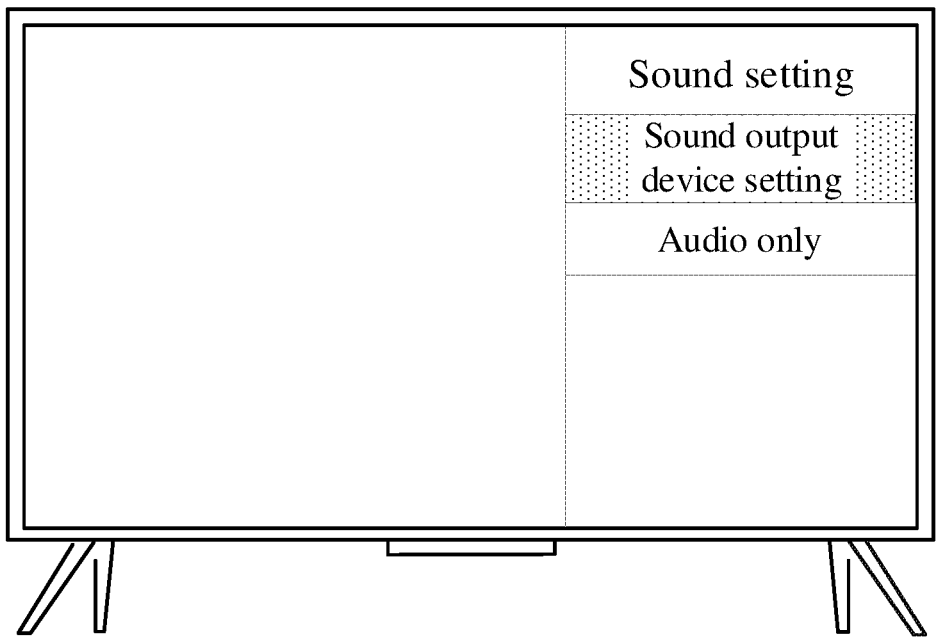
FIG. 8 is a schematic diagram of a sound setting menu of a sound output device setting option with a prompt identifier in some embodiments of the present application.

In view of the above issues, some embodiments of the present application provide a sound setting menu as shown in FIG. 8. Compared with FIG. 1, if there are no other sound output devices currently in connection with the display apparatus 200 other than the sound output device currently in use, in the sound setting menu as shown in FIG. 8, a prompt identifier is displayed on the sound output device setting option. As shown in FIG. 8, the sound output device setting option is grayed (a font color is designated dark gray, a background color is designated light gray, and when the option is selected, the display apparatus has no response to this selection of the option).

Figure 9:
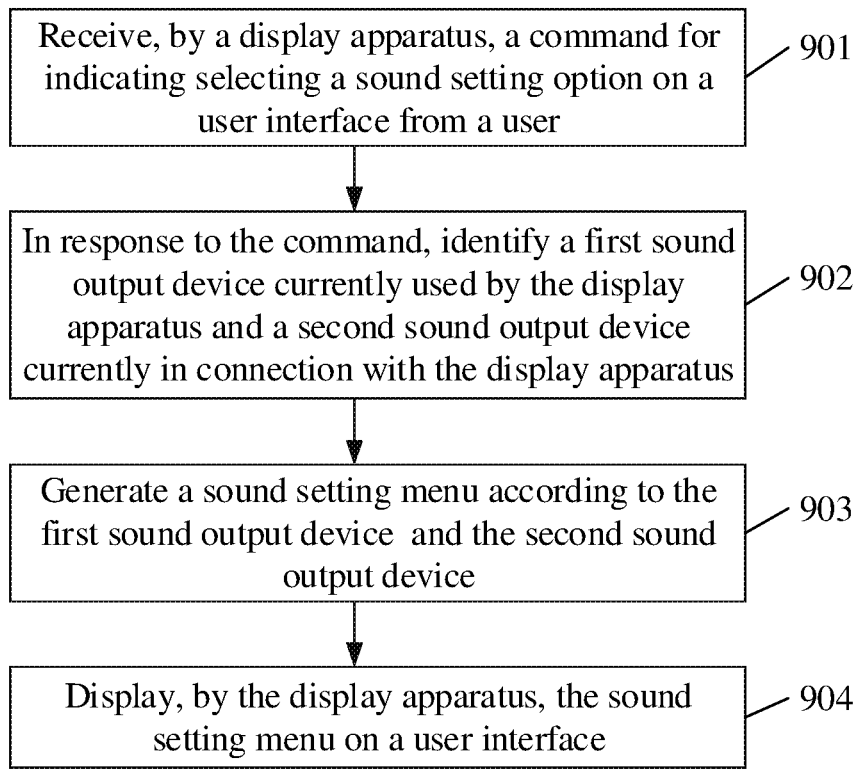
FIG. 9 is a schematic flow diagram of a display apparatus displaying a sound setting menu in some embodiments of the present application.

FIG. 9 is a schematic flow diagram for displaying a sound setting menu in the display apparatus.

901, the display apparatus 200 receives a command for indicating selecting a sound setting option on a user interface from a user.

902, in response to the command, a first sound output device currently used by the display apparatus and a second sound output device currently in connection with the display apparatus 200 are identified. In the embodiments, the sound output device currently used by the display apparatus is referred to as the first sound output device, and the sound output device currently in connection with the display apparatus 200 is referred to as the second sound output device. It is noted that there may be zero, one or more second sound output devices.

903, the sound setting menu is generated according to the first sound output device and the second sound output device, and the sound setting menu includes a sound output device setting option. If the number of second sound output devices is 0, a prompt identifier is displayed for the sound output device setting option, with reference to the sound output device setting option shown in FIG. 8, so as to prompt the user that there are no other sound output devices that may be switched to other than the first sound output device currently used. If the number of second sound output devices is greater than 0, the sound output device setting option is normally displayed in the sound setting menu, which means there is no prompt identifier for the sound output device setting option.

904, the display apparatus 200 displays the sound setting menu on a user interface. The user may directly and quickly know whether there is any sound output device that may be switched to by browsing the sound output device setting option, that is, if the sound output device setting option is displayed normally, operations such as selection may be performed, which means that there is another sound output device that may be switched to except for the first sound output device in use now, and the user may further perform a switching operation; and if a prompt identifier is displayed on the sound output device setting option, there is no sound output device that may be currently switched to, and there is no need for a user to do a switch operation.

Figure 10A:
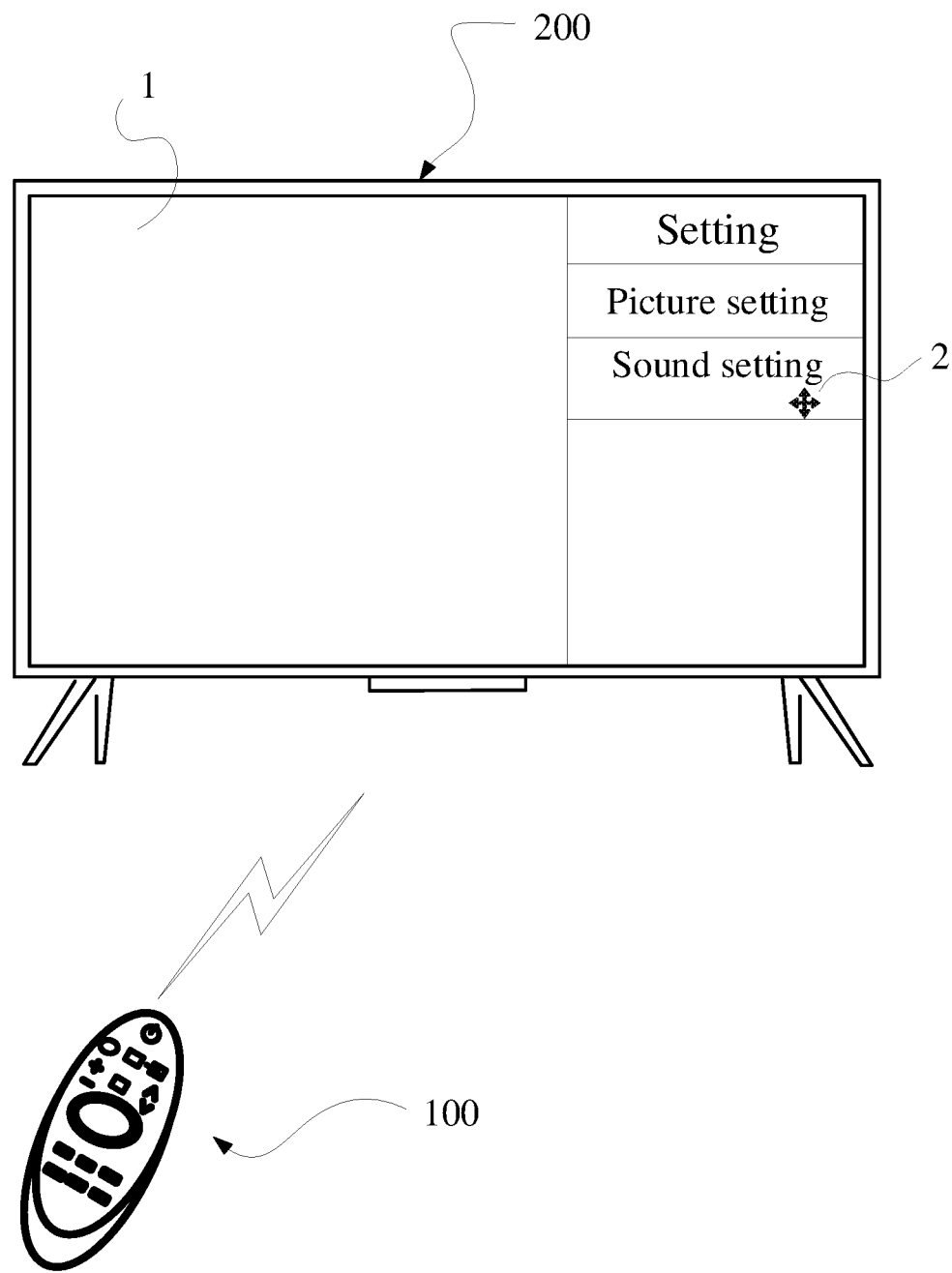
FIG. 10A is a schematic diagram of a command from a control device to a display apparatus in some embodiments of the present application.
Figure 10B:
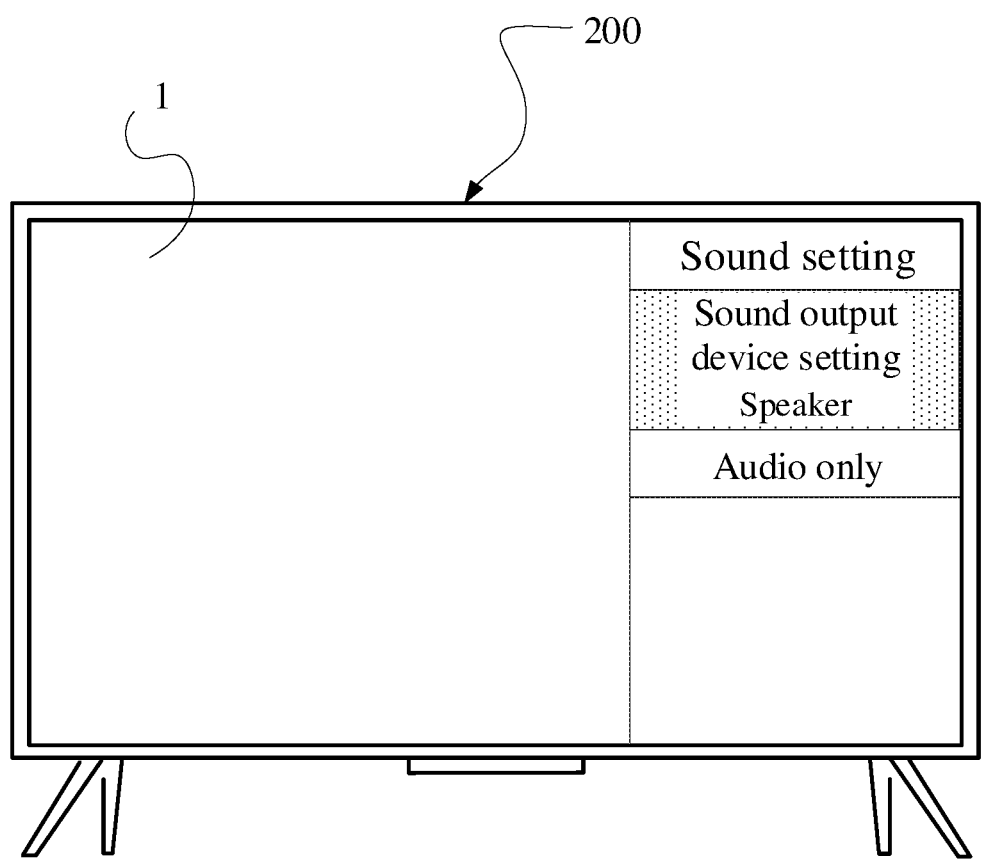
FIG. 10B is a schematic diagram of a sound setting menu of a sound output device setting option with a prompt identifier in some embodiments of the present application.

FIGS. 10A-10B are schematic diagrams of operations between a control device 100 and a display apparatus 200. For example, as shown in FIG. 10A, a user issues a command to the display apparatus 200 via the control device 100, such as a remote controller, for example, by operating "up", "down", "left" and "right" buttons on the remote controller. In response to an operation from the remote controller, the display apparatus 200 moves a movable tab 2 on a user interface 1, as shown in FIG. 10A, moves the tab 2 to a sound setting option, and the selecting of the sound setting option is regarded as a command for the display apparatus. In response to the command, the display apparatus 200 displays a sound setting menu on the user interface 1, as shown in FIG. 10B. The sound setting menu includes a sound output device setting option, and other options may be displayed according to design demands, such as an option of audio only (displaying no picture and only playing sound). As shown in FIG. 10B, a device name of a sound output device currently used (a first sound output device) is displayed on the sound output device setting option, for example, "speaker", which indicates that the sound output device currently used is a built-in speaker of the display apparatus 200. The display apparatus 200 identifies one or more sound output devices currently in connection with the display apparatus 200 (a second sound output device). If the second sound output device is not identified, that is, the number of the second sound output devices is 0, as shown in FIG. 10B, a prompt identifier is displayed for the sound output device setting option. For example, if the sound output device setting option is grayed, it is indicated that there is no sound output device currently available for the user to use for switch.

In some embodiments, the prompt identifier may be displayed in modes as follows: the sound output device setting option uses a designated font color (for example, in graying, a font color of the sound output device setting option uses designated light gray), the sound output device setting option uses a designated background color (for example, in graying, a background color of the sound output device setting option uses designated dark gray), and a designated text (no sound output device selected and no other sound output devices) is displayed on the sound output device setting option. The prompt identifier may also use some or all of the above modes.

Figure 11A:
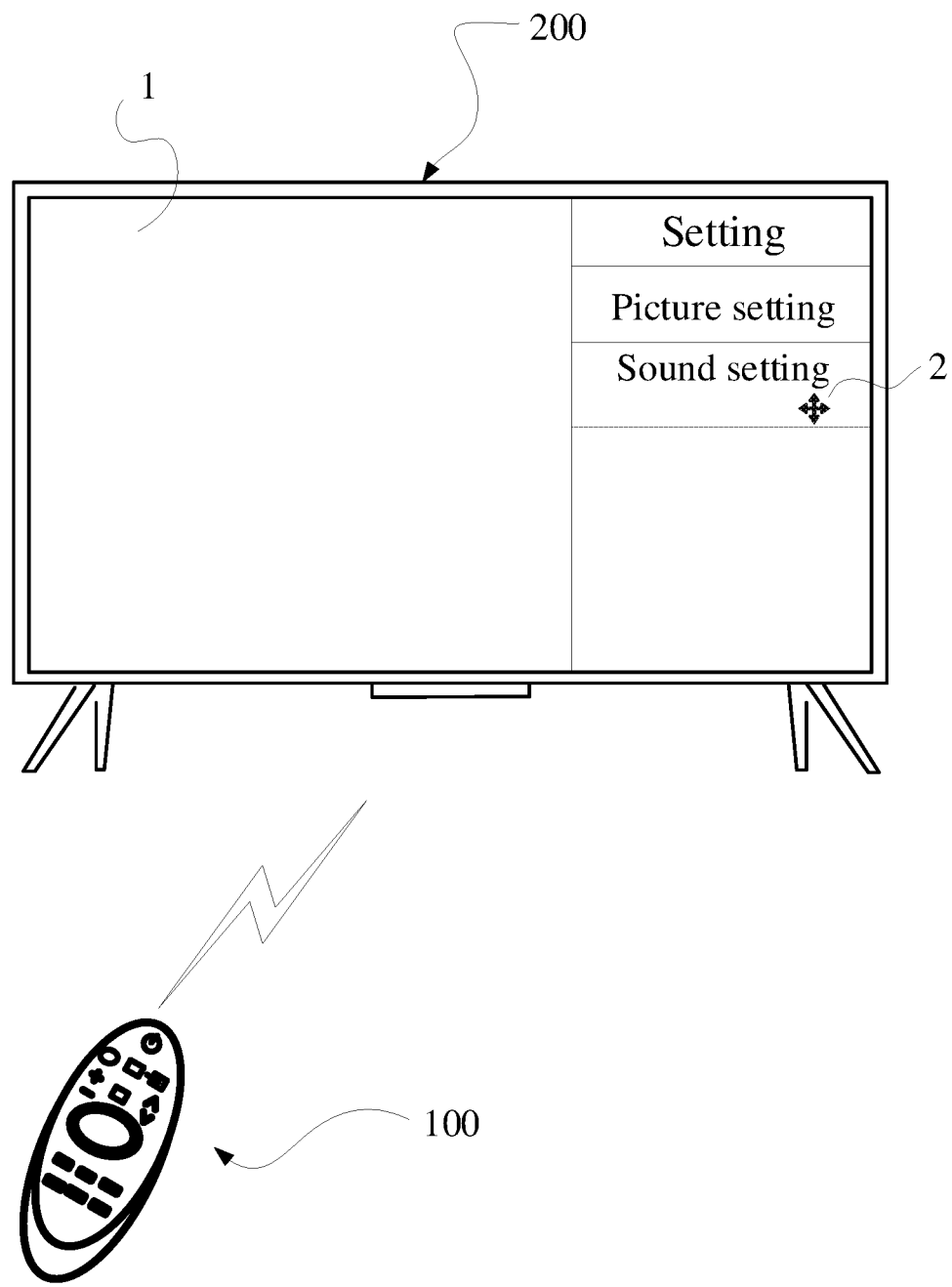
FIG. 11A is a schematic diagram of a command from a control device to a display apparatus in some embodiments of the present application.
Figure 11B:
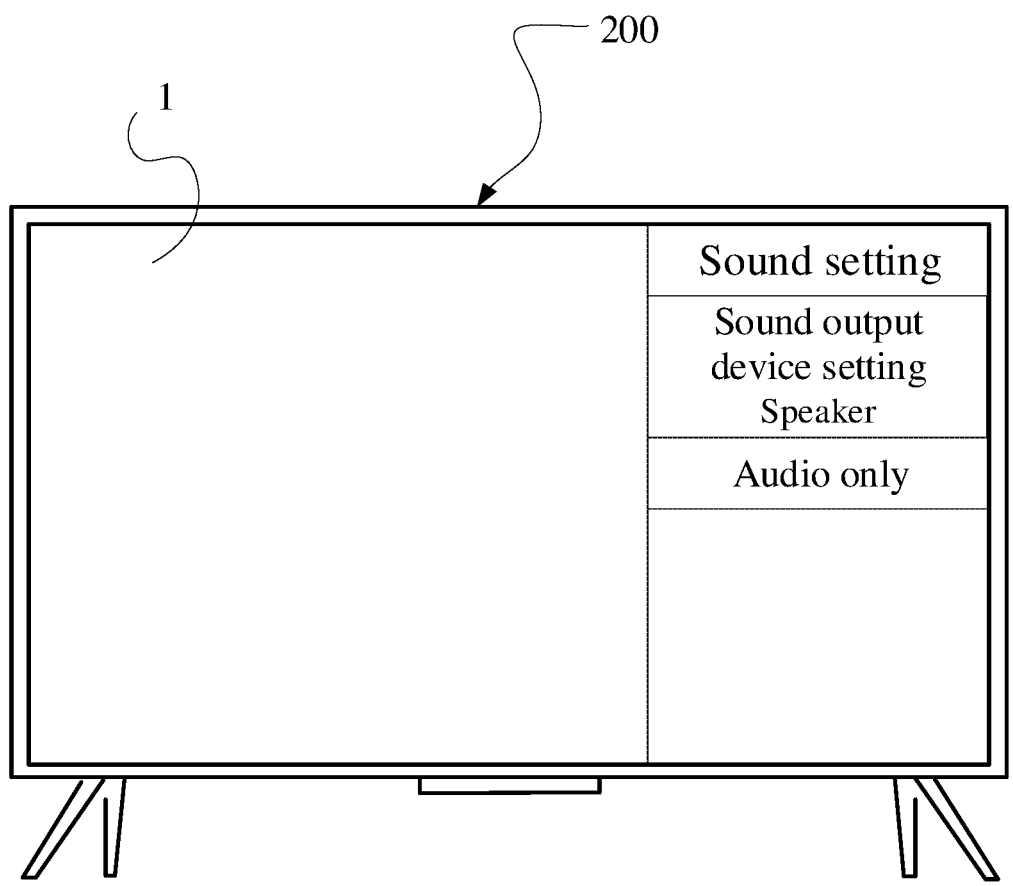
FIG. 11B is a schematic diagram of a sound setting menu of a sound output device setting option without a prompt identifier in some embodiments of the present application.

FIGS. 11A-11B are schematic diagrams of operations between a control device 100 and a display apparatus 200. An operation process shown in FIG. 11A is similar to that shown in FIG. 10A, which will not be repeated herein. A difference between FIG. 11B and FIG. 10B is that if the display apparatus 200 identifies one or more second sound output device, that is, the number of the second sound output devices is greater than 0, as shown in FIG. 11B, a sound output device setting option is normally displayed without prompt identifier for the sound setting menu, that is, no prompt identifier is displayed for the sound output device setting option. In this case, the sound output device setting option may be selected for switch.

Figure 12:
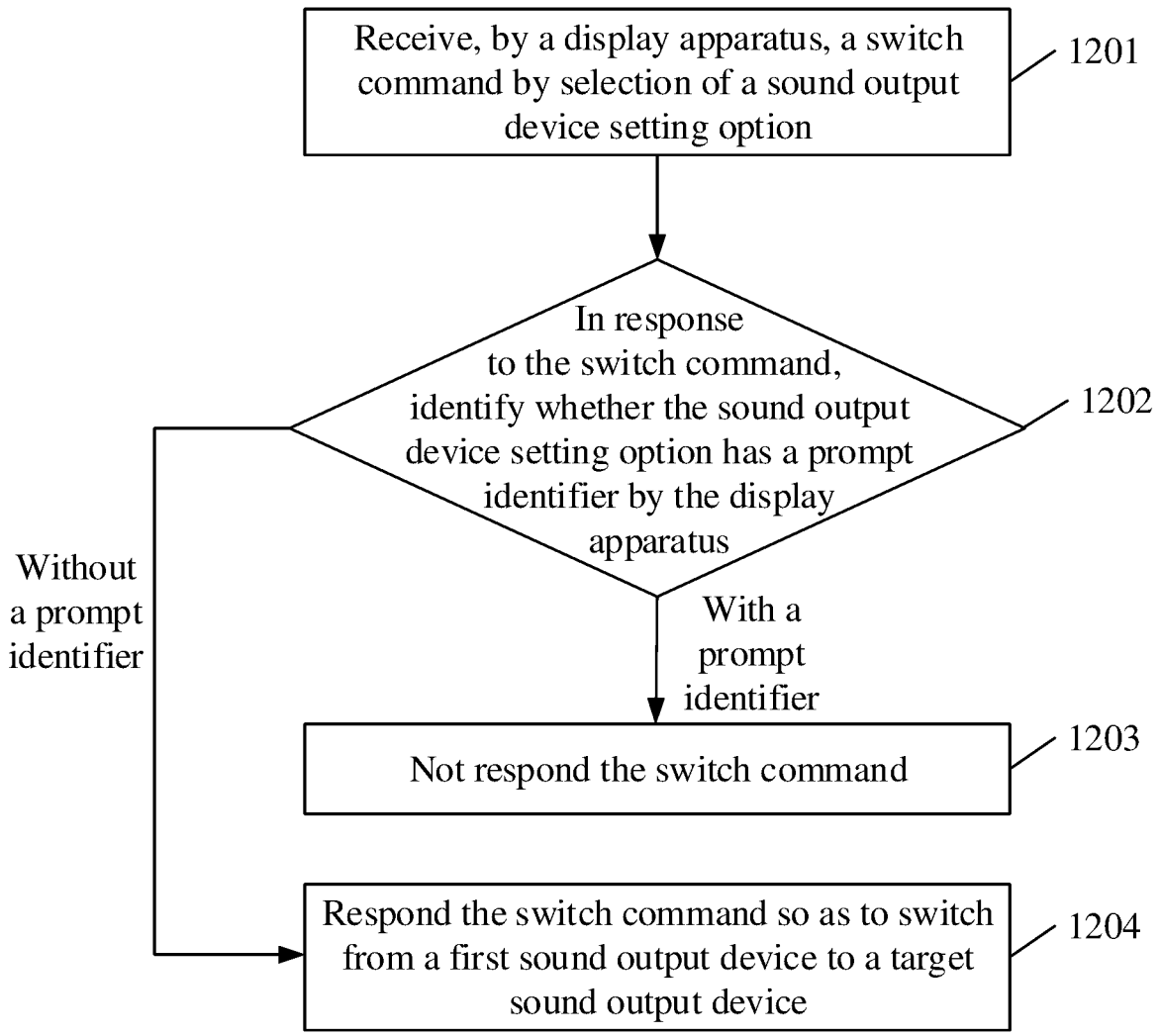
FIG. 12 is a schematic flow diagram of a display apparatus switching a sound output device in some embodiments of the present application.

Based on the above process, after the display apparatus 200 displays the sound setting menu, a user may continue a switching operation of the sound output device as required. FIG. 12 is a schematic flow diagram for displaying a user interface in a display apparatus 200.

1201, the display apparatus 200 receives a switch command by selection of a sound output device setting option.

1202, in response to the switch command, the display apparatus 200 identifies whether the sound output device setting option has a prompt identifier.

1203, in response to the sound output device setting option having a prompt identifier, the switch command is not responded, for example, no next-level menu of the sound output device setting option, that is, no sound output device setting menu, is displayed. Usually, the sound output device setting menu includes device options of a first sound output device and a second sound output device.

1204, in response to the sound output device setting option having no prompt identifier, the switch command is responded to switch from the first sound output device to a target sound output device. The target sound output device belongs to the second sound output device.

Figure 10C:
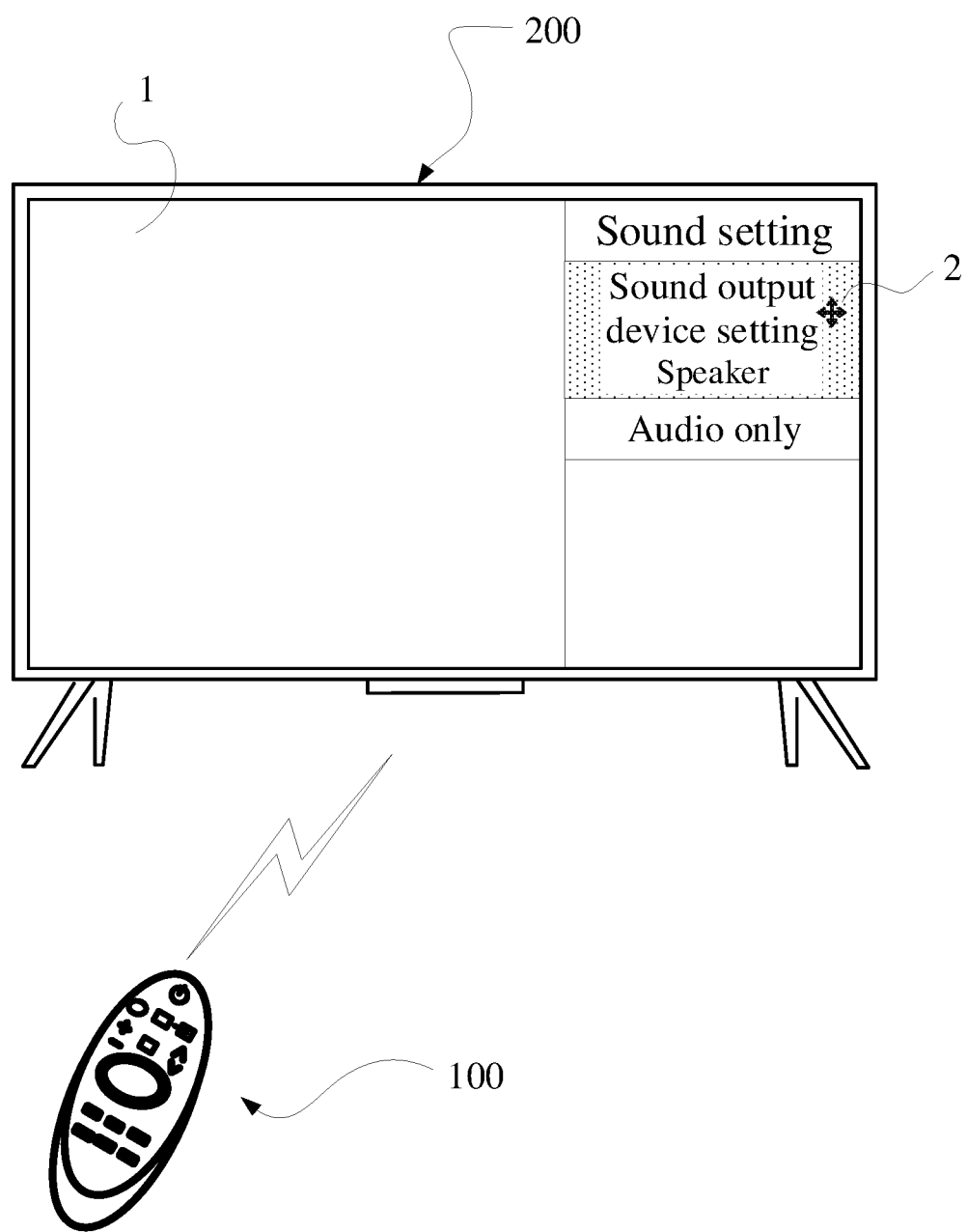
FIG. 10C is a schematic diagram of a first switch command from a control device to a display apparatus in some embodiments of the present application.
Figure 10D:
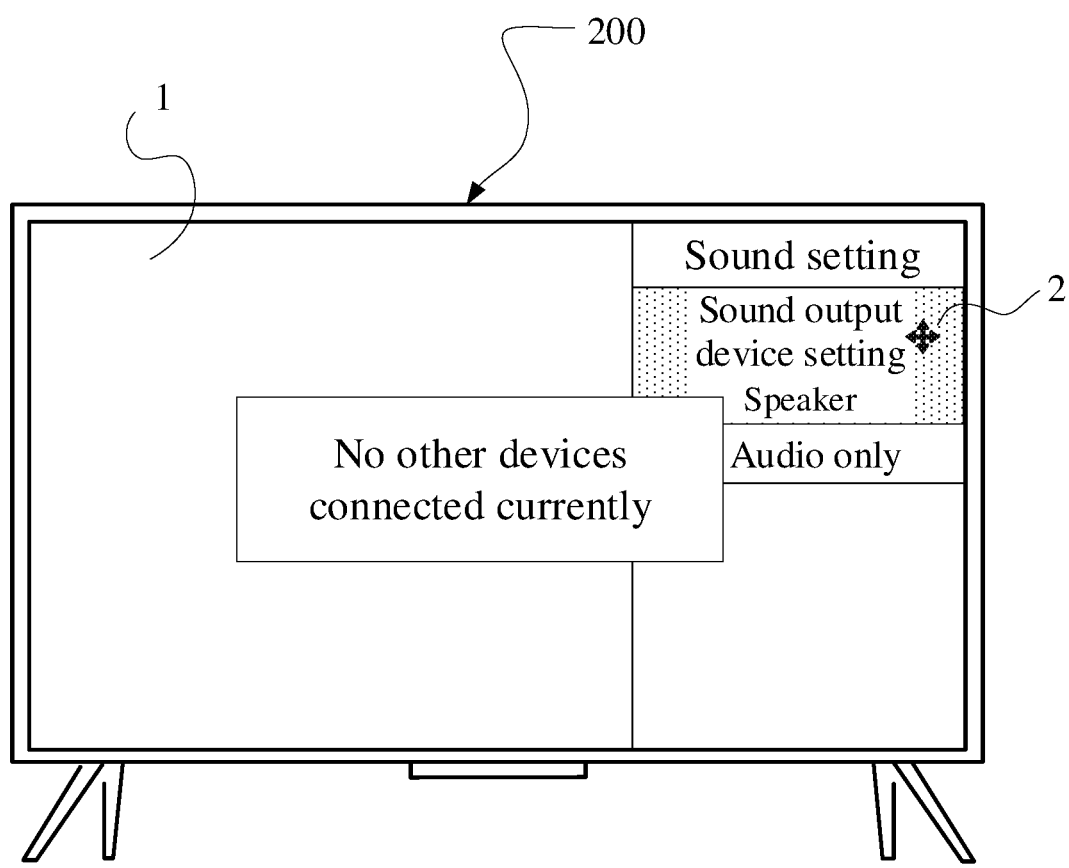
FIG. 10D is a schematic diagram of a display apparatus displaying prompt information in some embodiments of the present application.

In some embodiments, based on processes shown in FIGS. 10A-10B, FIGS. 10C-10G are schematic diagrams of operations between a control device 100 and a display apparatus 200. After the sound setting menu as shown in FIG. 10B is displayed, as shown in FIG. 10C, a first switch command is input to the display apparatus 200 by means of the control device 100, for example, a first switch command is input to the display apparatus 200 by operating a remote controller to move a tab 2 to a sound output device setting option and by selecting the sound output device setting option. In response to the first switch command, the display apparatus 200 identifies that the sound output device setting option has a prompt identifier. In this case, the display apparatus 200 does not display a sound output device setting menu, but still displays a current interface. In some embodiments, in order to prompt the user and correct misoperation from the user in time, as shown in FIG. 10D, the display apparatus 200 may generate prompt information and display the prompt information on the current interface. The prompt information may be text information, for example, "No other devices currently in connection with the display apparatus" as shown in FIG. 10D, or voice information.

Figure 10E:
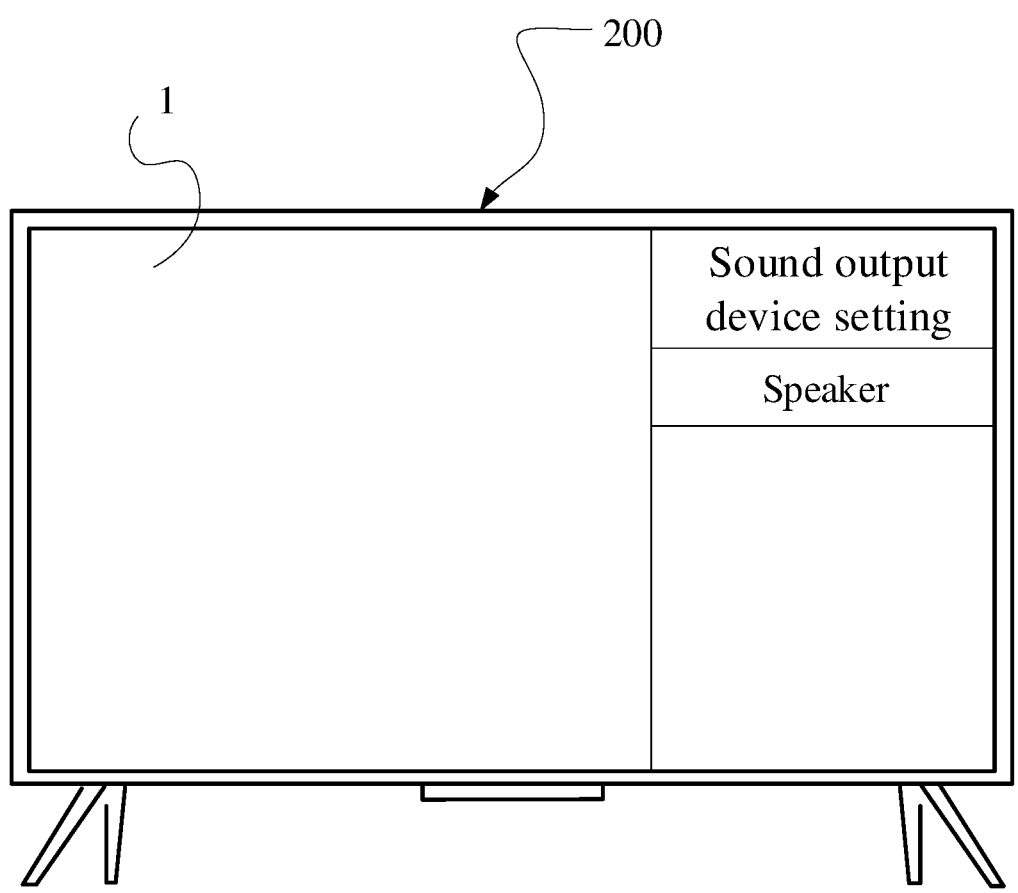
FIG. 10E is a schematic diagram of a display apparatus displaying a sound output device setting menu in some embodiments of the present application.
Figure 10F:
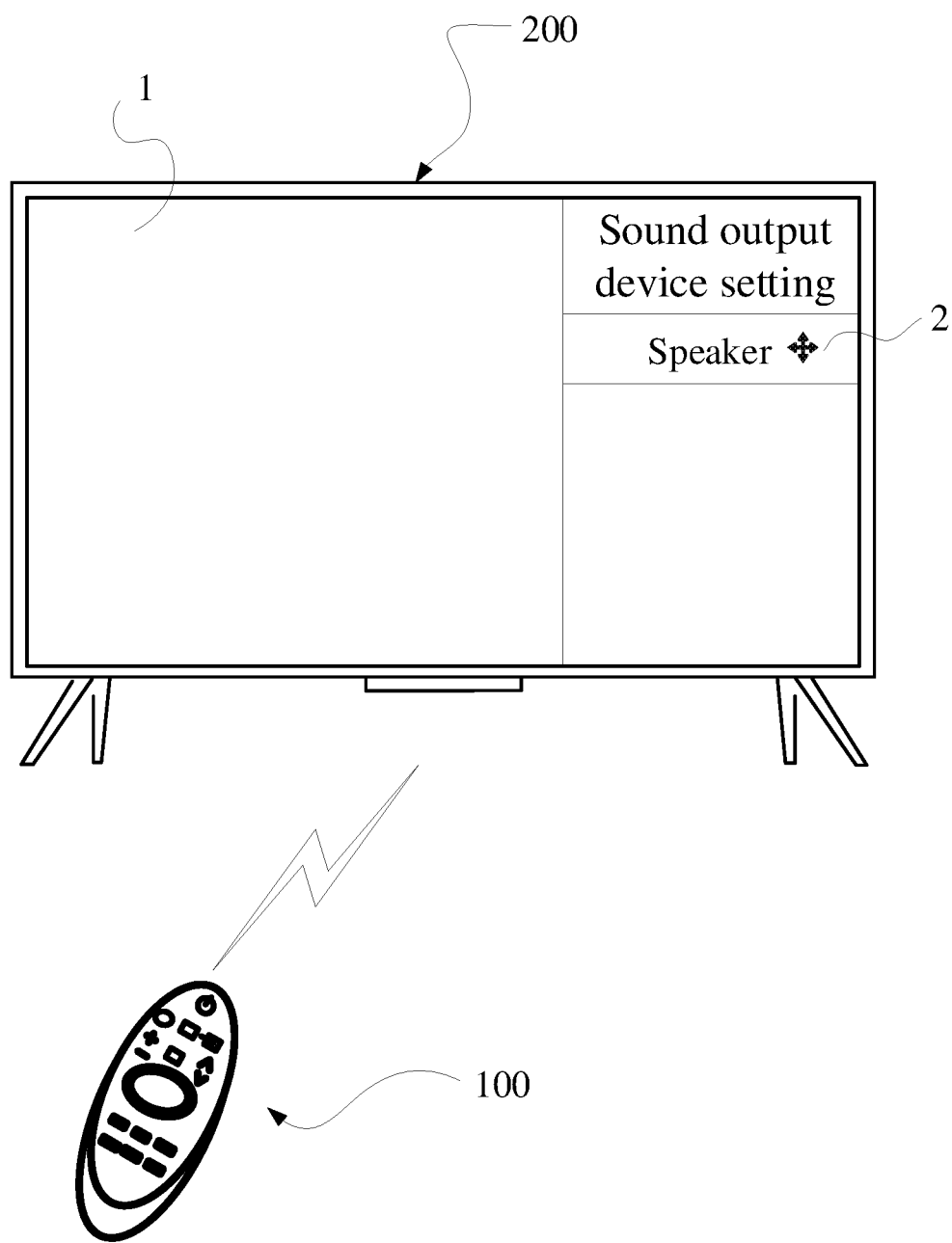
FIG. 10F is a schematic diagram of a second switch command from a control device to a display apparatus in some embodiments of the present application.
Figure 10G:
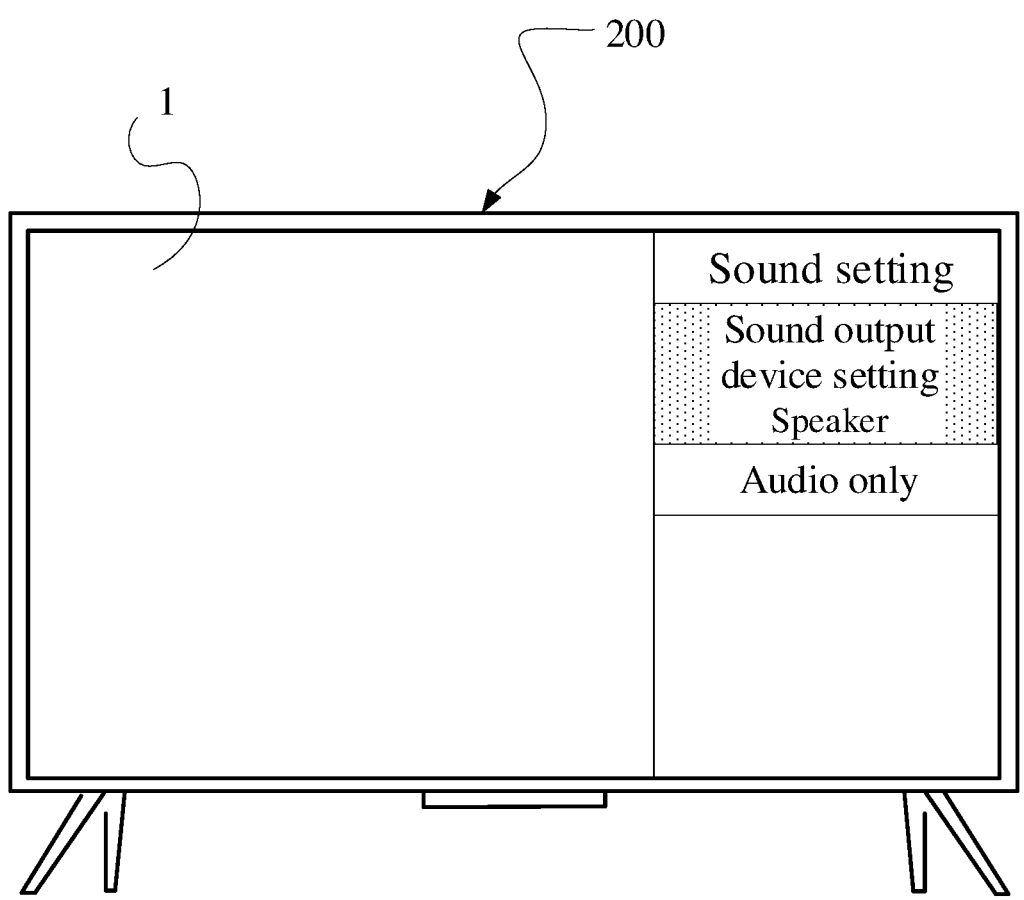
FIG. 10G is a schematic diagram of a display apparatus displaying a new sound setting menu in some embodiments of the present application.

In some embodiments, after displaying the prompt information, the display apparatus may respond to the first switch command, as shown in FIG. 10E, and display the sound output device setting menu. In this case, the sound output device setting menu merely includes a device name of a first sound output device, for example, a "speaker". As shown in FIG. 10F, the user may issue a second switch command to the display apparatus 200 by means of the control device 100, for example, continue using the first sound output device "speaker" by operating the remote controller to move the tab 2 to a speaker option. As shown in FIG. 10G, in response to the second switch command, the display apparatus 200 uses the first sound output device "speaker" and displays a new sound setting menu as shown in FIG. 10G. The new sound setting menu is the same as that in FIG. 10B.

In this way, the user merely needs to issue the second switch command once, and then the sound setting menu may be re-displayed for other operations, such that the number of operations for the user to return to the sound setting menu through a back operation (for example, the user issues a back instruction to the display apparatus 200 many times by means of the control device 100) may be reduced, then the number of interactions between the user and the display apparatus 200 may be reduced, and processing processes for the display apparatus 200 to respond to a plurality of back instructions may be reduced accordingly.

Figure 13:
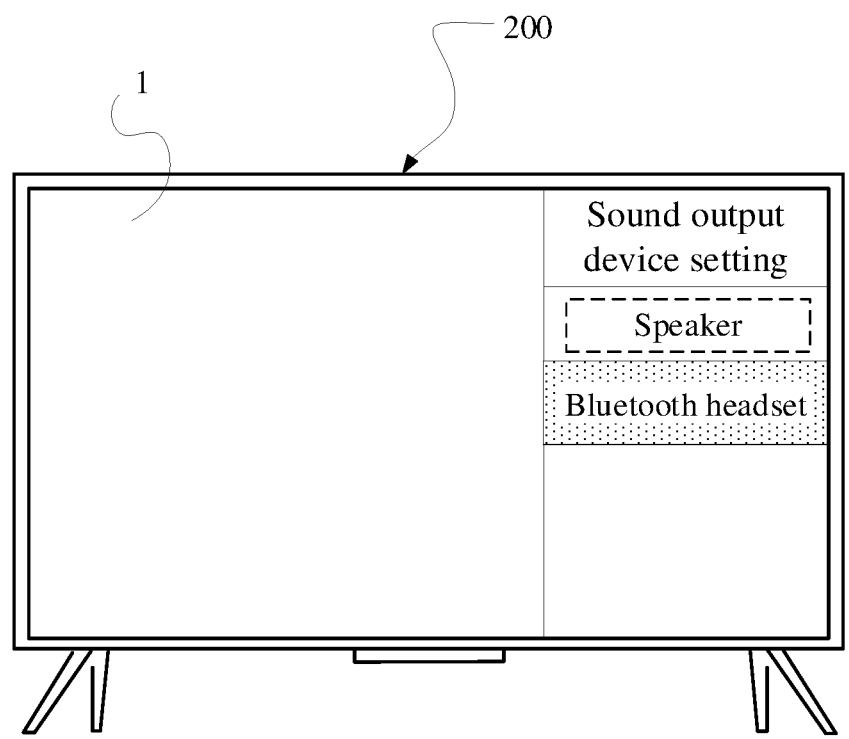
FIG. 13 is a schematic diagram of a sound output device setting menu with a third sound output device in some embodiments of the present application.

In some embodiments, as shown in FIG. 13, a sound output device setting menu includes not only a device option of a first sound output device, but also a device option of a third sound output device (such as a Bluetooth headset in FIG. 13). The third sound output device refers to a historical sound output device that is connected to the display apparatus 200 in the past but is no longer connected to the display apparatus 200 now. Because the third sound output device is currently unavailable, it is necessary to display an unavailable identifier, for example, graying (as shown in FIG. 13), a special symbol, a designated font color, a designated background color, etc., on the device option for the third sound output device. In this case, the user may know which sound output device is used in the past by browsing the device option of the third sound output device, such that a connection reference of sound output devices is provided for the user, and the user may quickly select an appropriate sound output device to connect with the display apparatus 200.

Figure 11C:
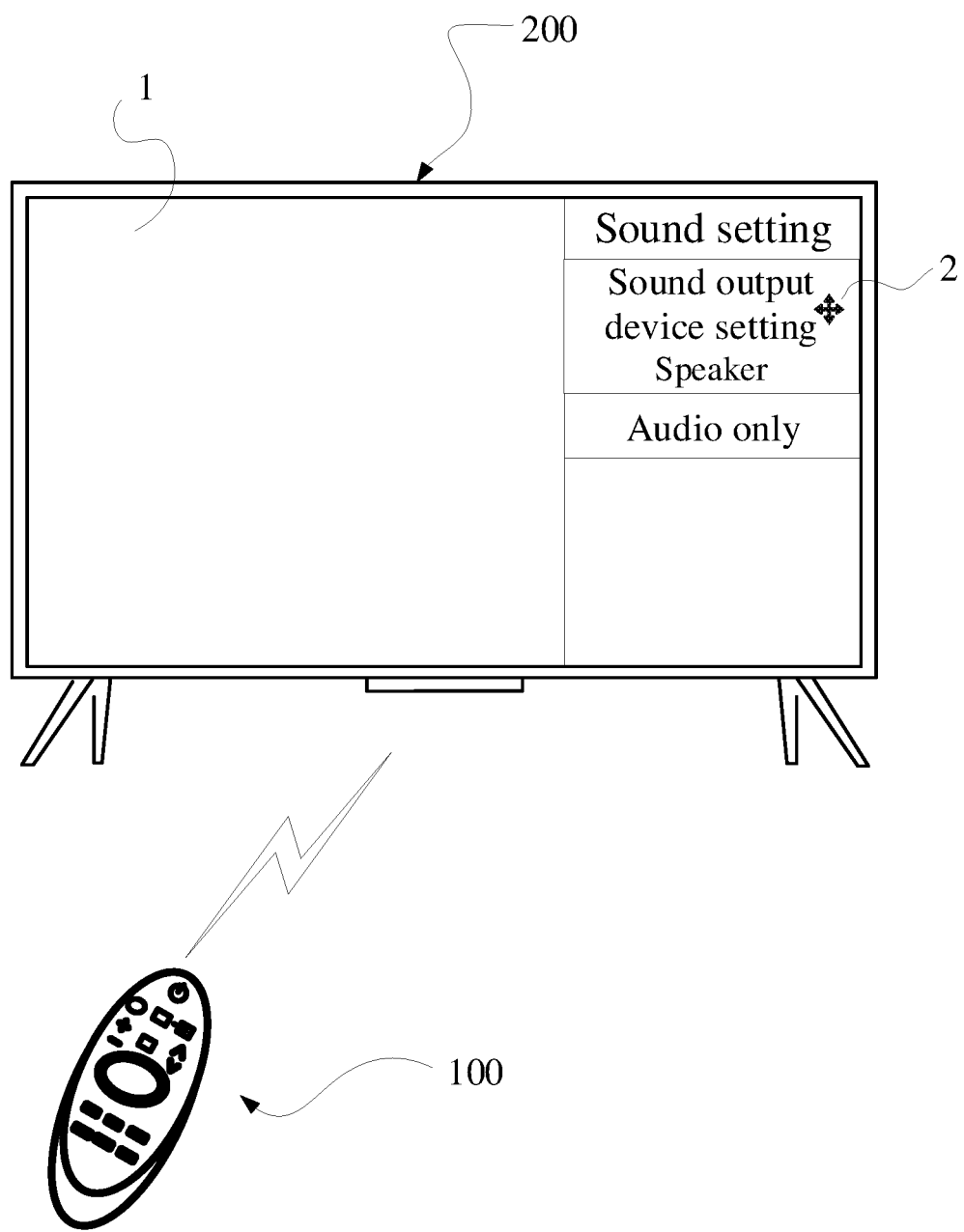
FIG. 11C is a schematic diagram of a first switch command from a control device to a display apparatus in some embodiments of the present application.
Figure 11D:
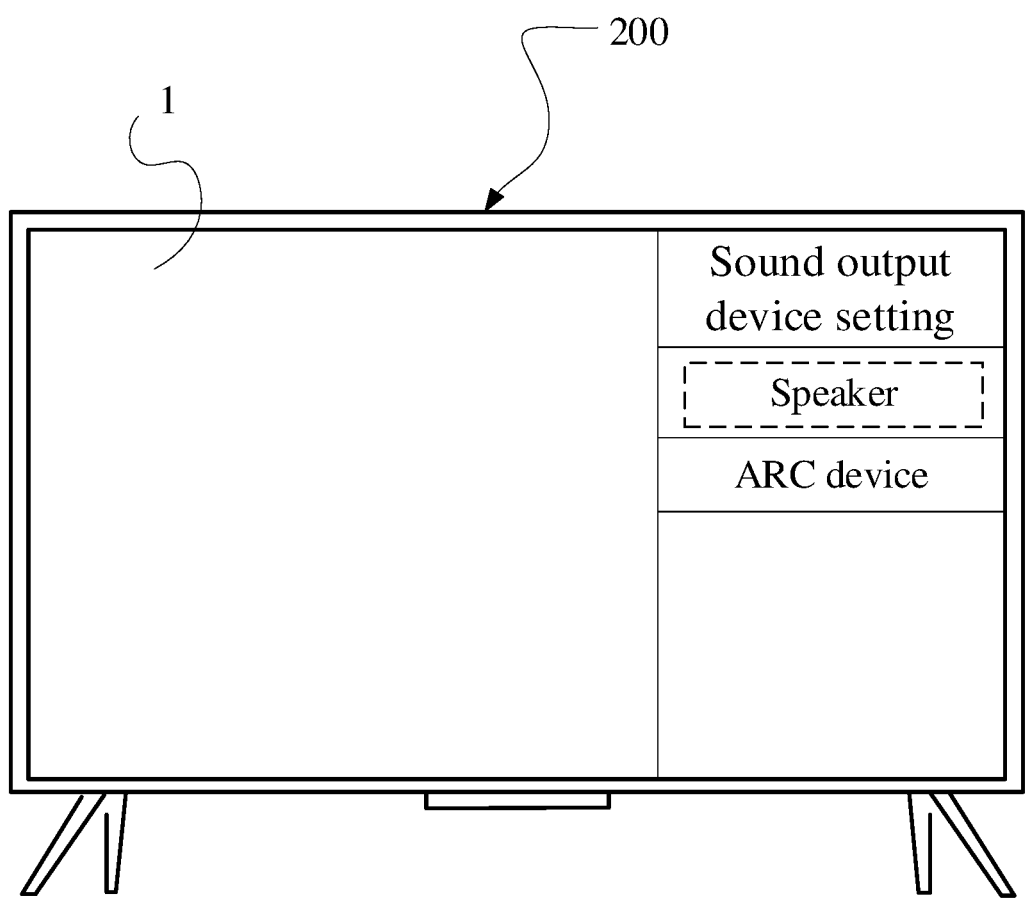
FIG. 11D is a schematic diagram of a display apparatus displaying a sound output device setting menu in some embodiments of the present application.
Figure 11E:
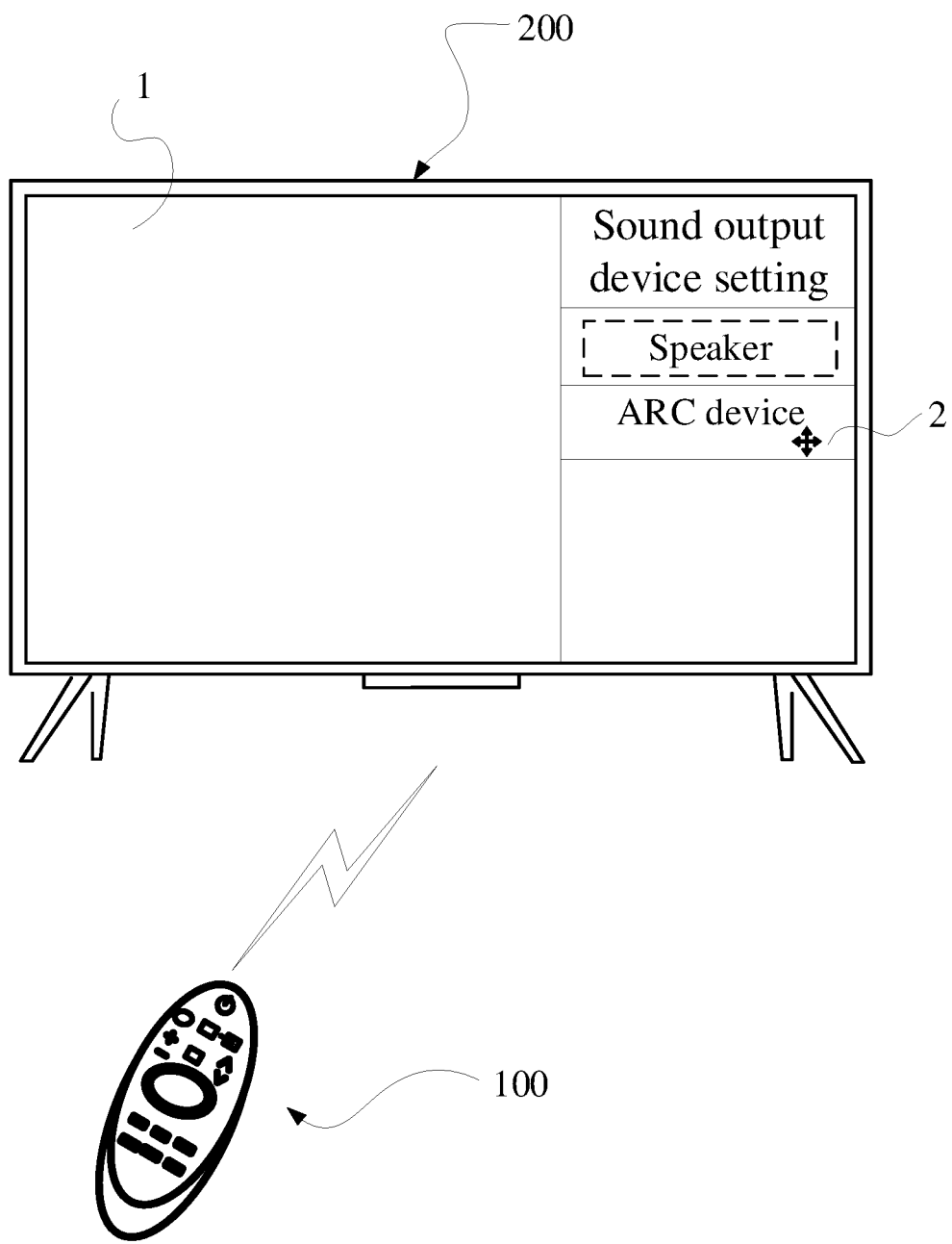
FIG. 11E is a schematic diagram of a second switch command from a control device to a display apparatus in some embodiments of the present application.
Figure 11F:
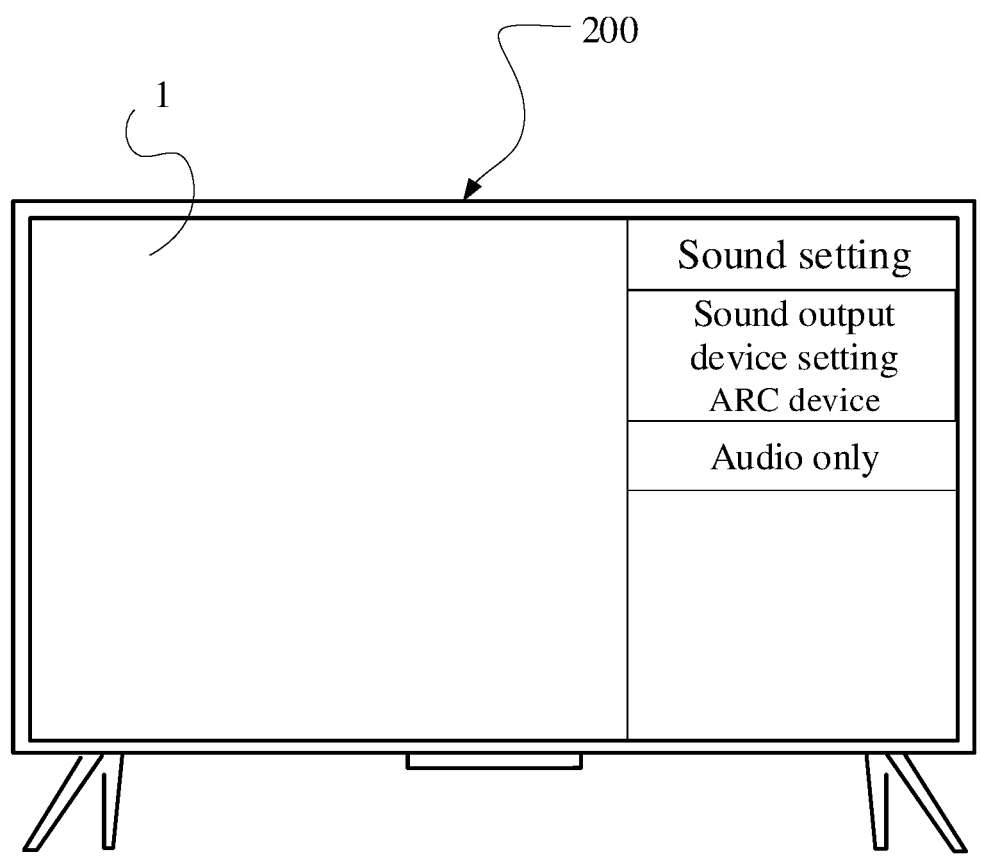
FIG. 11F is a schematic diagram of a display apparatus displaying a new sound setting menu in some embodiments of the present application.

In some embodiments, based on processes shown in FIGS. 11A-11B, FIGS. 11C-11F are schematic diagrams of operations between a control device 100 and a display apparatus 200. After the sound setting menu as shown in FIG. 11B is displayed, as shown in FIG. 11C, a user further issues a first switch command to the display apparatus 200 by means of the control device 100. Reference may be made to the process shown in FIG. 10C for the specific process, which will not be repeated herein. In response to the first switch command, the display apparatus 200 identifies that a sound output device setting option has no prompt identifier, and in response to the first switch command, the display apparatus 200 generates a sound output device setting menu as shown in FIG. 11D. In this case, the sound output device setting menu includes device options of a first sound output device and a second sound output device. For example, the first sound output device is a "speaker", and the first sound output device uses a dotted box as a prompt identifier, so as to remind the user that the sound output device is a sound output device currently used. Or, other prompt identifiers may be used to distinguish the first sound output device from the second sound output device. For example, the device option of the first sound output device uses a designated font color and a designated background color, and has a designated symbol, etc. As shown in FIG. 11D, the second sound output device includes an ARC device. As shown in FIG. 11E, the user may issue a second switch command to the display apparatus 200 by means of the control device 100, for example, by operating a remote controller to move a tab 2 to a device option of a target sound output device. In the embodiment, if the target sound output device is an ARC device, as shown in FIG. 11E, the tag 2 is moved to a device option of the ARC device, and the second switch command is input to the display apparatus 200 by selection of the device option. As shown in FIG. 11F, in response to the second switch command, the display apparatus 200 switches the first sound output device "speaker" to the target sound output device "ARC device", and displays a new sound setting menu as shown in FIG. 11F. A device name "ARC device" of a sound output device currently used is displayed on a sound output device setting option in the new sound setting menu, and meanwhile, the sound output device setting option is still in a normal state, that is, no prompt identifier is displayed, selection may be performed, the user may still switch the "ARC device" to the "speaker" by performing a process similar to that shown in FIGS. 11C-11F.

Figure 14:
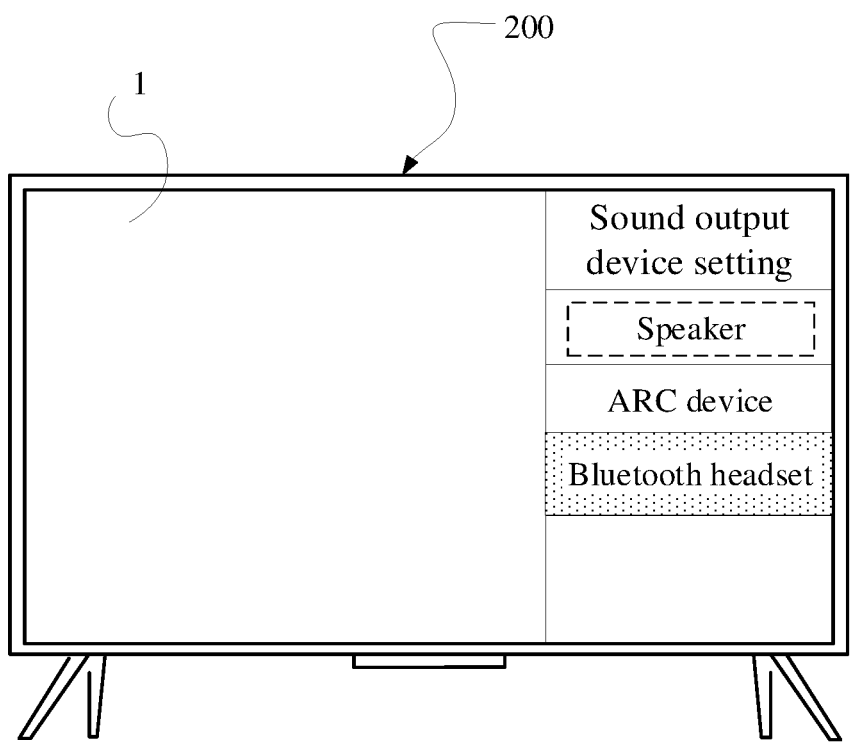
FIG. 14 is a schematic diagram of a sound output device setting menu with a third sound output device in some embodiments of the present application.

In some embodiments, as shown in FIG. 14, a sound output device setting menu includes not only device options of a first sound output device and a second sound output device, but also a device option of a third sound output device, and an unavailable identifier is displayed on the device option of the third sound output device. Reference may be made to the description in FIG. 12 for the unavailable identifier, which will not be repeated herein.

Figure 15:
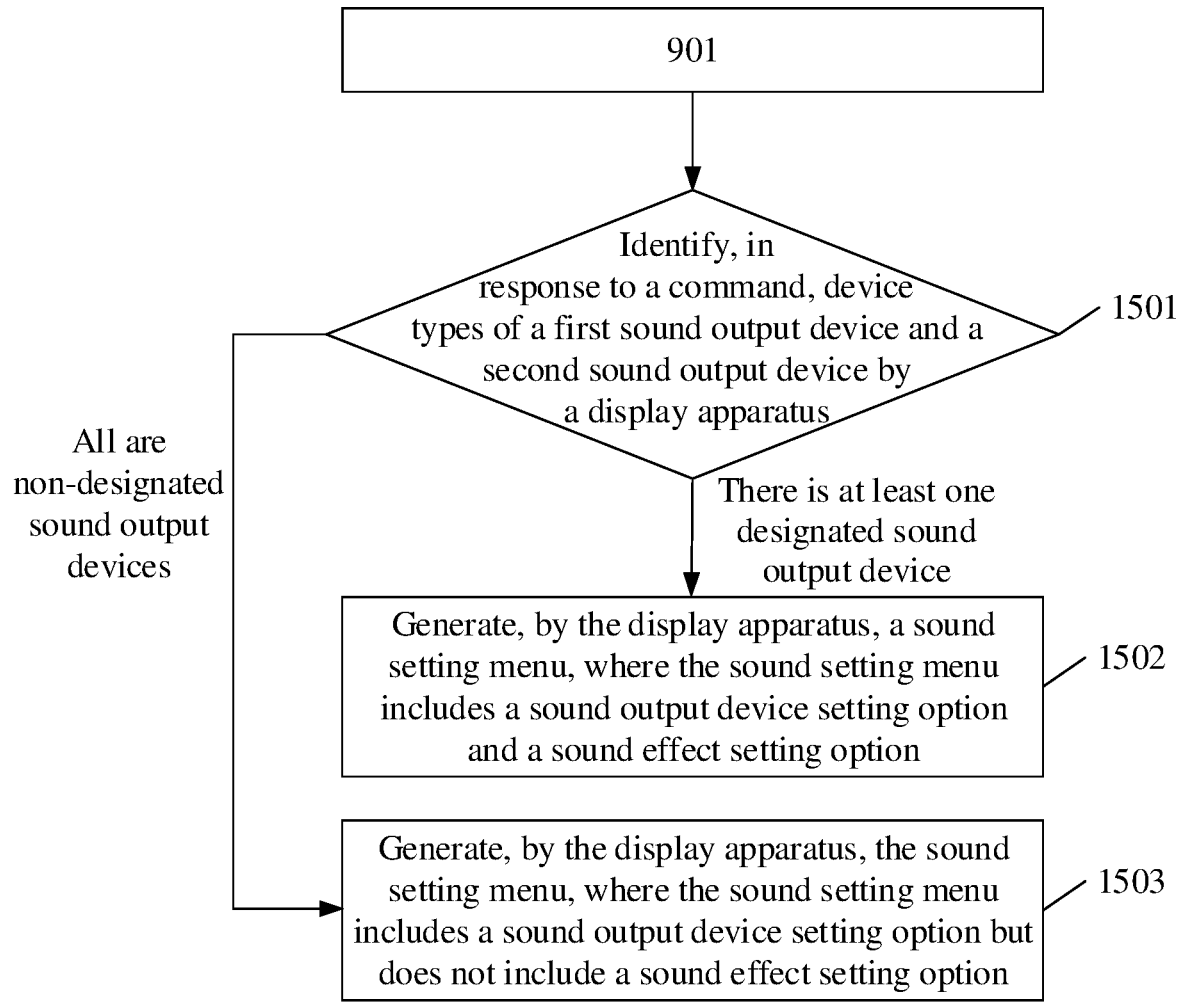
FIG. 15 is a schematic flow diagram of a display apparatus displaying a sound setting menu with a sound effect setting option in some embodiments of the present application.

FIG. 15 is a schematic flow diagram of a method for displaying a user interface in a display apparatus 200.

1501, in response to a command, the display apparatus 200 identifies device types of a first sound output device and a second sound output device.

1502, if a device type of at least one of the first sound output device or the second sound output device is a designated sound output device, the display apparatus 200 generates a sound setting menu, where the sound setting menu includes a sound output device setting option and a sound effect setting option. A user may quickly know that there is a sound output device whose sound effect parameter may be set in the first sound output device and the second sound output device, if there is a sound effect setting option displayed in the sound setting menu.

1503, if device types of both the first sound output device and the second sound output device are non-designated sound output devices, the display apparatus 200 generates the sound setting menu, where the sound setting menu merely includes a sound output device setting option but includes no sound effect setting option. The user may quickly know that there is no sound output device whose sound effect parameter may be set in the first sound output device and the second sound output device, if there is no sound effect setting option displayed in the sound setting menu.

Figure 16:
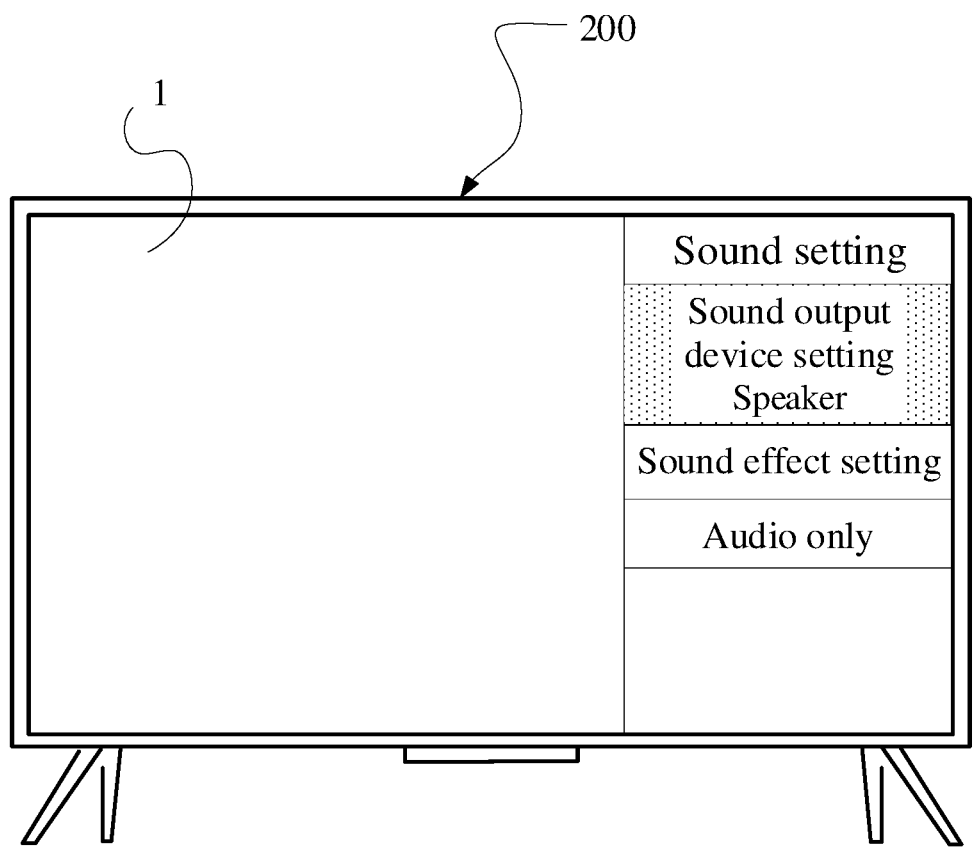
FIG. 16 is a schematic diagram of a sound setting menu with a sound effect setting option in some embodiments of the present application.
Figure 17:
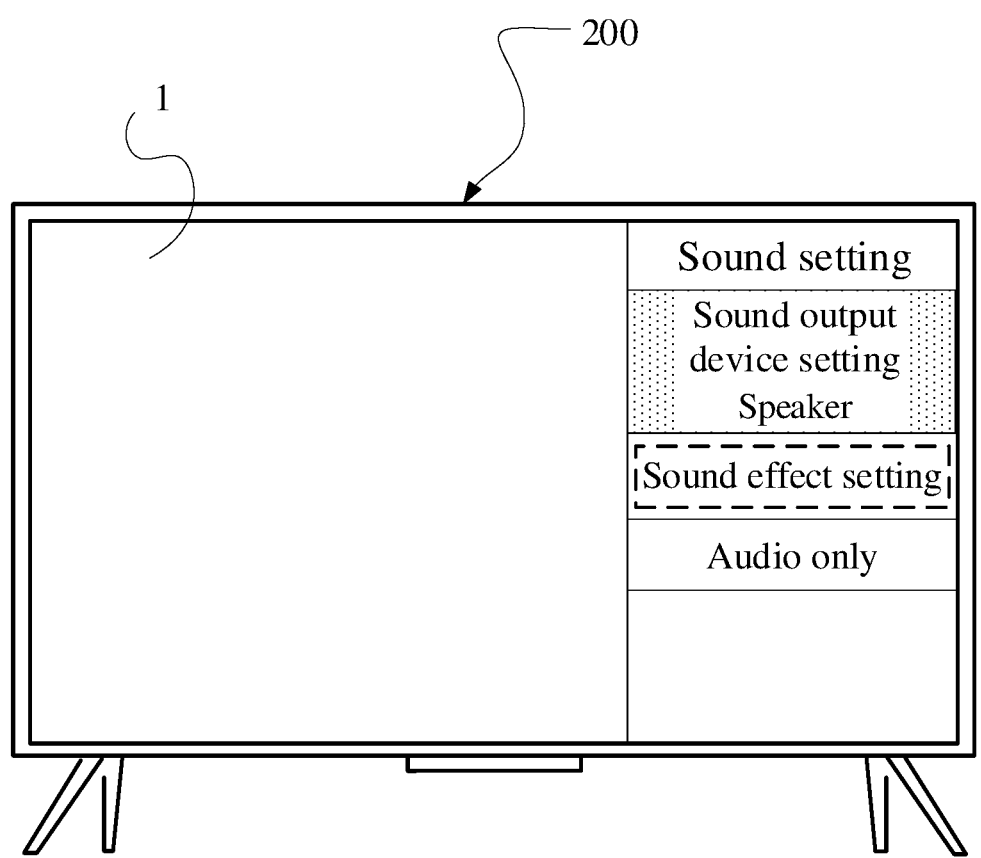
FIG. 17 is a schematic diagram of a sound setting menu with a hidden sound effect setting option in some embodiments of the present application.

Based on the processes shown in FIGS. 10A-10G, the display apparatus 200 responds to the command, since there is no second sound output device, it is merely necessary to identify the device type of the first sound output device, for example, the first sound output device is a speaker, and the display apparatus 200 identifies whether the speaker is a designated sound output device. For example, a protocol supported by an audio interface through which the speaker is in connection with the display apparatus 200 is identified, such that whether the protocol allows for adjusting sound effect parameters of the speaker by the display apparatus 200 is determined, and when the protocol allows for adjusting the sound effect parameters of the speaker by the display apparatus 200, the speaker is the designated sound output device. Otherwise, the speaker is a non-designated sound output device. The sound setting menu shown in FIG. 16 takes a speaker as a designated sound output device as an example. In this case, the sound effect setting option is displayed on the sound setting menu, so as to prompt the user that there is a sound output device whose sound effect parameters may be adjusted. For the embodiment, since a sound output device currently in connection with the display apparatus 200 is merely the first sound output device, the sound output device whose sound effect parameters may be adjusted is the first sound output device. If the display apparatus 200 identifies that the device type of the first sound output device is a non-designated sound output device, it is unnecessary to display the sound effect setting option on the sound setting menu. In this case, the sound setting menu as shown in FIG. 10B may be displayed so as to prompt the user that there is no sound output device whose sound effect parameters may be adjusted currently. Since the sound output device currently in connection with the display apparatus 200 is merely the first sound output device, the sound effect parameters of the first sound output device cannot be adjusted. In some embodiments, the sound effect setting option in the sound setting menu is a default option, that is, the sound effect setting option is displayed on the sound setting menu by default. For example, in the sound setting menu shown in FIG. 16, only when there is no sound output device whose sound effect parameters may be adjusted currently, the sound effect setting option is hidden before the sound setting menu is displayed. For example, a layer is overlaid on the sound effect setting option, and a color of the layer is the same as a background color of the sound setting menu (as shown in FIG. 17, the sound effect setting option overlaid by the layer is indicated by a dotted line), such that a hidden effect is achieved. Reference may be made to FIG. 10B for the sound setting menu actually seen by the user.

Figure 18:
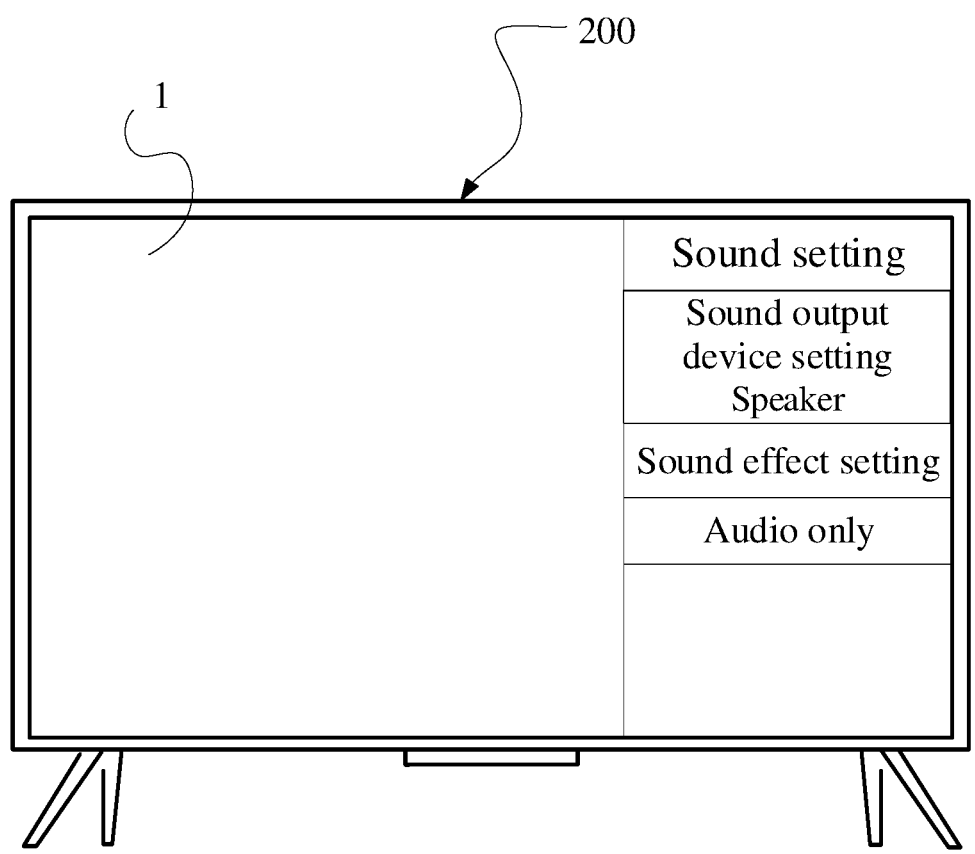
FIG. 18 is a schematic diagram of a sound setting menu including a sound effect setting option without an unavailable identifier in some embodiments of the present application.

Based on the processes shown in FIGS. 11A-11F, in response to the command from the user, the display apparatus 200 identifies the device types of the first sound output device and the second sound output device. For example, the first sound output device is a speaker, the second sound output device is an ARC device, and the sound setting menu is generated according to an identification result including information about the first sound output device and the second sound output device. In some embodiments, both the speaker and the ARC device are designated sound output devices, and alternatively, the first sound output device is a speaker and the second sound output device is a Bluetooth headset, where the speaker is a designated sound output device and the Bluetooth headset is a non-designated sound output device, which indicates that there is a sound output device whose sound effect parameters may be adjusted in sound output devices currently in connection with the display apparatus 200, such that the display apparatus 200 displays the sound setting menu as shown in FIG. 18. The sound setting menu includes a sound output device setting option and a sound effect setting option, where the sound effect setting option may prompt that there is a sound output device whose sound effect parameters may be adjusted in the first sound output device and the second sound output device. In some embodiments, if both the speaker and the ARC device are non-designated sound output devices, the display apparatus 200 may display the sound setting menu as shown in FIG. 11B, that is, no sound effect setting menu is displayed in the sound setting menu.

Figure 19:
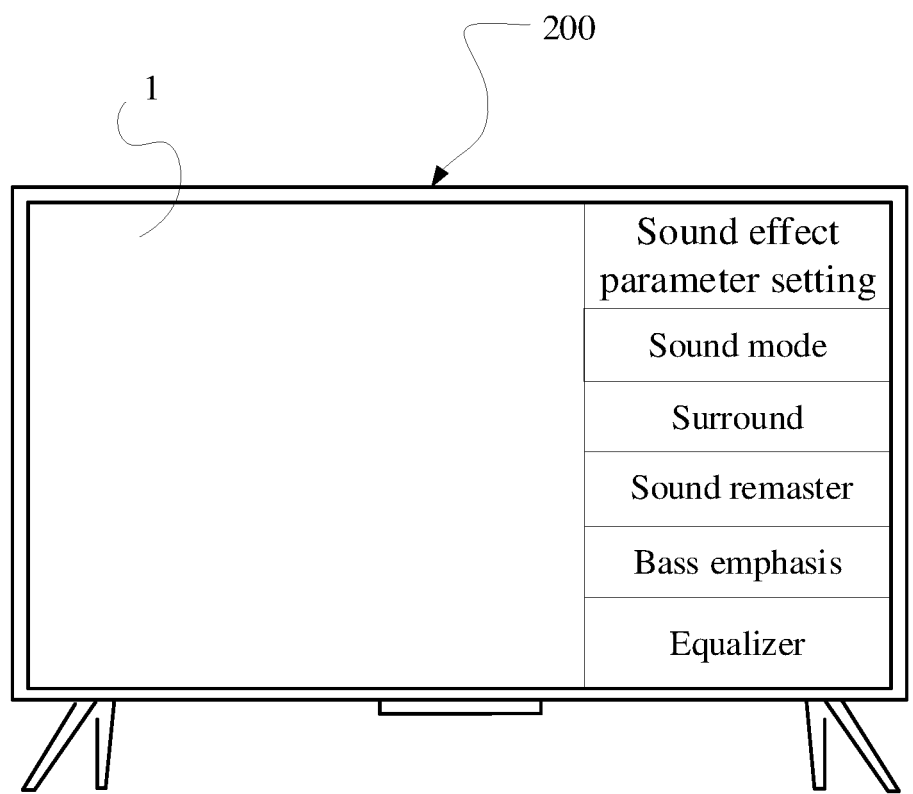
FIG. 19 is a schematic diagram of a sound effect parameter setting menu in some embodiments of the present application.

The presence or absence of the sound effect setting option on the sound setting menu may prompt a user whether there is a sound output device whose sound effect parameters may be adjusted currently. Furthermore, when the sound effect setting option is displayed on the sound setting menu, the displayed sound effect setting option is specifically configured to adjust the sound effect parameters of the sound output device currently used, that is, a sound effect parameter setting menu is entered by selecting the sound effect setting option. The sound effect parameters displayed in the sound effect parameter setting menu all correspond to sound settings currently used. For example, when receiving a command, the display apparatus 200 identifies that the first sound output device speaker and the second sound output device ARC device are both designated sound output devices, and then, as shown in FIG. 18, the sound effect setting option is displayed on the sound setting menu. Furthermore, the display apparatus 200 identifies whether the first sound output device, i.e., the speaker, is the designated sound output device. In some embodiments, when the first sound output device is the designated sound output device, as shown in FIG. 18, a standard sound effect setting option is displayed on the sound setting menu, that is, the sound effect setting option is available to be selected, and a sound effect parameter setting menu may be entered, so as to adjust sound effect parameters of the first sound output device. For example, the user issues a first parameter adjustment instruction to the display apparatus 200 by the control device 100, and in response to the first parameter adjustment instruction, the display apparatus 200 displays the sound effect parameter setting menu as shown in FIG. 19. The sound effect parameter setting menu includes a plurality of sound effect parameters, such as a sound mode, surround, sound remaster, bass emphasis, and equalizer. The user issues a second parameter adjustment instruction to the display apparatus 200 by means of the control device 100, and in response to the second parameter adjustment instruction, the display apparatus 200 sets a sound effect parameter as a target sound effect parameter.

Figure 20:
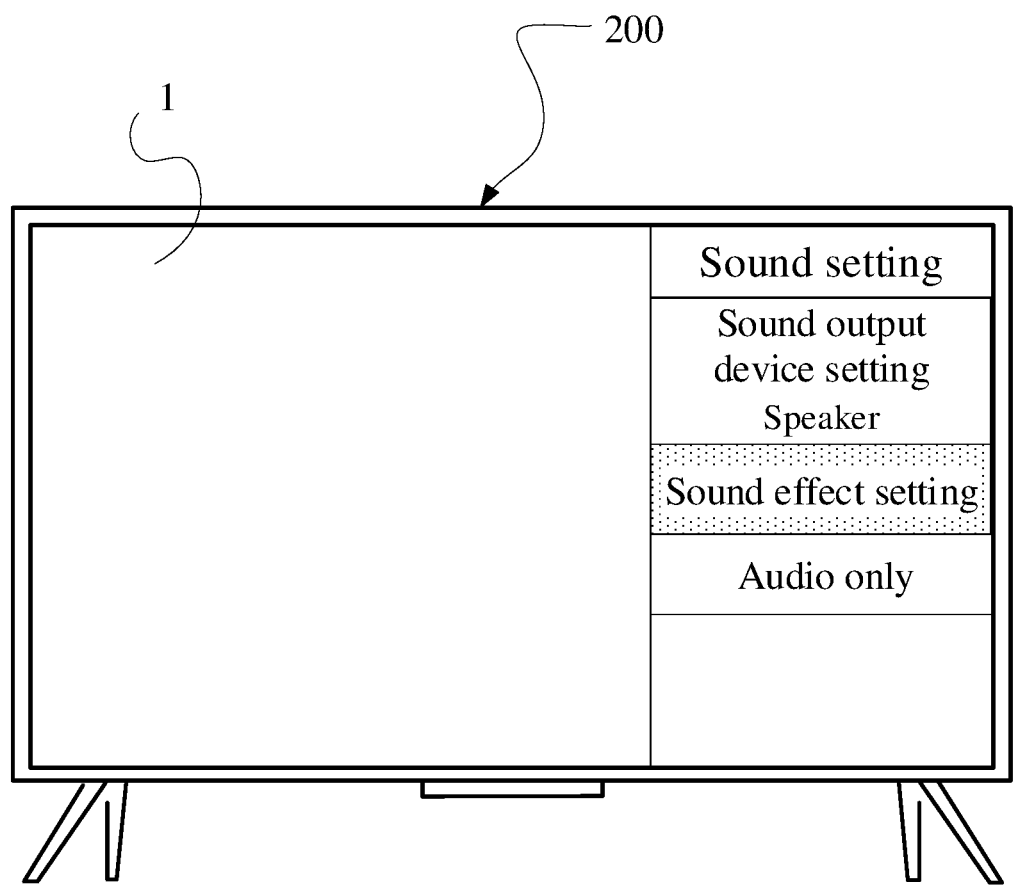
FIG. 20 is a schematic diagram of a sound setting menu including a sound effect setting option with an unavailable identifier in some embodiments of the present application.

In some embodiments, when the first sound output device is a non-designated sound output device, an identifier for indicating not available for selection is displayed on the sound effect setting option. For example, as shown in FIG. 20, the sound effect setting option is grayed, or, the sound effect setting option uses a designated font color, the sound effect setting option uses a designated background color, or a special identifier is added to the sound effect setting option, so as to prompt the user that sound effect parameters of the first sound output device cannot be adjusted. Further, if the user issues a first parameter adjustment instruction mistakenly through the sound effect setting option, the display apparatus 200 may display prompt information, such as "sound effect parameters cannot be adjusted currently", so as to prompt the user that the sound effect parameters of the first sound output device cannot be adjusted.

The process that the display apparatus 200 switches the first sound output device to the target sound output device in response to a switch command further includes the display apparatus 200 identifies whether a target sound output device (ARC device) is a designated sound output device. In some embodiments, when the target sound output device is the designated sound output device, the sound effect setting option without the identifier for indicating not available for selection is displayed on the sound setting menu, as shown in FIG. 18, where a device name of the target sound output device is displayed on the sound output device setting option, the sound effect setting option is available for selection, and the sound effect setting option is specifically configured to adjust sound effect parameters of the target sound output device. Reference may be made to the process corresponding to FIG. 19 for the process of displaying the sound effect setting option and the process of adjusting the sound effect parameters of the target sound output device.

In some embodiments, when the target sound output device is the non-designated sound output device, the identifier for indicating not available for selection is displayed on the sound effect setting option, which indicates that the sound effect parameters of the target sound output device cannot be adjusted, as shown in FIG. 20, where the device name of the target sound output device is displayed for the sound output device setting option.

According to the display apparatus and the method for setting a sound output device provided in the above embodiments, when the user sets a sound output device, the prompt identifier is displayed on the sound output device setting option in the sound setting menu, so as to prompt the user that there is no sound output device that may be switched to currently, the sound effect setting option is displayed on the sound setting menu, so as to prompt the user that there is a sound output device whose sound effect parameters may be adjusted in the sound output devices currently connected, and an unavailable identifier is displayed on the sound effect setting option, so as to prompt the user that the sound effect parameters of the sound output device currently used cannot be adjusted. In this way, the user may quickly determine a further operation of setting the sound output device by browsing the sound setting menu, so as to avoid unnecessary operations for the user.

The display apparatus in the embodiments of the present application not only allows for setting sound output device and sound effect parameters, but also allows for setting a target sound mode. During setting of a target sound mode, whether current sound effect parameters of at least one context menu corresponding to the target sound mode are default values may be detected, and when the current sound effect parameters of at least one context menu are not default values, the prompt identifier is displayed on the sound setting menu, such that the user may directly and quickly know that the target sound mode is set as non-default according to the prompt identifier. The reset option and the restore option may be displayed, such that the user is able to use a reset function for resetting a sound effect parameter of a context menu to a default value and a restore function for restoring a sound effect parameter of a context menu to a designated sound effect parameter.

Figure 21:
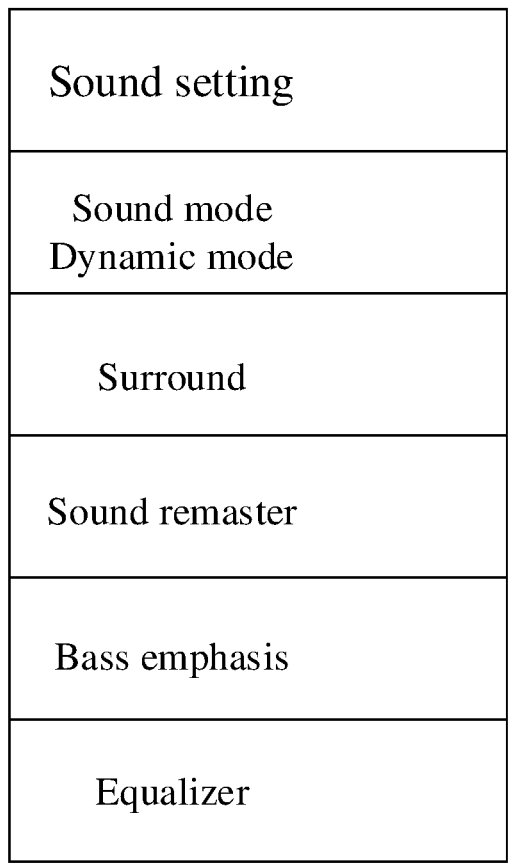
FIG. 21 is a schematic diagram of an interface of a sound setting menu in some embodiments of the present application.

In some embodiments, a processor 250 decodes audio data to be played according to a set sound mode, so as to obtain audio data with a sound effect. The user may control the display apparatus 200 to display the sound setting menu by the control device 100 or an intelligent device 300. In some embodiments, the sound setting menu may be as shown in FIG. 21, and the sound setting menu includes a sound mode menu and a plurality of context menus corresponding to the sound mode menu. FIG. 21 is an example of a sound setting menu. As shown in FIG. 21, if a sound mode currently used is a dynamic mode, a name "dynamic mode" and related menus, such as surround, sound remaster, bass emphasis and equalizer, associated with the dynamic mode is displayed on the sound setting menu.

Figure 22:
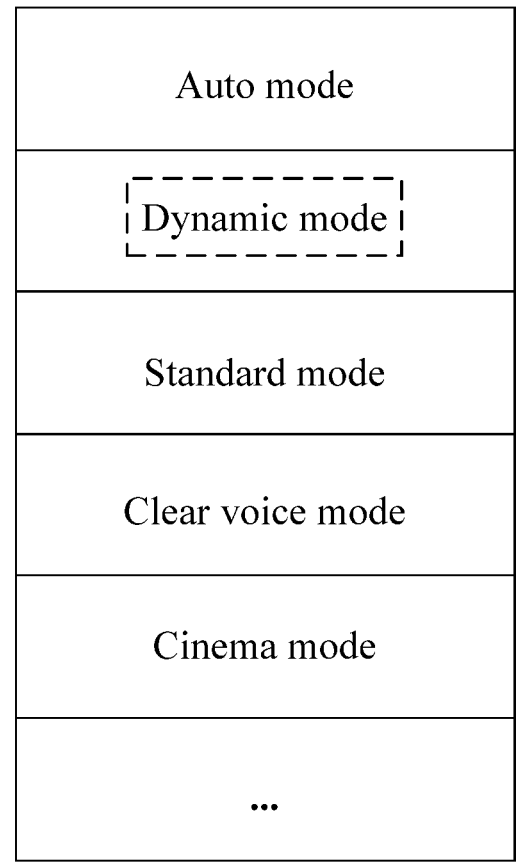
FIG. 22 is a schematic diagram of an interface of a next-level menu of a sound mode menu in some embodiments of the present application.

The sound mode menu is configured to set sound modes. The sound modes may include an auto mode, a dynamic mode, a standard mode, a clear voice mode, a cinema mode, etc. When the sound mode menu is selected. a next-level menu in the sound mode menu is entered. As shown in FIG. 22, the next-level menu of the sound mode menu includes options corresponding to the above sound modes, such as the auto mode, the dynamic mode, the normal mode, the clear voice mode, the cinema mode, or other sound modes. The user selects different options so as to set sound modes corresponding to the different options. After a sound mode is set, a name of a sound mode currently used may be displayed on the sound mode menu. As shown in FIG. 21, a current sound mode is a dynamic mode, and the "dynamic mode" is displayed on the sound mode menu.

Figure 23:
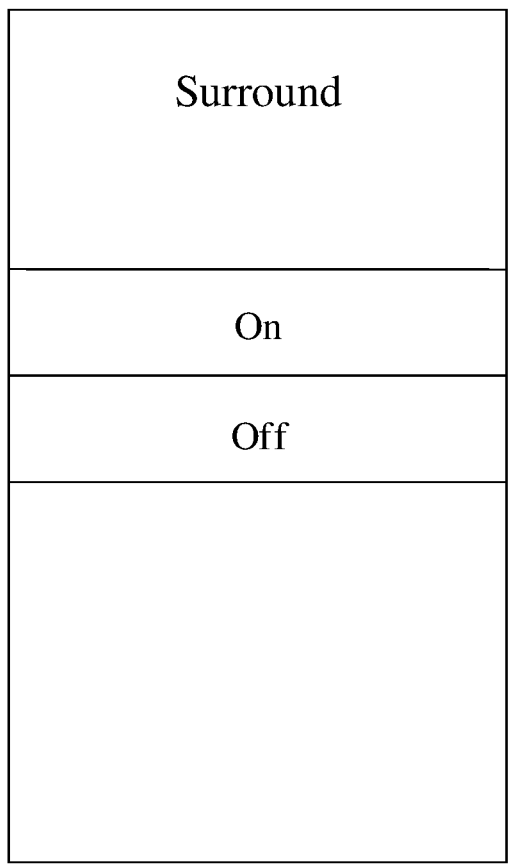
FIG. 23 is a schematic diagram of an operation interface of surround sound effect parameters in some embodiments of the present application.
Figure 24:
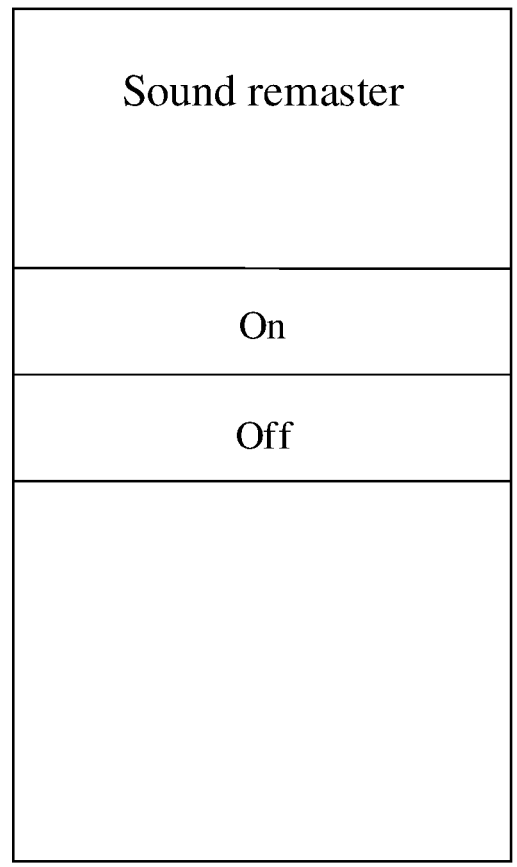
FIG. 24 is a schematic diagram of an operation interface of sound effect parameters of sound remaster in some embodiments of the present application.

The context menu is configured to set sound effect parameters corresponding to the sound mode. The context menu may include surround, sound remaster, bass emphasis, equalizer, etc. An operation interface of corresponding sound effect parameters is displayed on a next-level menu of a context menu. As shown in FIG. 23, an operation interface of sound parameters of the surround includes two options: on and off. As shown in FIG. 24, an operation interface of sound effect parameters of the sound remaster includes two options: on and off. As shown in FIG. 25, an operation interface of sound effect parameters of the bass emphasis includes two options: strong and weak, and the user may set a bass emphasis effect by selecting an option. As shown in FIG. 26, an operation interface of sound effect parameters of the equalizer includes five wavebands: 10 kHz, 4 kHz, 1.5 kHz, 500 Hz, and 150 Hz, and the user may set audio of the waveband by adjusting an option of a waveband. After setting sound effect parameters of a context menu by selection of options shown in the operation interface, the user may obtain the sound setting menu as shown in FIG. 27, that is, a specific sound effect parameter may be displayed on the context menu. For example, the surround sound effect parameter is off in FIG. 27. Certainly, other methods for displaying sound effect parameters may also be used. For example, specific sound effect parameters do not need to be displayed on each context menu, but need to be displayed on the operation interface of the sound effect parameters.

Each sound mode has a default configuration. When the sound mode is the default configuration, each of context menus corresponding to the sound mode are configured as a default value, that is, a sound effect parameter of the context menu is configured as a default value. The default value may be set by a manufacturer or customized by the user. When the sound mode is set as default, a better sound effect is achieved. Therefore, when the user uses the sound mode, the default value of the sound mode is usually recommended.

However, in some embodiments, for some audio data having special playing demands, for example, in the dynamic mode, a default value of bass emphasis is "weak". If the user needs to enhance a bass emphasis effect, a sound effect parameter of the bass emphasis may be set as "strong". In this case, the bass emphasis is not set as a default value, and accordingly, the dynamic mode in this case is also not set as default.

Generally, the display apparatus may store a sound effect parameter after a setting of a sound mode, and if the sound mode is used again, the sound effect parameter corresponding to the sound mode stored previously may be automatically used. In some embodiments, for example, when the user uses a dynamic mode this time, the user does not change a default value corresponding to a context menu, which is the default value of the dynamic mode used by the user this time, and then the display apparatus may store the default value of the dynamic mode. When the user uses the dynamic mode next time, and for example, when the user controls the display apparatus 200 to display the sound setting menu by the control device 100 or the intelligent device 300, and after the sound mode menu is selected so as to set the sound mode as the dynamic mode, the default value of the dynamic mode stored by the the display apparatus is automatically used, that is, the context menu as shown in FIG. 21 is displayed to the user. In some embodiments, for example, still, when the user uses the dynamic mode this time, the user changes a default value of bass emphasis of a context menu to be "strong", which is a non-default value of the dynamic mode used by the user this time, and then the display apparatus may store a sound effect parameter of the dynamic mode after this adjustment. When the user uses the dynamic mode next time, and for example, when the user controls the display apparatus 200 to display the sound setting menu by the control device 100 or the intelligent device 300, and after the sound mode menu is selected to set the sound mode as the dynamic mode, the sound effect parameter, of the dynamic mode after the adjustment, stored by the display apparatus is automatically used, that is, the bass emphasis is "strong", and other context menus are default values. In this case, the context menu as shown in FIG. 27 may be displayed to the user.

After the user sets the target sound mode (the dynamic mode in the above example), no matter which one of the context menu as shown in FIG. 21 and the context menu as shown in FIG. is displayed to the user, a difference between two user interfaces mainly lies in a sound effect parameter for bass emphasis in a context menu. If the user does not know or forget a default value of the context menu, whether a sound effect parameter currently used is the default value of the bass emphas is cannot be known, that is, whether the dynamic mode currently used is the default value cannot be known. If the context menu as shown in FIG. 27 is displayed to the user, the user may use a non-default value of a dynamic mode immediately after setting the dynamic mode. Once the user does not need to strengthen bass emphasis on audio data, however, the user does not know a sound effect parameter currently used in the dynamic mode, especially the sound effect parameter of the bass emphasis is changed from a default value "weak" to "strong", if a current sound effect parameter of the dynamic mode is directly used, auditory experience may be impacted. It may be seen that after the user sets a target sound mode, the user may use a sound effect parameter suitable for his or her demands more timely and accurately merely by quickly and clearly knowing whether the target sound mode is set as a default value, so as to realize better auditory experience.

In order to clearly prompt the user that the target sound mode is not set as default value currently, a prompt identifier may be displayed on the sound mode menu. Specifically, the user issues a command to the display apparatus 200 via the control device 100 or the intelligent device 300, and the command is configured to set the target sound mode. The command may include a plurality of sub-commands, and for example, includes first sub-command, second sub-commands and third sub-command, where the first sub-command may be to select a sound setting option, and the display apparatus 200 displays a sound setting menu in response to the first sub-command. In this case, a sound mode used before a previous power shutdown and a context menu corresponding to the sound mode, or a sound mode set last time and a corresponding context menu corresponding to the sound mode are displayed on and included in the sound setting menu. The second sub-command may be to select a sound mode menu in the sound setting menu, and the display apparatus 200 displays a next-level menu of the sound mode menu in response to the second sub-command. The third sub-command may be to select a target sound mode in the next-level menu of the sound mode menu. In response to the third sub-command, the display apparatus obtains sound effect parameters of all recently stored context menus corresponding to the target sound mode, that is, current sound effect parameters of all the context menus, from stored data, and obtains default values corresponding to the target sound mode, that is, default values corresponding to all the context menus, from the stored data. Whether the current sound effect parameters of all the context menus are default values is determined by comparing the current sound effect parameters of all the context menus with the default values, and whether the target sound mode is a default value is further determined according to a determination result, where if the current sound effect parameters corresponding to all the context menus are the default values, it is determined that the target sound mode is configured as the default value currently; and if at least one context menu is a non-default context menu, that is, a current sound effect parameter corresponding to at least one context menu is a non-default value, it is determined that the target sound mode is configured as a non-default value currently. Furthermore, if it is determined that the target sound mode is configured as the default value currently, the set sound setting menu, for example, a first sound setting menu, is displayed. The first sound setting menu includes a sound mode menu and a context menu corresponding to the target sound mode, where a name of the target sound mode is displayed on the sound mode menu. If it is determined that the target sound mode is configured as non-default value currently, the set sound setting menu, for example, a second sound setting menu, is displayed. The second sound setting menu includes a sound mode menu and a context menu corresponding to the target sound mode, where a name of the target sound mode and a prompt identifier are displayed on the sound mode menu. In this way, the prompt identifier may be displayed to prompt the user that the target sound mode is not configured as the non-default value currently, such that the user is prompted to further determine whether to directly use the sound effect parameter currently corresponding to the target sound mode.

Figure 28:
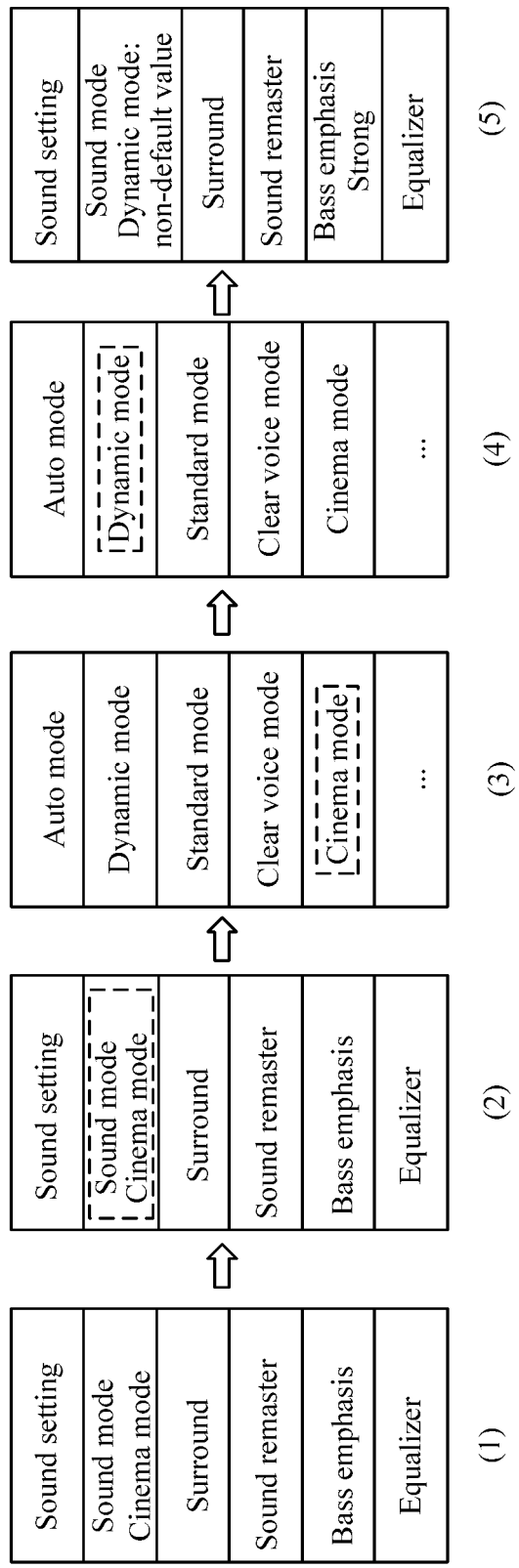
FIG. 28 is a schematic flow diagram of a display apparatus 200 displaying a prompt identifier on a sound setting menu according to a command in some embodiments of the present application.

For example, if the user wants to set a target sound mode "dynamic mode", the user issues a first sub-command to the display apparatus 200 via the control device 100, for example, a remote controller, a sound setting icon is selected on a desktop, and the display apparatus 200 displays a sound setting menu as shown in (1) in FIG. 28 in response to the first sub-command. In this case, a cinema mode as a sound mode currently used, and meanwhile, four context menus corresponding to the cinema mode, which include surround, sound remaster, bass emphasis and equalizer are displayed on the sound setting menu. The user issues a second sub-command to the display apparatus 200, and selects a sound mode menu as shown in (2) in FIG. 28. In response to the second sub-command, the display apparatus 200 displays a next-level menu of the sound mode menu as shown in (3) in FIG. 28. The next-level menu includes an auto mode, a dynamic mode, a normal mode, a clear voice mode, and a cinema mode. The user issues a third sub-command to the display apparatus 200, and selects the dynamic mode as shown in (4) in FIG. 28. In response to the third sub-command, the display apparatus 200 obtains all context menus (including surround, sound remaster, bass emphasis and equalizer) corresponding to the dynamic mode and current sound effect parameters of the context menus, from stored data. For example, if sound effect parameters of the context menus shown in FIG. 27 are taken as sound effect parameters of the context menus corresponding to the dynamic mode stored by the processor 250 last time, each sound effect parameter shown in FIG. 27 is a current sound effect parameter of each context menu. The default values of surround, sound remaster, bass emphasis and equalizer corresponding to the dynamic mode are obtained from the stored data, and the current sound effect parameter of each context menu is compared with the default value, such that it may be determined that the current sound effect parameter of the bass emphasis is a non-default value, that is, the dynamic mode is configured as a non-default value currently. The display apparatus 200 displays the second sound setting menu as shown in (5) in FIG. 28, displays the "dynamic mode" on the sound mode menu, and meanwhile, displays a prompt identifier "non-default value" and displays various context menus in the sound mode menu. In this case, the user may quickly know that the dynamic mode is a non-default value according to the "non-default value" presented on the display, such that the user may determine whether to use the current sound effect parameter of each context menu.

The prompt identifier may have various forms. In some embodiments, the prompt identifier may be displayed on the sound mode menu, and the prompt identifier may be referred to as a first identifier. In this case, the first identifier is specifically a current sound effect parameter of a non-default context menu. Following the above example, the first identifier "bass emphasis: strong" is displayed on the sound mode menu. In this way, the user may not only know that the dynamic mode is the non-default value currently, but also directly know that the current sound effect parameter of bass emphasis is configured as a non-default value, such that the current sound effect parameter of the bass emphasis may be adjusted to the default value.

In some embodiments, if there are a large number of non-default context menus, and current sound effect parameters of the non-default context menus are all displayed on the sound mode menu, incomplete displaying may occur, such that reading difficulty may be increased. The prompt identifier may further include a second identifier, and the second identifier may be a simple prompt identifier, for example, a simple text, such as "non-default value", a graphic, such as an exclamation point, or a designated color, such as displaying a mode name of the target sound mode in red. It is unnecessary to display a specific sound effect parameter. In this case, the second identifier is displayed on the sound mode menu, so as to prompt the user that the target sound mode is configured as a non-default value. In this case, the first identifier is displayed on the corresponding non-default context menu, so as to prompt the current sound effect parameter of the non-default context menu to the user. Following the above example, as shown in (5) of FIG. 28, a second identifier is a "non-default value" and the first identifier is "strong". If there are other non-default context menus, first corresponding identifiers may be also displayed on the non-default context menus. In some embodiments, if a corresponding current sound effect parameter is displayed on each context menu, the first identifier may be a simple prompt identifier, and reference may be made to the second identifier. In this way, the user may not only quickly know that the target sound mode is a non-default value through the second identifier, but also quickly know the non-default context menu and the current sound effect parameter of the non-default context menu through the first identifier. Even if there are a plurality of non-default context menus, the user may clearly and quickly know relevant information.

After knowing that the target sound mode is the non-default value currently according to the prompt identifier, the user may choose to adjust the current sound effect parameter of the non-default context menu back to the default value.

In some embodiments, the user may manually adjust the current sound effect parameter of each non-default context menu back to the default value. Taking an equalizer as an example, as shown in FIG. 26, each waveband in the equalizer is configured with an adjust button, and different positions of the adjust buttons on the waveband correspond to different audio values. A specific audio value may be displayed on a right side of the waveband, and the user may adjust an audio value of each waveband to a default value according to the specific audio value. For example, if the default value of each waveband is 0, an audio value that is not 0 may be manually adjusted back to 0, and alternatively, as shown in FIG. 26, a default value point(such as a middle position of the waveband) may be set on each waveband, and an audio value corresponding to the position is 0, such that the user may directly set an adjust button at this point. Certainly, the user may also use corresponding sound effect parameter adjustment modes according to different operation interfaces of sound effect parameters.

Figure 31:
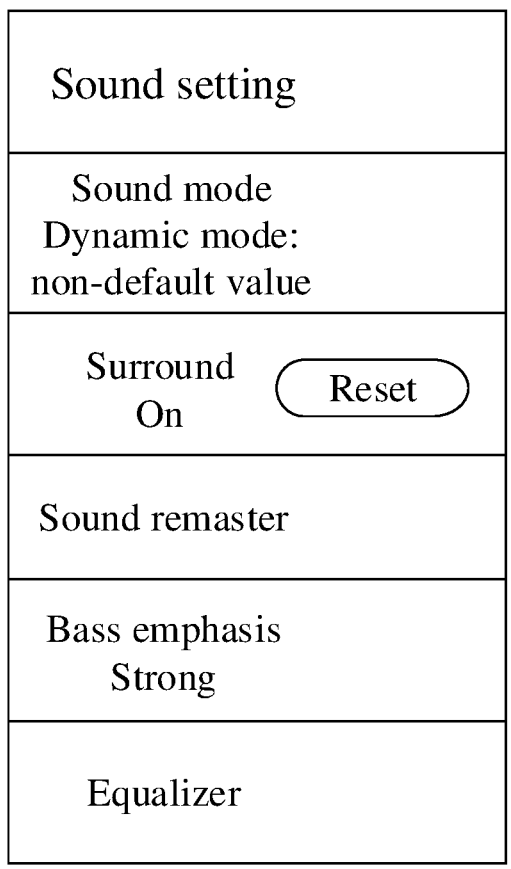
FIG. 31 is a schematic diagram of a display mode of a reset option on a first target context menu in some embodiments of the present application.
Figure 32:
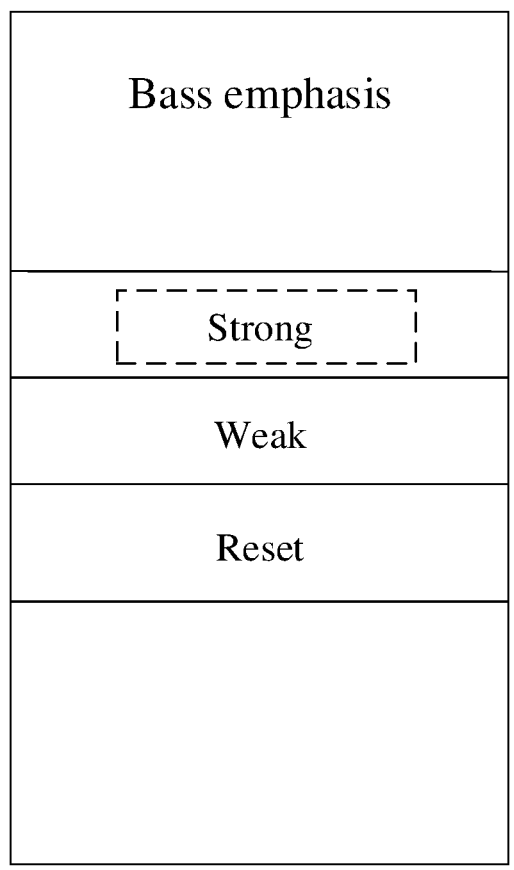
FIG. 32 is a schematic diagram of a display mode of a reset option on an operation interface of sound effect parameters in some embodiments of the present application.

In some embodiments, when the display apparatus 200 detects that the target sound mode is not the default value currently, the display apparatus 200 displays the reset option to provide a "one-key reset" operation for the user, that is, the user issues a reset instruction by selecting the reset option, and the display apparatus 200 adjusts a current sound effect parameter of a first target context menu back to a default value in response to the reset instruction. In some embodiments, there is a reset option, and the reset option may be displayed on the sound setting menu. For example, as shown in FIG. 29, the reset option is displayed at a bottom of the sound setting menu, and the first target context menu refers to a non-default context menu. The reset option is configured to set the current sound effect parameters of all the non-default context menus as the default values simultaneously. In some embodiments, a first context menu refers to a non-default context menu, there are multiple reset options, and a non-default context menu corresponds to a reset option. For example, as shown in FIG. 30, a reset option is displayed at a right side of bass emphasis in a non-default context menu, and the reset option is configured to set a current sound effect parameter of the bass emphasis as a default value. In some embodiments, there are multiple reset options, and one reset option corresponds to one first target context menu, where the first target context menu is a non-default context menu that belongs to a designated context menu, and the designated context menu may be set according to sound effect preference of the user, and an audio data style, etc. For example, if a designated context menu is surround, and sound effect parameters of the surround and bass emphasis are both non-default values, the surround is the first target context menu. As shown in FIG. 31, a reset option is displayed at a right side of the surround, and the reset option is configured to set a current sound effect parameter of the surround as a default value. In the case shown in FIG. 31, the reset option may be used as a first identifier. In this way, the user may know the non-default context menu by searching for the reset option, and directly set the current sound effect parameter as the default value through the reset option. In some embodiments, the reset option is displayed in an operation interface of sound effect parameters of the non-default context menu, and for example, the sound effect parameter of the bass emphasis is the non-default value, and as shown in FIG. 32, the reset option is displayed in an operation interface of sound effect parameters of the bass emphasis.

Furthermore, after the display apparatus 200 adjusts the current sound effect parameter of the first target context menu back to the default value in response to the reset instruction, whether adjusted sound effect parameters of all the context menus are default values is detected again. Reference may be made to a process of the display apparatus 200 responding to the third sub-command described above. If it is detected that the adjusted sound effect parameters of all the context menus are the default values, for example, for the above reset mode shown in FIG. 29, the display apparatus 200 may delete the prompt identifier and the reset option, and display the sound setting menu as shown in FIG. 21, so as to prompt the user that the target sound mode is configured to the default value currently. If it is detected that there is still at least one non-default context menu, for example, for the above reset mode shown in FIGS. 30 and 31, the user merely chooses to reset some of the non-default context menus, and then other non-default context menus still remain. In this case, the display apparatus 200 still continues to display an updated prompt identifier for indicating some context menus are not in default configuration.

Figure 33:
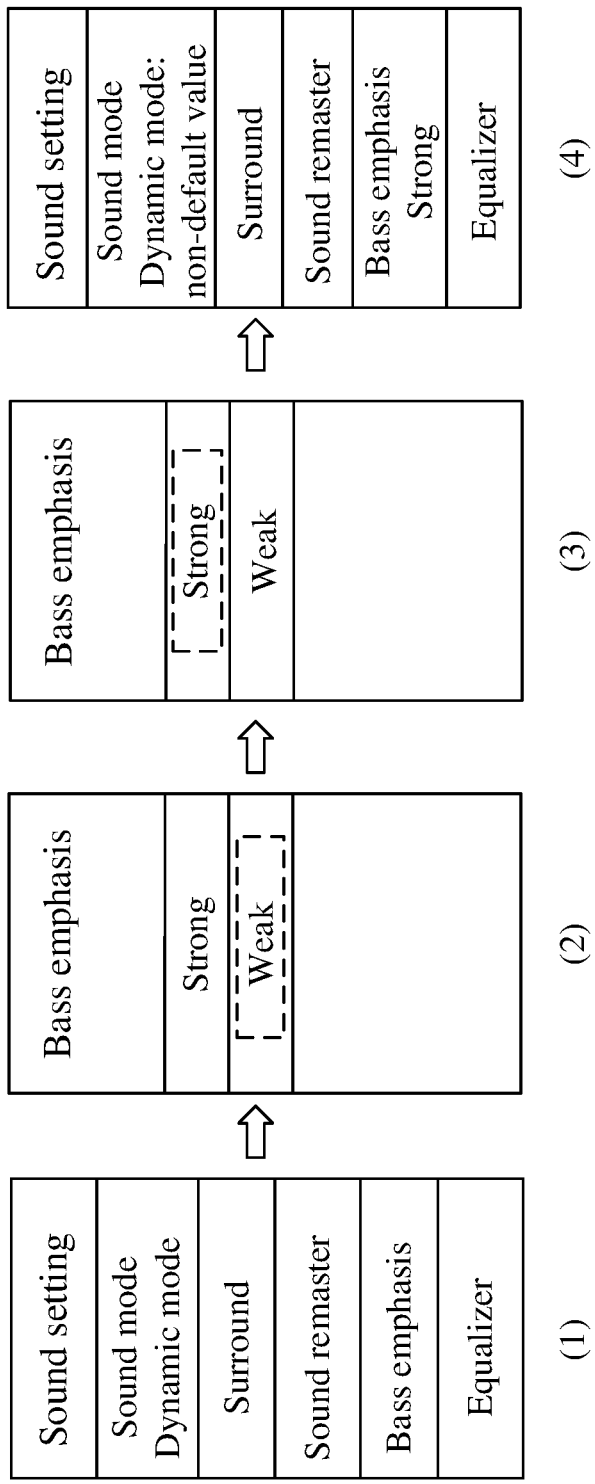
FIG. 33 is a schematic flow diagram of a display apparatus setting sound effect parameters according to a parameter adjustment instruction and displaying a sound setting menu in some embodiments of the present application.

After setting the target sound mode, the user may also adjust the sound effect parameter of each context menu corresponding to the target sound mode by continuing to issue an instruction for adjusting a parameter of a context menu. For example, the instruction for adjusting a parameter of a context menu includes a first parameter adjustment instruction and a second parameter adjustment instruction. For example, if the target sound mode is a dynamic mode and the dynamic mode is a default value currently, as shown in (1) in FIG. 33, the user issues a first parameter adjustment instruction to the display apparatus 200 via the control device 100, for example, the remote controller, so as to select a context menu, i.e., bass emphasis, to adjust a parameter. In response to the first parameter adjustment instruction, the display apparatus 200 displays an operation interface of sound effect parameters corresponding to the bass emphasis as shown in (2) in FIG. 33, and the operation interface includes options of different sound effect parameters of the bass emphasis, such as "strong" and "weak". As shown in (2) in FIG. 33, a current sound effect parameter of the bass emphasis is a default value "weak". If the user needs to enhance a bass emphasis effect, the user issues a second parameter adjustment instruction to the display apparatus 200, so as to select a target sound effect parameter, and for example, as shown in (3) in FIG. 33, to select "strong". The display apparatus 200 adjusts the current sound effect parameter of the bass emphasis to "strong" in response to the second parameter adjustment instruction. Furthermore, the display apparatus 200 identifies whether an adjusted sound effect parameter is a default value, so as to determine a display mode of an adjusted context menu. In some embodiments, the display apparatus 200 obtains a default value of bass emphasis, for example, "weak", from stored data. By comparing an adjusted sound effect parameter "strong" with the default value "weak", the display apparatus 200 determines that the adjusted sound effect parameter of the bass emphasis is a non-default value, and then a corresponding prompt identifier may be displayed according to the display mode of a prompt identifier described above, so as to prompt the user that an adjusted target sound mode is a non-default value. The sound effect parameter of the bass emphasis is the non-default value "strong", and a set sound setting menu is displayed to the user. As shown in (4) in FIG. 33, in the set sound setting menu, a second identifier "non-default value", and a first identifier "strong" on the bass emphasis are displayed on a sound mode menu.

Figure 36:
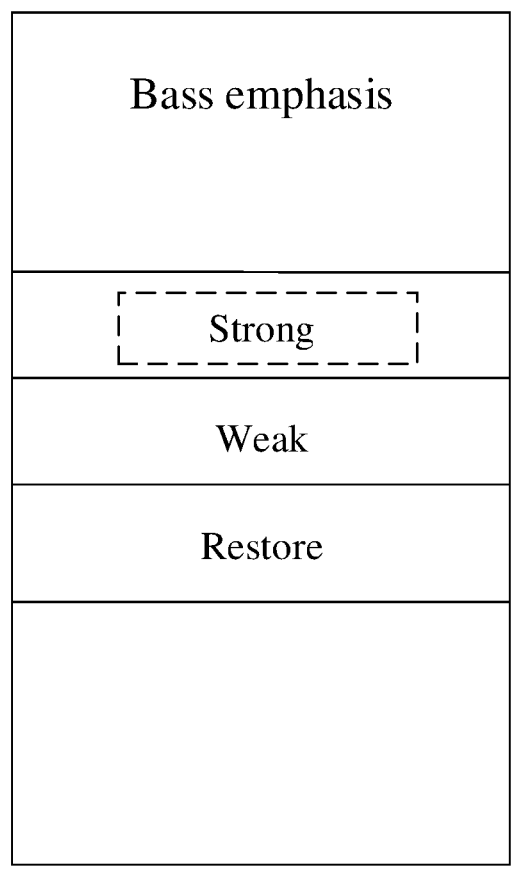
FIG. 36 is a schematic diagram of a display mode of a restore option on an operation interface of sound effect parameters in some embodiments of the present application.

However, during adjusting of the sound effect parameter, the user needs to restore the adjusted sound effect parameter to a designated sound effect parameter due to adjustment errors or other reasons. In order to meet restore demand, the display apparatus 200 displays the restore option in response to the instruction for adjusting a parameter of a context menu, such that when having the restore demand, the user may issue a restore instruction through the restore option, so as to restore the adjusted sound effect parameter to the designated sound effect parameter. In the process of restoring the above sound effect parameters, the context menu which has adjusted parameter(s), that needs to restore the adjusted sound effect parameter to the designated sound effect parameter, may be referred as a second target context menu. In some embodiments, in response to the parameter adjustment instruction, the display apparatus 200 displays a restore option on the sound setting menu as shown in FIG. 34. In this case, all context menus which have adjusted parameter(s) are referred to as the second target context menus. Through the restore option, an effect of "one-key restore" may be achieved, that is, adjusted sound effect parameters of all the context menus may be restored to designated sound effect parameters through the restore option. In some embodiments, the second target context menu is a context menu which has adjusted parameter(s), the display apparatus 200 displays a restore option on a context menu which has adjusted parameter(s) in response to the parameter adjustment instruction, that is, the adjusted sound effect parameter of the corresponding context menu may be restored to the designated sound effect parameter through the restore option. Taking the parameter adjustment process provided in FIG. 33 as an example, as shown in FIG. 35, the restore option is displayed at a right side of bass emphasis in the context menu which has adjusted parameter(s). Alternatively, a restore option is displayed on an operation interface of sound effect parameters of a context menu which has adjusted parameter. In this case, an adjusted sound effect parameter of the context menu which has adjusted parameter may be restored to a designated sound effect parameter through the restore option, and as shown in FIG. 36, and a restore option is displayed on an operation interface of sound effect parameters of bass emphasis. In some embodiments, the second target context menu may also be a context menu which has adjusted parameter, which belongs to the designated context menu, and the designated context menu may be set according to sound effect preference of the user, an audio data style, etc. The restore option may be displayed on the second target context menu or on an operation interface of sound effect parameters of the second target context menu. For example, if the designated context menus are surround and bass emphasis, and the context menu which has adjusted parameter is bass emphasis, the bass emphasis is the second target context menu. In this case, the restore option is displayed on the bass emphasis or on the operation interface of the sound effect parameters of the bass emphasis. Reference may be made to FIGS. 35 and 36 for the display mode.

In some embodiments, a designated sound effect parameter may be a sound effect parameter, i.e., an initial sound effect parameter of the context menu which has adjusted parameter, when the display apparatus 200 receives a parameter adjustment instruction. The user may restore an adjusted sound effect parameter of the second target context menu to a corresponding initial sound effect parameter by a restore instruction. Specifically, for example, if the target sound mode is a dynamic mode and the dynamic mode is a default value currently, as shown in (1) in FIG. 37, the user issues a first parameter adjustment instruction to the display apparatus 200 via the control device 100, for example, the remote controller, so as to select the context menu to for parameter adjustment, that is, bass emphasis. In response to the first parameter adjustment instruction, the display apparatus 200 displays an operation interface of sound effect parameters corresponding to the bass emphasis as shown in (2) in FIG. 37, and the operation interface includes options of different sound effect parameters of the bass emphasis, such as "strong" and "weak". As shown in (2) in FIG. 37, the current sound effect parameter of the bass emphasis is "weak", and in response to the first parameter adjustment instruction, the display apparatus 200 further needs to record a corresponding initial sound effect parameter when the bass emphasis is not adjusted, that is, "weak". If the user needs to enhance a bass emphasis effect, the user issues a second parameter adjustment instruction to the display apparatus 200 for selecting a sound effect parameter, and for example, as shown in (3) in FIG. 37, to select "strong". The display apparatus 200 adjusts the sound effect parameter of the bass emphasis to "strong" in response to the second parameter adjustment instruction, and meanwhile, a restore option is displayed on an operation interface of sound effect parameters of the bass emphasis. If the user needs to restore a sound effect parameter of the bass emphasis after adjusting the sound effect parameter of the bass emphasis, as shown in (4) in FIG. 37, the restore option is selected to issue the restore instruction to the display apparatus 200, and the display apparatus 200 obtains a recorded initial sound effect parameter "weak" of the bass emphasis from stored data in response to the restore instruction, and sets the sound effect parameter of the bass emphasis as "weak" as shown in (5) in FIG. 37.

Further, if the user issues a plurality of parameter adjustment instructions so as to adjust sound effect parameters multiple times, as long as the user issues a restore instruction, the display apparatus 200 may adjust the sound effect parameter of the bass emphasis back to an initial sound effect value "weak" in response to the restore instruction.

Figure 38:
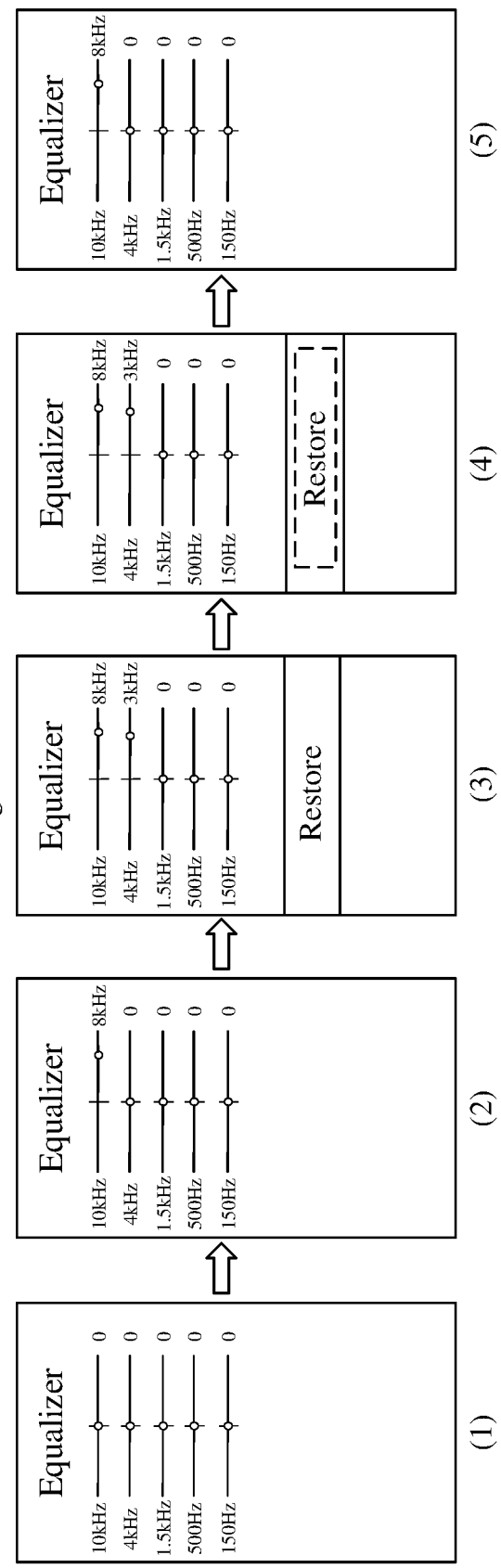
FIG. 38 is a schematic flow diagram of a display apparatus restoring a sound effect parameter to a designated sound effect parameter in response to a parameter adjustment instruction and a restore instruction in some embodiments of the present application.

In some embodiments, the user issues N parameter adjustment instructions, each parameter adjustment instruction corresponds to an adjusted sound effect parameter, and the designated sound effect parameter is an adjusted sound effect parameter corresponding to an $i^{th}$ parameter adjustment instruction, where $1 \leq i \leq N$. The user may restore an adjusted sound effect parameter of a context menu to the adjusted sound effect parameter corresponding to the $i^{th}$ parameter adjustment instruction by issuing a restore instruction. Specifically, the user selects a context menu for adjusting sound effect parameter, such as the equalizer, and then an operation interface of sound effect parameters of the equalizer is entered, as shown in (1) in FIG. 38. In this case, the sound effect parameters of the equalizer are default values, that is, audio values of five wavebands are all 0. The user issues a first parameter adjustment instruction to the display apparatus 200, so as to adjust an audio value of a 10 kHz waveband to be 8 kHz, and audio values of other wavebands remain unchanged and are still 0. In response to the first parameter adjustment instruction, the display apparatus 200 adjusts the audio value of the 10 kHz waveband to 8 kHz as shown in (2) in FIG. 38, and records sound effect parameters after the adjustment, that is, the audio value of the 10 kHz waveband is 8 kHz, and sound effect values of the other wavebands are 0. If the user continues to issue a second parameter adjustment instruction so as to select an adjusted sound effect parameter, for example, as shown in (3) in FIG. 38, an audio value of a 4 kHz waveband is adjusted to be 3 kHz, and audio values of other wavebands are the same as those shown in (2) in FIG. 38. In response to the second parameter adjustment instruction, the display apparatus 200 adjusts the audio value of the 4 kHz waveband to 3 kHz, and records sound effect parameters after the adjustment, that is, the audio value of the 10 kHz waveband is 8 kHz, the audio value of the 4 kHz waveband is 3 kHz, and sound effect values of the other wavebands are 0. Meanwhile, the display apparatus 200 displays a restore option on the operation interface of the sound effect parameters of the equalizer. If the user needs to adjust an adjusted sound effect parameter back to a designated sound effect parameter after adjusting the sound effect parameter of the equalizer, where in the embodiment, the designated sound effect parameter is a sound effect parameter corresponding to the first parameter adjustment instruction, as shown in (4) in FIG. 38, the user issues a restore instruction to the display apparatus 200 by selecting the restore option, and in response to the restore instruction, the display apparatus 200 obtains the adjusted sound effect parameter corresponding to the first parameter adjustment instruction from stored data, that is, "an audio value of a 10 kHz waveband is 8 kHz, and sound effect values of the other wavebands are 0", and as shown in (5) in FIG. 38, the sound effect parameter of the equalizer is set according to the description that "an audio value of a 10 kHz waveband is 8 kHz, and sound effect values of the other wavebands are 0". In the embodiment, the user issues a total of N=2 parameter adjustment instructions, and restores an adjusted sound effect parameter to the adjusted sound effect parameter corresponding to the first parameter adjustment instruction (i=1) by issuing a restore instruction, which is equivalent to adjusting a current sound effect parameter back to a immediate or recent previous sound effect parameter.

In some embodiments, N is greater than 2, that is, the user issues more parameter adjustment instructions so as to adjust sound effect parameters more times, and the user may adjust the adjusted sound effect parameter to an adjusted sound effect parameter corresponding to the $i^{th}$ parameter adjustment instruction by issuing a restore instruction. In this case, i may be 1, that is, merely the adjusted sound effect parameter goes back to a immediate previous sound effect parameter, and i may also be any integer greater than 1 and smaller than N, such that the adjusted sound effect parameter goes one move back to a sound effect parameter before recent parameter adjustment. Reference may be made to the processes shown in (1)-(5) in FIG. 38 for the process of the display apparatus 200 responding to the restore instruction.

Figure 37:
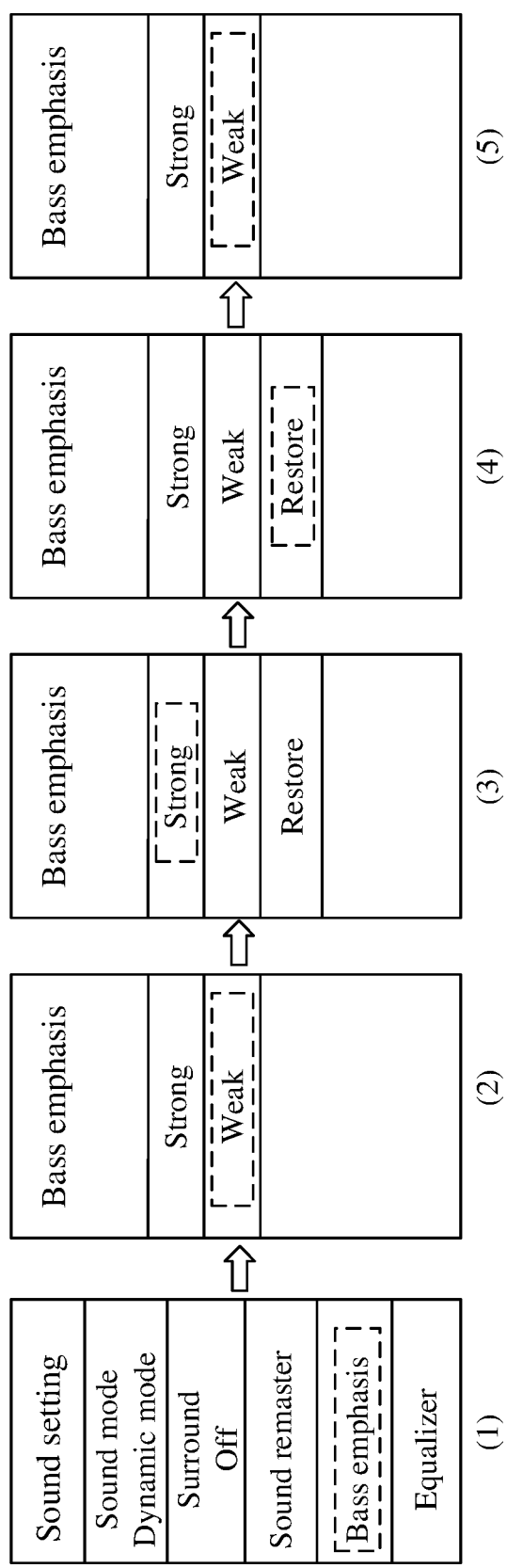
FIG. 37 is a schematic flow diagram of a display apparatus restoring a sound effect parameter to an initial sound effect parameter in response to a parameter adjustment instruction and a restore instruction in some embodiments of the present application.
Figure 39:
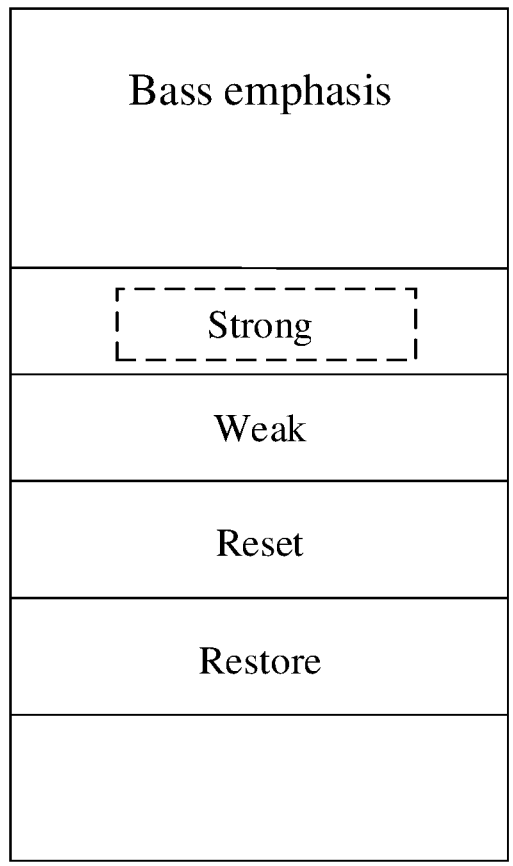
FIG. 39 is a schematic diagram of a display apparatus displaying a reset option and a restore option on an operation interface of sound effect parameters simultaneously according to a parameter adjustment instruction in some embodiments of the present application.

Based on the embodiments shown in FIGS. 37 and 22, in some embodiments, the display apparatus 200 may display a reset option and a restore option simultaneously in response to a parameter adjustment instruction from the user. For example, if the target sound mode is a dynamic mode, the user issues a parameter adjustment instruction to the display apparatus 200, so as to set a new sound effect parameter in the operation interface of the sound effect parameters of the bass emphasis, for example, to adjust "weak" to "strong". In response to the parameter adjustment instruction, the display apparatus 200 sets a sound effect parameter of the bass emphasis as "strong" as shown in FIG. 39, and displays the reset option and the restore option on the operation interface of the sound effect parameters of the bass emphasis simultaneously. In this way, the user may reset the adjusted sound effect parameter to the default value by selecting the reset option, or restore the adjusted sound effect parameter to a designated sound effect parameter by selecting the restore option, where reference may be made to the reset and restore process disclosed above.

Figure 40:
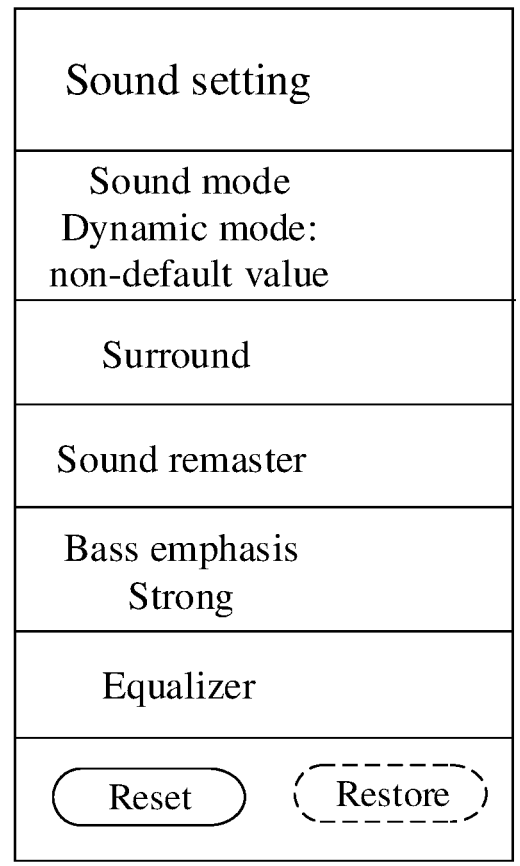
FIG. 40 is a schematic diagram of a display apparatus displaying a reset option and a restore option on a sound setting menu simultaneously according to a command in some embodiments of the present application.

In some embodiments, when the display apparatus 200 responds to a command from the user, that is, when the user does not issue a parameter adjustment instruction, as shown in FIG. 40, the reset option and the restore option may be displayed on the sound setting menu simultaneously. In this case, the restore option may be grayed as shown in FIG. 40 (denoted by a dotted box), that is, since the user does not adjust a sound effect parameter of a context menu, a restore function is unavailable for selection. Once the user issues a parameter adjustment instruction, the display apparatus 200 may cancel graying of the restore option in response to the parameter adjustment instruction, so as to provide a normal restore function.

According to the display apparatus in the embodiments, when the user sets the target sound mode, whether the current sound effect parameter of the context menu corresponding to the target sound mode is the default value may be detected, and when the current sound effect parameter of at least one context menu is a non-default value, the prompt identifier is displayed on the sound setting menu, such that the user may directly and quickly know that the target sound mode is a non-default value according to the prompt identifier. The reset option and the restore option may be displayed, such that the user is provided with a reset function of resetting a sound effect parameter of a context menu to a default value and a restore function of restoring a sound effect parameter of a context menu to a designated sound effect parameter.

The embodiments of the present application further provides a processing method for eliminating sudden changes of a picture quality effect and display abnormalities such as blurred screen or splash screen during start of video playing.

Figure 41:
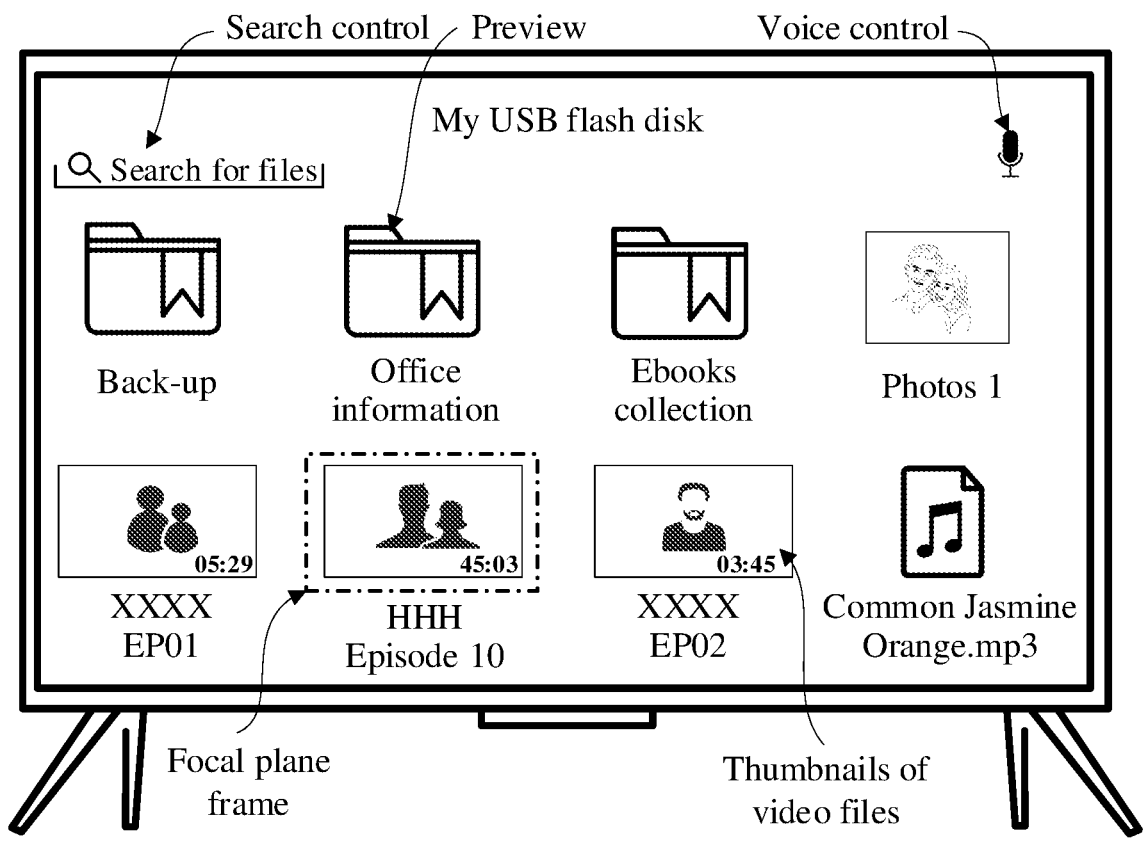
FIG. 41 is a schematic diagram of a display apparatus displaying a storage device directory.

FIG. 41 provides an example of a UI of a storage device directory. The storage device directory includes various local media files saved by a storage device. Optionally, the local media files are visually presented to a user for browsing in the form of previews, such as a folder icon, an audio icon, and thumbnails of videos and images. In order to make the user accurately distinguish files conveniently, file information may be noted in a preview, and for example, the file information may be a folder name, file media resource information, etc. The file media resource information includes, but is not limited to, a resource name, a video introduction, a resource format (for example, AVI, mp3, etc.), or other related contents.

In an embodiment, a thumbnail of a video file may be actually a snapshot of a file resource. It may be understood that a video file is formed by organizing and connecting a plurality of frames of static images, and a thumbnail is essentially an image formed by compressing a certain frame of static image in the video file. For example, a video A having a refresh frequency of 30 Hz and a playing duration of 60 s has a total of 1800 frames. One of the 1800 frames is selected and compressed to obtain a thumbnail of the video A. Optionally, for video files in the storage device directory, with reference to FIG. 41, playing time of the video files may be marked on thumbnails.

In an embodiment, thumbnails may be associated with play links of the video files, such that when the user clicks a certain thumbnail, a display apparatus automatically starts a video player, and the video player starts to play a video file through a play link associated with the thumbnail.

If the user wants to start to play a certain target video file in the directory, it is necessary to locate a thumbnail of the target video file and then click the thumbnail, so as to jump to a video playing interface. In an embodiment, the user may switch a file focus in the directory by operating a remote controller, for example, by moving the remote controller or pressing a direction button on the remote controller. Optionally, the display apparatus may prominently display a file where the focus is located. With reference to FIG. 41, a current focus is moved to a video file "HHH episode 10", a focus frame may be set around a thumbnail of the video file "HHH episode 10", and a display effect of the focus frame (including a thickness, a line type, etc.) is not limited. Certainly, other focus prompt modes may also be used. For example, a thumbnail selected by the focus is appropriately scaled, such that the user may quickly and intuitively distinguish the focus.

In some embodiments, with reference to FIG. 41, a search control may further be configured in a page of the storage device directory. The user may input at least one keyword related to the file into the search control, and then click OK. If the display apparatus retrieves a target file matching the keyword in the storage device, merely the retrieved target file may be displayed in a search result page, and other files may be filtered out. In this way, the user may quickly search for and locate the target file that the user wants to browse conveniently, which is especially suitable for a scenario with a large number of files stored in the storage device and improves file searching efficiency for the user. For example, if the user inputs a keyword "HHH" into the search control, the target video file "HHH episode 10" may be showed as search result. In other possible cases, if the display apparatus fails to retrieve a target file matching a keyword, that is, a search target is void this case, it may be prompted in the search result page that no files matches the search.

In some embodiments, with reference to FIG. 41, a voice control may further be configured in the page of the storage device directory, and the user may click the voice control and input voice information. For example, when the user inputs "search for HHH" by voice, the display apparatus knows that the user intends to search for a file through semantic analysis, and a search target is related to "HHH", such that the video file "HHH episode 10" may be searched for. For another example, if the user inputs "play HHH" by voice, the display apparatus may start to play the video file "HHH episode 10" in response to the voice information.

Figure 42:
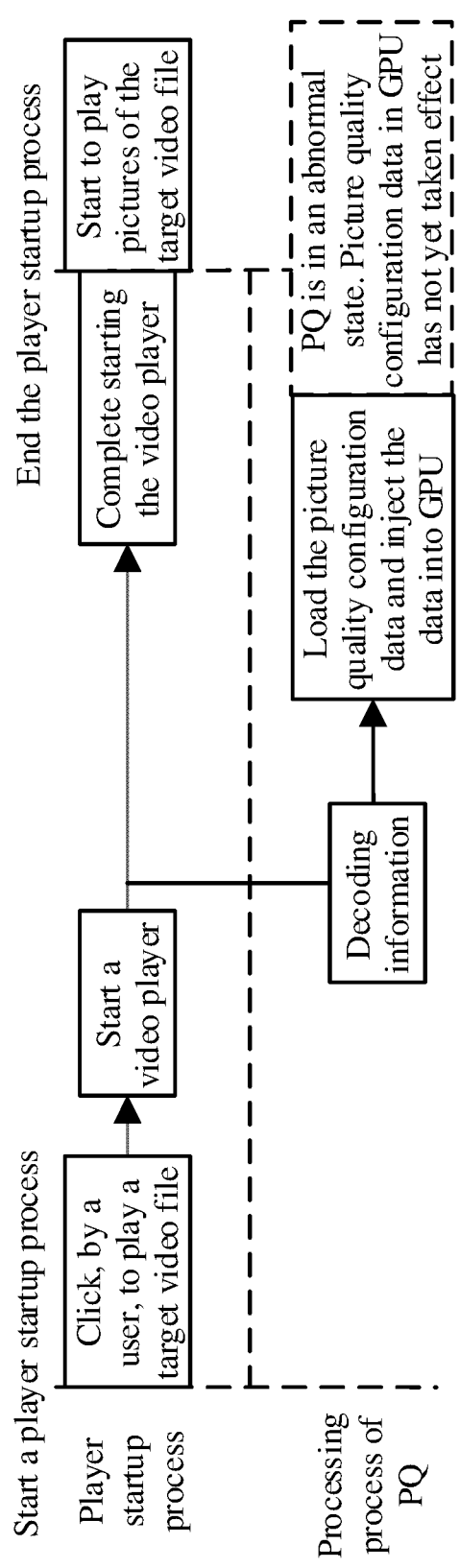
FIG. 42 is a schematic diagram of conventional playing flow of a local video file.

In a conventional embodiment, with reference to an example in FIG. 42, conventional playing scheme of a local video file includes two independent processes, which are a player startup process and a picture quality (PQ) processing process, where the player startup process corresponds to a video player, and the PQ processing process corresponds to a graphics processing unit (GPU). When the player startup process detects that the user starts to play a target video file, the video player is immediately started. In a startup process of the video player, the video player obtains decoding information of the target video file and sends the decoding information to the PQ processing process, so as to cause the PQ processing process to start. The decoding information includes, but is not limited to, a resolution, a high-dynamic range (HDR) type, a scanning format (i/p), a refresh frequency, etc. The decoding information is configured to define a picture quality effect that a video picture should present on the display.

GPU is a graphics processing unit, and its function includes adjusting picture quality of video pictures. The GPU may set a number of picture quality parameters, which include, but are not limited to, brightness, saturation, contrast, definition, etc. When configuration of picture quality parameters is effective, the adaptive picture quality effect may be produced, and alternatively, the picture quality may be refreshed. Therefore, after receiving the decoding information, the PQ processing process needs to generate picture quality configuration data first according to the decoding information. This process is called loading picture quality configuration data. The picture quality configuration data includes configuration values of various picture quality parameters of the GPU, and when the GPU triggers the picture quality configuration data to take effect, an output video picture has a picture quality effect configured by the decoding information.

After the picture quality configuration data is loaded, the PQ processing process injects the picture quality configuration data into the GPU, and the GPU immediately triggers the picture quality configuration data to take effect after refreshing the configuration values of various picture quality parameters. However, loading and injection processing of the picture quality configuration data may take time, and time consumptions may be slightly different according to a system state. In the meantime, the video player is still starting. Once processing time of the PQ processing process is longer than startup time of the video player, startup of the video player may be completed, that is, when a video picture may be displayed, the picture quality configuration data does not take effect, that is, the GPU in FIG. 42 is in a PQ abnormal case, and when the picture quality configuration data takes effect after the picture is displayed in the video player, picture quality effects such as brightness and color of pictures may suddenly change, and even splash screen and blurred screen may occur.

A scheme is to optimize a speed of loading and injecting picture quality configuration data so as to shorten processing time of the PQ processing process. However, in practical scenarios, loading and injection of the picture quality configuration data are limited by system performance of the display apparatus, so there are limitations in actually optimizing local media playing.

Another scheme is to delay picture displaying time of a video picture, that is, to increase startup time of the video player relatively. For example, after the GPU triggers the picture quality configuration data to take effect, effective indication information is fed back to the video player; and when the video player receives the effective indication information, it may be known that a picture quality configuration is refreshed, and then the video file is played to present a corresponding video picture. However, the defect of the scheme is that the startup time of the video player is long, such that the picture is played after black screen for a long time, and performance of the video player is made worse to some extent.

In view of the above issues, the present application provides a method for controlling playing of media files. The method includes the following steps.

Step one, a target video file selected by a user in a storage device directory is located.

In an embodiment, after a storage device is in connection with a display apparatus through a USB port, a display displays the storage device directory when receiving an operation of opening the storage device from the user. For example, with reference to FIG. 41, the storage device directory includes previews of stored local media files, and a preview of a video file is a thumbnail of a certain image in a video.

In an embodiment, the user may operate a remote controller to move a position of a focus in a directory page. when the focus is switched to a file that the user is not interested in, the user usually moves the focus away quickly to locate a desired target file more quickly, such that how much possibility that a certain video file is selected by the user and started to be played may be measured according to stay time Tstay of the focus on a video file. In view of this, a preset duration Tp is set, and the stay time Tstay is compared with the preset duration Tp, such that the target video file may be located and locked before being started to be played. A value of the preset duration Tp may be set according to needs, for example, may be set as 500 ms.

In some embodiments, when the storage device directory is displayed, the display apparatus tracks the position of the focus in real time and detects whether a file selected or pointed by the focus is a video file/image. If the focus does not point to the video file/image, a PQ processing process is not involved, and the file is played in a normal mode.

In some embodiments, if the focus points to a video file/image, the stay time Tstay of the focus on the video file/image is detected in time. If the stay time Tstay is shorter than the preset duration Tp, it is indicated that the stay time of the focus on the file is short, which may merely be browsing, such that a possibility of watching the video file/image by the user is low, and the video file/image is not the target video file finally located. If the stay time Tstay is longer than or equal to the preset duration Tp, it is indicated that the focus stays on a video file/image for a long time and does not move away quickly, and there is a high possibility that the video file/image may be watched by the user, such that the video file/image where the focus is located currently is recorded as the target video file. Optionally, a resource identity (ID) of the target video file is recorded, and which file in the storage device is a target video file captured in advance may be accurately identified according to the resource ID.

In other embodiments, with reference to an example in FIG. 41, for example, the user searches for a target video file satisfying his/her own interest and viewing will in a comprehensive manner via a search control in the storage device directory, and when retrieving the target video file, locating and capturing of the target video file are completed in advance, and then the resource ID of the target video file is recorded.

In other embodiments, with reference to the example in FIG. 41, for example, the user inputs voice information by clicking a voice control in the storage device directory, and the display apparatus collects the voice information input from the user, and parsing processing such as segmentation and semantic analysis is performed on the voice information. For example, the user says "play HHH" via the voice control, and after parsing is performed by the display apparatus, a keyword of a target object may be obtained as "HHH", such that a file related to "HHH" is searched for, the target video file searched for is HHH episode 10, a resource ID of the target video file is recorded, and then the target video file may be located and captured before a startup action.

Step two, before the user starts to play the target video file, decoding information carried in a thumbnail of the target video file is obtained.

Before the user starts to play the target video file, the display apparatus locates and captures a possible target video file in advance, and a target video file is displayed as a thumbnail in a directory page. The display apparatus may directly read the thumbnail of the target video file from the storage device. The thumbnail generally carries the decoding information of the target video file, and the decoding information includes, but is not limited to, a resolution, a HDR type, a refresh frequency, etc.

Step three, picture quality configuration data is generated according to the decoding information.

Through step 3, the decoding information is converted into picture quality configuration data for GPU processing, which is a loading processing of the picture quality configuration data. The picture quality configuration data includes configuration values of various picture quality parameters in a GPU, and the picture quality parameters include, but not limited to, brightness, contrast, saturation, definition, etc.

Step four, the picture quality configuration data is injected into a graphics processing unit.

Step five, when an operation of starting to play the target video file from the user is received, the graphics processing unit is controlled to refresh picture quality according to the picture quality configuration data, and then the display is caused to display the target video file.

Through the above steps, loading and injection processing of the picture quality configuration data, which takes a long time in the PQ processing process, may be completed in advance before the video player is started, and the GPU is capable of triggering the picture quality configuration data to take effect immediately after receiving the injected data, that is, it takes a very short time (which is negligible) for the GPU to refresh the picture quality. In this way, a picture quality refreshing action is completed before the display apparatus outputs a picture of the target video file, and a video picture has a pre-configured picture quality effect when the display displays a picture, such that sudden changes of a picture quality effect, and display abnormalities such as blurred screen or splash screen when playing of a video is started are eliminated, it is unnecessary to correct time synchronization between startup of video playing and the picture quality refreshing action, time of picture displaying of the video is shortened, performance of the video player is ensured, and playing efficiency and a display effect of a video file are improved.

In some scenarios, for example, the user moves the focus to video file 1 and makes the focus stay on the video file 1 for longer than a preset duration, and then the user starts to play the video file 1. Alternatively, the user has something to leave, and then the focus stays on the video file 1 for a long time but the video file 1 is never started to be played. Alternatively, an operation focus of the user stays on the video file 1 for a while, picture quality configuration data 1 corresponding to the video file 1 is injected into the GPU in advance. Assuming that the user shifts the focus to video file 2 and starts to play the video file 2, if the GPU makes the picture quality configuration data 1 take effect, the video file 2 may present a picture quality effect of the video file 1 when being started to be played, which does not match its own preset picture quality effect. In this way, problems such as sudden changes of the picture quality effect are inevitably caused when the picture quality is refreshed and converted, and the display abnormalities may also be perceived by the user and may impact viewing experience of the user.

In this regard, in some embodiments, after the processor injects the picture quality configuration data into the GPU, it is necessary to control the GPU to keep in a waiting state, that is, the GPU may not refresh the picture quality temporarily. In this case, the picture quality configuration data does not take effect yet. An objective of the embodiment is that when the user makes the focus stay on a certain video file for longer than a preset duration, it may be only indicated that the video file is more likely to be started to be played compared with other files in the storage device. With reference to an example in the above scenario, the display apparatus cannot actually predict a subsequent behavior of the user, so the GPU keeps waiting first. In this case, at an observation stage, whether to trigger the picture quality configuration data to take effect is decided by observing the subsequent behavior and operation of the user.

In some embodiments, if the display apparatus receives an operation for starting to play a current target video file from the user, it is indicated that a file object located and captured in advance by the display apparatus conforms to an actual viewing will of the user, and the GPU is switched from the waiting state to a refreshing state, that is, the GPU immediately triggers the picture quality configuration data to take effect, such that the picture quality refreshing action is completed before a picture of the target video file is displayed.

In some embodiments, timeout time Ttimeout may be preset, and the stay time Tstay is compared with the timeout time Ttimeout, such that whether a target video file located and captured in advance has a startup timeout problem may be determined. If the operation of starting to play the target video file is received from the user within the timeout time Ttimeout, that is, the stay time Tstay is shorter than the timeout time Ttimeout, the GPU is switched from the waiting state to the refreshing state. If the operation of starting to play the target video file is not received from the user within the timeout time Ttimeout, that is, the stay time Tstay is longer than or equal to the timeout time Ttimeout, it is indicated that the user never starts to play the current target video file although the user never moves the focus, and there is a startup timeout problem. Optionally, the GPU is controlled to clear the injected picture quality configuration data, such that the GPU may be restored to an initial state before injection, the picture quality configuration data is prevented from occupying GPU resources in an ineffective manner for a long time, it is ensured that other subsequent programs or applications may also effectively use corresponding resources of the GPU, and an abnormal display problem caused by mistakenly triggering the picture quality configuration data to take effect when other programs or applications are started is avoided. The timeout time Ttimeout may be set as appropriate according to needs.

In some embodiments, after the focus stays in a certain video file for a preset duration, the user may also move the focus so as to make the focus deviate from a target video file located and captured currently, such that it is necessary to control the GPU to clear the injected picture quality configuration data, restore the GPU to the initial state, and relocate and capture the target video file according to a dynamic condition of the focus, which is equivalent to updating a recorded target video file. In this way, an abnormal display problem caused by mismatch between a started video file and refreshed picture quality parameters is avoided. The embodiments ensures that a startup picture and picture quality of the video player conform to configurations of the same video file, and ensures accuracy of playing the video file.

Figure 43:
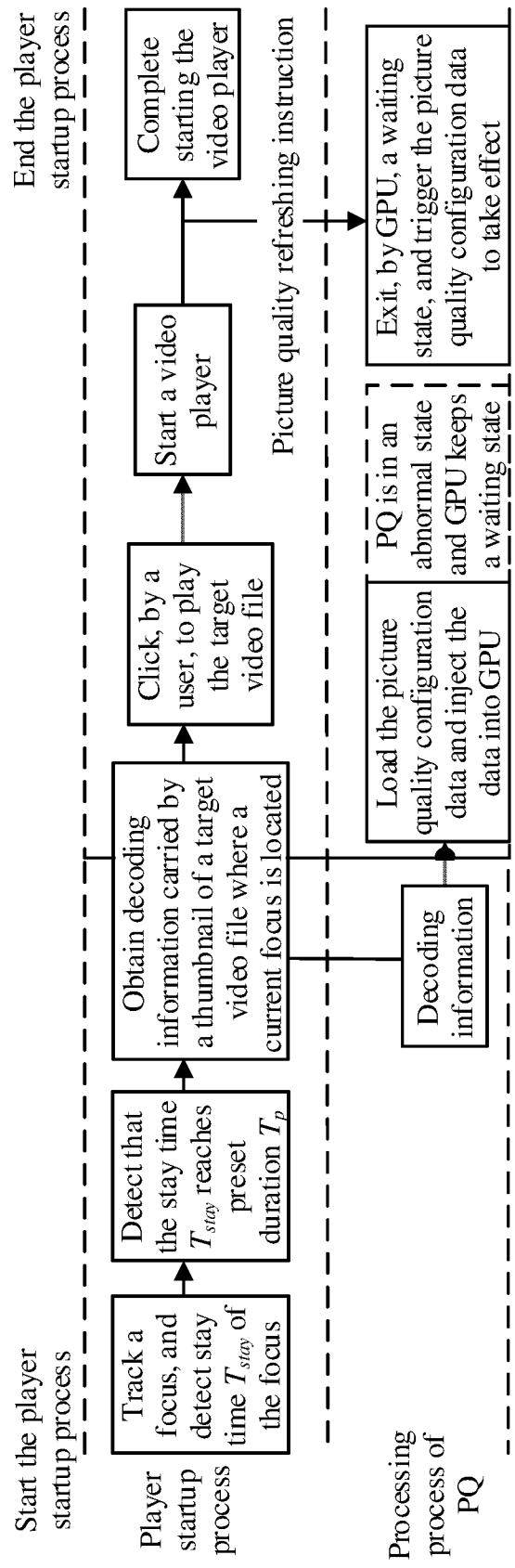
FIG. 43 is a schematic diagram of improved playing flow of a local video file in the present application.

In some embodiments, improved playing method of a local video file in an example shown in FIG. 43 is different from conventional method shown in FIG. 42 in that when the storage device is in connection with the display apparatus and the UI displays the storage device directory, a player startup process may track the focus and detect the stay time Tstay of the focus, and when it is detected that the stay time Tstay reaches the preset duration Tp, a thumbnail of a target video file where the focus is located currently is obtained, such that the decoding information carried by the thumbnail is obtained, and the decoding information is sent to the PQ processing process. In this way, the PQ processing process may complete loading and injecting the picture quality configuration data into the GPU according to the received decoding information before the video player is started, and control the GPU to keep in the waiting state. When the player startup process receives an operation instruction for starting to play the target video file from the user, the video player is controlled to be started, and meanwhile, a picture quality refreshing instruction is sent to the GPU; and in response to the received picture quality refreshing instruction, the GPU exits from the waiting state, and triggers the previously injected picture quality configuration data to take effect, such that the picture quality refreshing action is completed before the video player is started. When startup of the video player is completed, the player startup process is ended.

In the improved playing method of the local video file, the PQ processing process mainly includes two major steps, one of which is loading and injecting the picture quality configuration data into the GPU (Load & Send PQ Data to GPU), which is a time-consuming processing step in the PQ processing process, and the other of which is triggering the picture quality configuration data to take effect (PQ take effect). First of all, a time point when the user inputs the operation instruction for starting to play the target video file is taken as a time sequence node, the Load & Send PQ Data to GPU is separated from PQ parameter taking effect, and the picture quality refreshing action is performed before the video player is started, instead of intervening the actions during startup of the video player as in the method shown in FIG. 42, such that integrity and continuity of the player startup process are ensured. Secondly, based on the improved method, the player startup process and the PQ processing process do not need to be synchronized, and the video player does not need to delay picture displaying time of the video picture, such that performance of the video player is ensured. Thirdly, through prediction, location and capture for the target video file, as well as thumbnail characteristics, the Load & Send PQ Data to GPU is completed before the video player is started, the PQ parameter taking effect may be triggered and completed instantly when the video player is started, and the video player may complete the picture quality refreshing action before displaying a picture, such that abnormal display problems such as sudden changes of the picture quality effect, splash screen or blurred screen when local video files in the storage device are played are effectively solved, a playing effect and efficiency of the local video files are improved, and viewing experience of the user is optimized.

For convenience of explanation, the above description is made with specific embodiments. However, the above illustrative discussion is not intended to be exhaustive or to limit the embodiments to specific forms disclosed above. Many modifications and variations can be derived from the above teachings. The selection and description of the above embodiments is to better explain the principle and practical applications, such that those skilled in the art can better use the embodiments and various modified embodiments suitable for specific use.

What is claimed is:

1. A display apparatus, comprising:
   a display, configured to display an image from a broadcast system and/or a network, and/or display a user interface;
   a communicator, configured to connect to the internet;
   a user input interface, configured to receive a command from a user;
   a memory, configured to store data associated with the display and computer instructions and
   a processor, in connection with the display, the communicator, the user input interface, and the memory, and configured to execute the computer instructions to cause the display apparatus to:
   receive a command for setting a sound mode currently used by the display apparatus as a target sound mode;
   in response to the command, display a sound setting menu on the display, and display a name of the target sound mode and one or more context menus corresponding to the target sound mode; and
   in response to at least one context menu of the one or more context menus being a non-default context menu, display a prompt identifier on the sound setting menu, wherein the non-default context menu refers to a context menu with a current sound effect parameter that is a non-default value;
   wherein the processor is further configured to execute the computer instructions to cause the display apparatus to:
   in response to the at least one context menu being the non-default context menu, display a reset option in the sound setting menu, wherein the reset option is configured to set a current sound effect parameter in the non-default context menu as a default value.

2. The display apparatus according to claim 1, wherein the prompt identifier comprises a first identifier for indicating a non-default value, and the processor is further configured to present the first identifier associated with the sound mode menu.

3. The display apparatus according to claim 1, wherein the target sound mode comprises a standard mode.

4. The display apparatus according to claim 1, wherein the processor is further configured to execute the computer instructions to cause the display apparatus to:
   in response to all of the one or more context menus being default context menus, display no prompt identifier on the sound setting menu; and
   in response to receiving a parameter adjustment instruction for adjusting a parameter of a first context menu among the one or more context menus from the user, change a sound effect parameter of the first context menu to a non-default value, and update the sound setting menu to display the prompt identifier.

5. The display apparatus according to claim 1, wherein the processor is further configured to execute the computer instructions to cause the display apparatus to:
   in response to a selection of the sound mode menu, display a next-level menu in the sound mode menu, wherein the next-level menu comprises one or more of a standard mode, a cinema mode, a clear voice mode, or a sports mode.

6. The display apparatus according to claim 1, wherein the first context menu comprises an equalizer menu, and the sound effect parameter for the equalizer menu comprises five waveband options.

7. The display apparatus according to claim 4, wherein the processor is further configured to execute the computer instructions to cause the display apparatus to:
   in response to the parameter adjustment instruction for adjusting the parameter of the first context menu, add a first restore option for the first context menu, wherein the restore option is used for setting the parameter of the first context menu back to a value before the parameter adjustment instruction.

8. The display apparatus according to claim 7, wherein the first restore option is configured to display in the sound setting menu.

9. The display apparatus according to claim 7, wherein the first restore option is configured to be displayed on an operation interface for the first context menu.

10. The display apparatus according to claim 1, wherein the sound setting menu comprises a sound output device setting option, the sound output device setting option corresponds to a first sound output device and a second sound output device, the first sound output device refers to a sound output device currently used by the display apparatus, and the second sound output device refers to a sound output device currently in connection with the display apparatus and available for switch with the first sound output device.

11. The display apparatus according to claim 10, wherein the processor is further configured to execute the computer instructions to cause the display apparatus to:
in response to a number of second sound output devices being 0, display a prompt identifier on the sound output device setting option for indicating no sound output device for switch except for the first sound output device;
in response to a number of second sound output devices being greater than 0, display no prompt identifier on the sound output device setting option.

12. The display apparatus according to claim 11, wherein the processor is further configured to execute the computer instructions to cause the display apparatus to:
in response to receiving a switch command for switching from the first sound output device to a target sound output device by a selection of the sound output device setting option, determining whether a prompt identifier for indicating no sound output device for switch except for the first sound output device exists for the sound output device setting option exists;
in response to the prompt identifier existing, not execute a switch operation from the first sound output device to the target sound output device; and
in response to no prompt identifier, execute a switch operation from the first sound output device to the target sound output device.

13. A method for sound processing in a display apparatus, comprising:
receiving a command for setting a sound mode currently used by the display apparatus as a target sound mode;
in response to the command, display a sound setting menu on a display of the display apparatus, and display a name of the target sound mode and one or more context menus corresponding to the target sound mode; and
in response to at least one context menu of the one or more context menus being a non-default context menu, display a prompt identifier on the sound setting menu, wherein the non-default context menu refers to a context menu with a current sound effect parameter that is a non-default value;
in response to the at least one context menu being the non-default context menu, displaying a reset option in the sound setting menu, wherein the reset option is configured to set a current sound effect parameter in the non-default context menu as a default value.

14. The method according to claim 13, wherein the prompt identifier comprises a first identifier for indicating a non-default value, and the processor is further configured to display the first identifier associated with the sound mode menu.

15. The method according to claim 13, wherein the target sound mode comprises a standard mode.

16. The method according to claim 13, further comprising:
in response to all of the one or more context menus being default context menus, displaying no prompt identifier on the sound setting menu; and
in response to receiving a parameter adjustment instruction for adjusting a parameter of a first context menu among the one or more context menus from the user, changing a sound effect parameter of the first context menu to a non-default value, and update the sound setting menu to display the prompt identifier.

17. The method according to claim 13, further comprising:
in response to a selection of the sound mode menu, displaying a next-level menu in the sound mode menu, wherein the next-level menu comprises one or more of a standard mode, a cinema mode, a clear voice mode, or a sports mode.

18. The method according to claim 13, wherein the first context menu comprises an equalizer menu, and the sound effect parameter for the equalizer menu comprises five waveband options.

* * * * *